(12) United States Patent
Aman et al.

(10) Patent No.: US 7,367,036 B2
(45) Date of Patent: Apr. 29, 2008

(54) RECORDING/REPRODUCTION APPARATUS, DRIVING METHOD THEREFOR AND DISK CARTRIDGE

(75) Inventors: Yasutomo Aman, Kanagawa (JP); Nobuaki Onagi, Kanagawa (JP); Keisuke Uchida, Tokyo (JP); Masami Nishida, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 11/219,874

(22) Filed: Sep. 7, 2005

(65) Prior Publication Data

US 2006/0051076 A1 Mar. 9, 2006

(30) Foreign Application Priority Data

| Sep. 8, 2004 | (JP) | 2004-260925 |
| Sep. 8, 2004 | (JP) | 2004-260935 |
| Sep. 8, 2004 | (JP) | 2004-260937 |
| Jun. 16, 2005 | (JP) | 2005-176322 |
| Jun. 16, 2005 | (JP) | 2005-176327 |
| Aug. 29, 2005 | (JP) | 2005-247745 |

(51) Int. Cl.
*G11B 33/08* (2006.01)

(52) U.S. Cl. .................................................. 720/651

(58) Field of Classification Search ................ 720/651, 720/604, 619, 624, 703, 706, 723, 724
See application file for complete search history.

(56) References Cited

U.S. PATENT DOCUMENTS

| 6,548,137 B2 | 4/2003 | Ito et al. |
| 6,777,057 B2 | 8/2004 | Ito et al. |
| 6,790,592 B2 | 9/2004 | Harigaya et al. |
| 6,826,768 B2 * | 11/2004 | Wu et al. ................... 720/651 |
| 6,841,049 B2 | 1/2005 | Ito et al. |
| 6,884,487 B2 | 4/2005 | Ito et al. |
| 7,194,750 B2 * | 3/2007 | Aman et al. ................ 720/695 |
| 2002/0186636 A1 | 12/2002 | Onagi et al. |
| 2003/0174599 A1 | 9/2003 | Aman et al. |
| 2004/0154035 A1 | 8/2004 | Aman et al. |
| 2007/0107004 A1* | 5/2007 | Aman et al. ................ 720/651 |

FOREIGN PATENT DOCUMENTS

| JP | 04-319587 | 11/1992 |
| JP | 06-005038 | 1/1994 |
| JP | 07-105657 | 4/1995 |
| JP | 10-308059 | 11/1998 |
| JP | 2003-091970 | 3/2003 |
| JP | 2005-050404 | 2/2005 |

OTHER PUBLICATIONS

*Optical Readout of Videodisc*, IEEE Transaction on Consumer Electronics, Nov. 1976, pp. 304-308.

* cited by examiner

*Primary Examiner*—Allen Cao
(74) *Attorney, Agent, or Firm*—Dickstein Shapiro LLP

(57) ABSTRACT

A stabilizing part applying aerodynamic force to the recording medium so as to control disk axial runout of the recording disk and stabilize it; the stabilizing part includes a main stabilizing member for a recording/reproduction position with the recording/reproduction unit and an auxiliary stabilizing member for positions other than the recording/reproduction position; the auxiliary stabilizing member inclines the disk surface of the recording disk from a plane perpendicular to the rotational axis of the recording disk, and said main stabilizing member generates a positive or negative pressure in the recording disk rotation direction to cancel out inclination in the recording/reproduction surface of the recording disk.

29 Claims, 47 Drawing Sheets

FIG.2
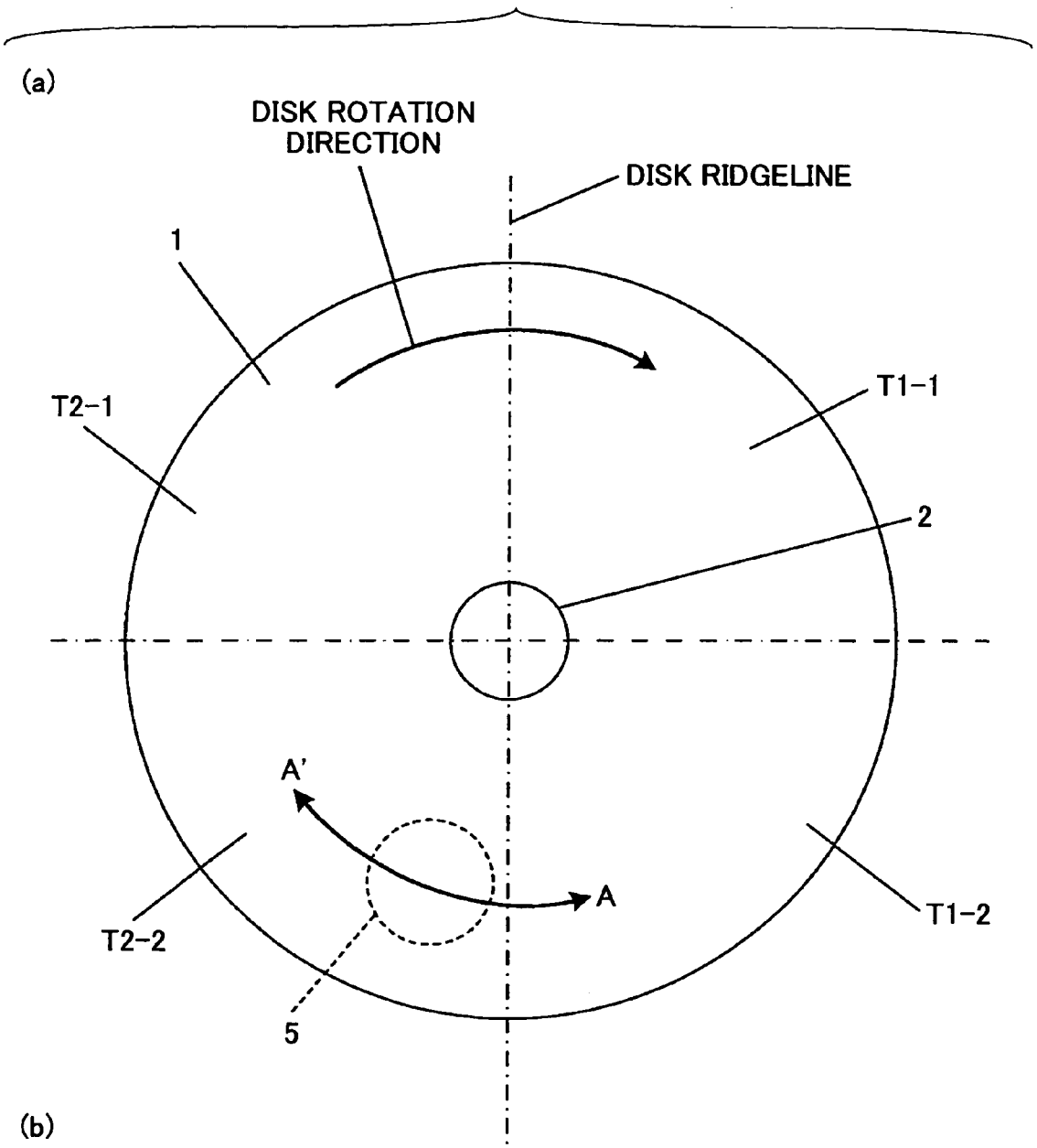
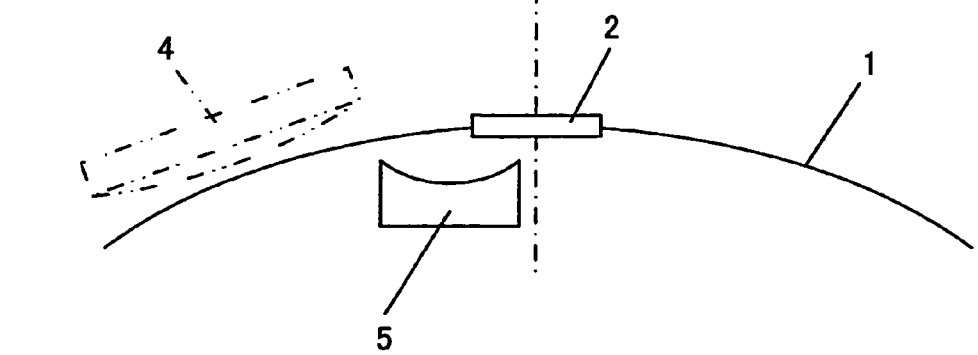

FIG.3
(a)
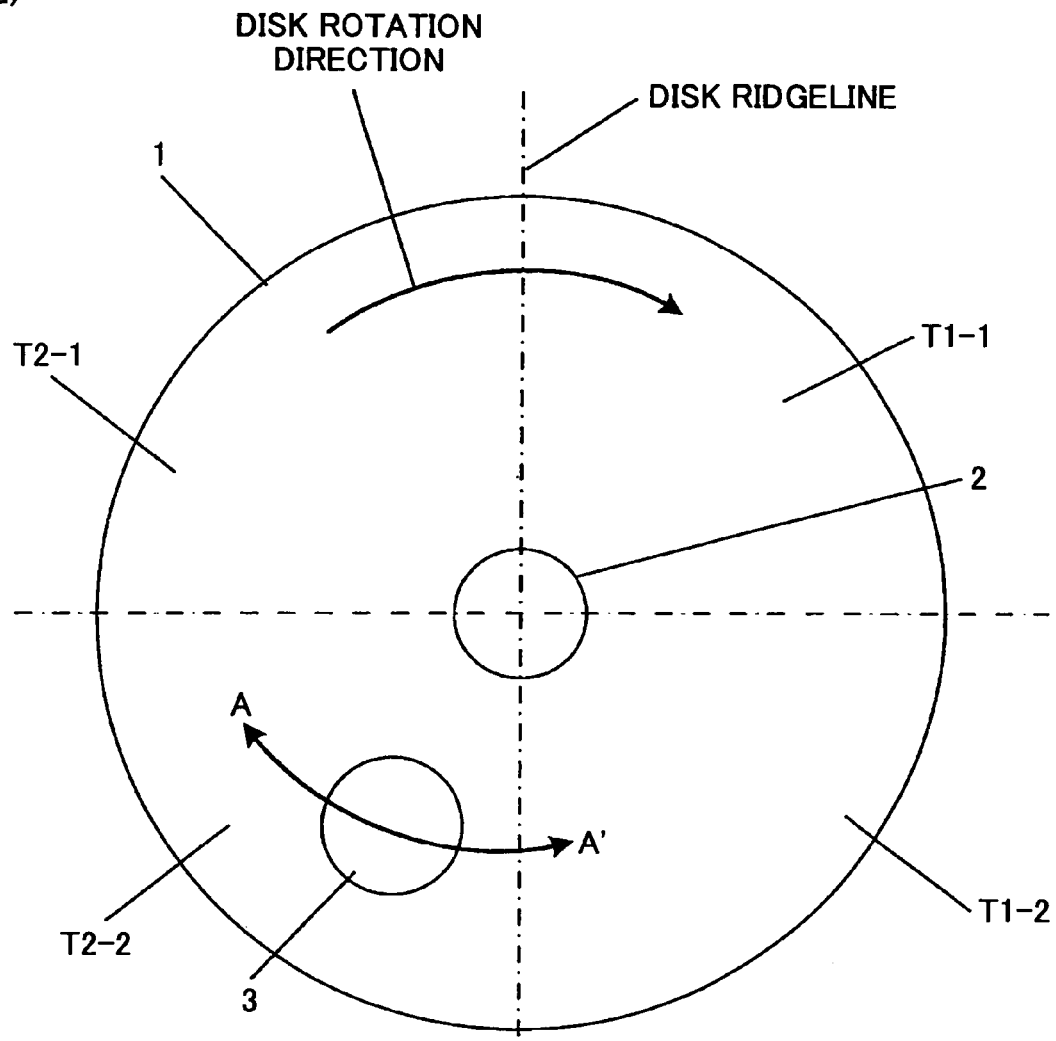
(b)
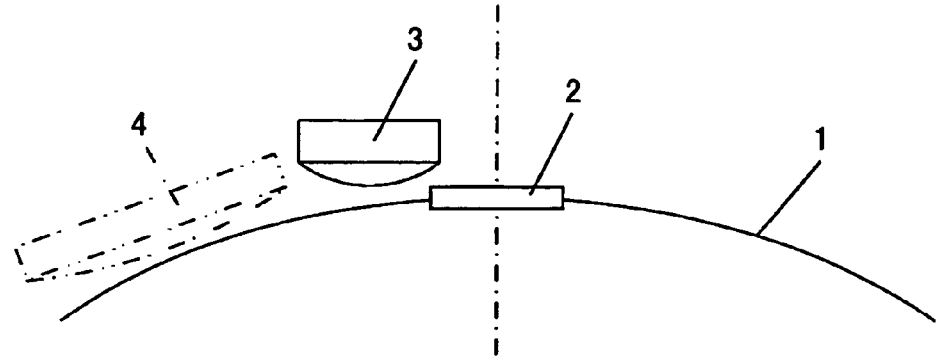

DISK ROTATION DIRECTION

| | DISK SURFACE RUNOUT [μm] | DISK SURFACE INCLINATION IN DISK CIRCUMFERENTIAL TANGENTIAL DIRECTION [deg] | DISK SURFACE INCLINATION IN A DISK RADIAL DIRECTION [deg] |
|---|---|---|---|
| EMBODIMENT 1 | 5.0 | 0.08 | 0.03 |
| EMBODIMENT 2 | 6.0 | 0.10 | 0.03 |
| EMBODIMENT 3 | 5.0 | 0.08 | 0.03 |
| EMBODIMENT 4 | 8.0 | 0.10 | 0.03 |
| EMBODIMENT 5 | 7.0 | 0.10 | 0.03 |
| COMPARISON EXAMPLE 1 | 40.0 | 5.00 | 1.00 |

FIG.40

| DISK ROTATION SPEED [rpm] | Cbd ADJUSTED VALUE [mm] |
|---:|---:|
| 500 | 0.3 |
| 1000 | 0.4 |
| 2000 | 0.5 |
| 4000 | 0.4 |
| 6000 | 0.1 |
| 8000 | 0.1 |
| 10000 | 0.1 |
| 12000 | 0.1 |
| 14000 | 0.1 |

FIG.41

| DISK ROTATION SPEED [rpm] | Cbd ADJUSTED VALUE [mm] |
|---:|---:|
| 500 | 0.3 |
| 1000 | 0.4 |
| 2000 | 0.5 |
| 4000 | 0.3 |
| 6000 | 0.1 |
| 8000 | 0.1 |
| 10000 | 0.1 |
| 12000 | 0.1 |
| 14000 | 0.1 |

FIG.42

| DISK ROTATION SPEED [rpm] | MAXIMUM SURFACE RUNOUT IN A DISK RADIUS RANGE BETWEEN 25 AND 55 mm [$\mu$m] | | | | | | |
|---|---|---|---|---|---|---|---|
| | EMBODIMENT 6 | EMBODIMENT 7 | EMBODIMENT 8 | EMBODIMENT 9 | COMPARISON EXAMPLE 1 | COMPARISON EXAMPLE 2 | COMPARISON EXAMPLE 3 |
| 500 | 30 | 40 | 30 | – | – | – | – |
| 1000 | 30 | 35 | 30 | – | | 223 | – |
| 2000 | 30 | 30 | 30 | – | | 36 | 33 |
| 4000 | 10 | 18 | 10 | 10 | | 15 | 22 |
| 6000 | 6 | 10 | 6 | 6 | | 114 | 16 |
| 8000 | 5 | 8 | 6 | 6 | | | 73 |
| 10000 | 5 | 8 | 5 | 5 | – | | |
| 12000 | | 7 | 5 | 5 | – | | |
| 14000 | | 6 | | – | – | | |

FIG.57

| DISK ROTATION SPEED [rpm] | MAXIMUM SURFACE RUNOUT IN A DISK RADIUS RANGE BETWEEN 25 AND 55 mm [μ m] | | | | | |
|---|---|---|---|---|---|---|
| | EMBODIMENT 10 Cbdmax BOUNDARY ZONE CONDITION | EMBODIMENT 11 Cbdmax BOUNDARY ZONE CONDITION | EMBODIMENT 12 Cbdmax BOUNDARY ZONE CONDITION | COMPARISON EXAMPLE 4 OUT OF Cbdmax BOUNDARY ZONE CONDITION | COMPARISON EXAMPLE 5 OUT OF Cbdmax BOUNDARY ZONE CONDITION | COMPARISON EXAMPLE 6 OUT OF Cbdmax BOUNDARY ZONE CONDITION |
| 500 | 48 | 25 | 42 | 80 | 65 | 70 |
| 1000 | 43 | 45 | 45 | 75 | 140 | 75 |
| 2000 | 48 | 44 | 48 | 80 | 110 | 80 |
| 3000 | 50 | 30 | 35 | 100 | 100 | 100 |
| 4000 | 46 | 18 | 18 | 170 | 100 | 110 |
| 5000 | 30 | 20 | 12 | 210 | 120 | 120 |
| 6000 | 27 | 9 | 13 | 180 | 120 | 160 |
| 8000 | 20 | 10 | 12 | 150 | 125 | 120 |
| 10000 | 21 | 7.5 | 12 | 130 | 120 | 105 |
| 12000 | 17 | 5.8 | 16 | 125 | 110 | 120 |
| 14000 | 12 | – | 8 | 120 | – | 110 |

FIG.58

| DISK ROTATION SPEED [rpm] | MAXIMUM SURFACE RUNOUT IN A DISK RADIUS RANGE BETWEEN 25 AND 55 mm [$\mu$m] ||
|---|---|---|
| | EMBODIMENT 13 Cbdmin BOUNDARY ZONE CONDITION | EMBODIMENT 14 Cbdmin BOUNDARY ZONE CONDITION |
| 500 | 25 | 30 |
| 1000 | 19 | 20 |
| 2000 | 10 | 10 |
| 3000 | 10 | 10 |
| 4000 | 10 | 9.5 |
| 5000 | 9 | 10 |
| 6000 | 8 | 9.5 |
| 8000 | 9 | 8 |
| 10000 | 8 | 8 |
| 12000 | 9 | 8 |
| 14000 | 10 | 8 |

FIG.59

| DISK ROTATION SPEED [rpm] | MAXIMUM SURFACE SHIFT IN A DISK RADIUS RANGE BETWEEN 25 AND 55 mm [μm] | | | |
|---|---|---|---|---|
| | EMBODIMENT 15 Cbd = 0.3 FIXED | EMBODIMENT 15 Cbd = 0.1 FIXED | EMBODIMENT 16 Cbd = 0.3 FIXED | EMBODIMENT 16 Cbd = 0.1 FIXED |
| 500 | 80 | | 80 | |
| 1000 | 43 | SLIDE | 75 | SLIDE |
| 2000 | 35 | 10 | 40 | 10 |
| 3000 | 30 | 10 | 25 | 10 |
| 4000 | 25 | 10 | 15 | 9.5 |
| 5000 | 20 | 9 | 13 | 10 |
| 6000 | 20 | 8 | 10 | 9.5 |
| 8000 | 18 | 9 | 10 | 8 |
| 10000 | 21 | 8 | 10 | 8 |
| 12000 | 22 | 9 | 9 | 8 |
| 14000 | 300 | 10 | 8 | 8 |

RECORDING/REPRODUCTION APPARATUS, DRIVING METHOD THEREFOR AND DISK CARTRIDGE

BACKGROUND OF THE INVENTION

1. Field of the Invention

The present invention relates to a recording/reproduction apparatus for carrying out information recording and/or reproduction to/from a flexible recording disk, a driving method therefor, and a disk cartridge containing the recording disk.

2. Description of the Related Art

Recently, a demand for recording a large amount of digital data arises along with digitization of TV broadcast or such. For example, in a field of an optical disk, one method for improving a recording density is to reduce an optical spot diameter applied for information recording/reproduction. Hereinafter, description is made for an optical disk as a typical example. However, a recording disk applied in a recording/reproduction apparatus to which the present invention is directed is not limited to an optical disk, and any other used in a form of a disk-shaped recording disk such as a phase change memory, a magneto-optical memory, a hologram memory or such may also be applied.

In order to improve a recording density of an optical disk, shortening of a wavelength of light applied for recording/reproduction and also enlargement of a numerical aperture NA are effective. As to the wavelength of light, near infrared light, i.e., 780 nm is applied for a CD (compact disk), and a wavelength in the neighborhood of 650 nm of red light is applied for a DVD (digital versatile disk). Recently, a blue-violet semiconductor laser has been developed, and it is expected that laser light in the neighborhood of 400 nm will be applied for the future.

As to an objective lens, NA is less than 0.5 for CD, while NA on the order of 0.6 is applied for DVD. For the future, a numerical aperture (NA) is required to be further increased to more than 0.7. However, when NA of an objective lens is increased, and also, wavelength of light is shortened, influence of aberration becomes larger when light is condensed. Accordingly, a margin for tilt of an optical disk decreases. Further, since a focal point depth decreases as NA is increased, focus servo accuracy should be increased.

Further, by applying an objective lens having a high NA, a distance between the objective lens and an optical disk is reduced. Therefore, the objective lens may hit the optical disk immediately before focus servo is withdrawn at starting up, which may cause a trouble in a pickup, if axial runout of the optical disk is not controlled properly. Thus, when disk axial runout is large, high density recording may be much obstructed. This is a common problem not only for an optical disk but also for any other disk-shaped recording medium which is rotated when recording/reproduction is carried out.

In order to solve this problem, a recording/reproduction apparatus having a configuration such that a flexible optical disk is rotated in a condition in which the flexible optical disk is made to face a stabilizing member for the purpose of stabilizing axial runout in the optical disk with the use of aerodynamic force has been proposed. U.S. Patent Application Publication No. 2002/0186636 (paten document 1), Japanese Laid-open Patent Application No. 2003-91970 (paten document 2), Japanese Laid-open Patent Application No. 10-308059 (paten document 3) or 'OPTICAL READ-OUT OF VIDEODISC, IEEE TRANSACTION ON CONSUMER ELECTRONICS, November 1976, pages 304-308 (non-patent document 1) discloses such a configuration or a configuration of a flexible optical disk.

SUMMARY OF THE INVENTION

As a method to solve the above-mentioned problem, the Applicant of the present application proposed a configuration in the above-mentioned patent document 1 and so forth. According to the configuration, a cylindrical stabilizing member having an arcuate surface facing an optical disk is applied, and zones (spaces absent of the stabilizing member) in which a function of air pressure is not applied are provided on an upstream side and a downstream side in a disk rotation direction of a portion of the optical disk in which axial runout is stabilized due to the function of air pressure generated by the stabilizing member. Thus, parts providing 'escape' for the optical disk are provided backward and forward of the portion in which axial runout is stabilized, and resilient force from the optical disk at the portion in which axial runout is stabilized is reduced. Thereby, the stabilization effect due to the air pressure is increased.

In this configuration, axial runout of a flexible optical disk is controlled, high density recording is made possible, and also, a trouble such as sliding of the objective lens on the optical disk can be avoided. However, in this configuration, the disk surface in which axial runout is thus controlled may incline from an ideal plane (a plane assuming that the disk surface is accurately flat) by the following reasons (1) and (2), and as a result, a complicate control mechanism such as that disclosed in the above-mentioned patent document 2 should be provided in the stabilizing member and a recording/reproduction head, in order to deal with the inclination:

(1) Force twisting the disk surface (inclining in a disk circumferential tangential direction) is generated due to aerodynamic force for controlling disk axial runout, and thereby, the disk surface in the portion in which the disk axial runout is controlled inclines in the disk circumferential tangential direction from an ideal disk plane (a plane assuming that the disk is accurately flat).

(2) In order to control disk axial runout, the stabilizing member should be deeply projected for the disk. At this time, the disk surface in a portion for which axial runout is controlled may incline in a disk radial direction.

That is, in the configuration of the patent document 1, a complicated control mechanism is needed in the stabilizing member and the recording/reproduction head, a load borne by a driving control system may increase, and also, the cost of the apparatus may increase much.

Further, the Applicant of the present application proposed in Japanese Patent Application No. 2003-416580 a recording/reproduction apparatus in which a flexible recording disk is rotated; a main stabilizing member is provided for controlling the recording disk axial runout at least in the vicinity of a recording/reproduction position with the use of aerodynamic effect; a recording/reproduction unit is provided for recording and/or reproduction on a surface opposite to a surface of the recording disk on which mainly the aerodynamic effect is applied; the surface of the recording disk is divided into two areas by a straight line A passing through the vicinity of the center of the recording disk; and an auxiliary stabilizing member is provided for generating aerodynamic force on at least one of the two areas so that resilient force of the disk surface generated when the main stabilizing member is applied to the recording disk surface at the position at which the main stabilizing member is positioned may increase.

In this recording/reproduction apparatus, effect of controlling disk axial runout can be obtained even without deeply projecting the main stabilizing member for the disk surface. Thereby, the inclination of the disk surface mentioned in the above-mentioned item (2) can be eliminated. However, the problem of the inclination of the disk surface mentioned in the above-mentioned item (1) still remains.

The above-mentioned non-patent document 1 discloses a method applying a stabilizing plate. In this method, a flexible disk is inserted into a narrow gap between two stabilizing members of a U-shaped stabilizer, and is rotated. Thereby, disk axial runout can be controlled remarkably. Further, from this configuration of sandwiching the disk, a correspondence relationship between the disk surface and a recording/reproduction head can be maintained perpendicular and the above-mentioned problems of the items (1) and (2) do not occur in principle. However, since the disk is thus sandwiched, the gaps between the flexible disk and the stabilizing members have as narrow as 25 μm in each side. As a result, a dust or such may be inserted between the stabilizing member and the disk, whereby a recording film may be damaged, and error may be caused directly. Especially, in this configuration, the stabilizing members should approach the disk surfaces on both sides, and thereby, this problem cannot be avoided even when a side of the disk surfaces on which an information recording area is provided is changed.

Thus, an object of the present invention is to solve the above-mentioned problems, and thus to provide a recording/production apparatus or a disk cartridge, having a simple configuration by which of axial runout of a recording/reproduction portion of a flexible recording disk can be well controlled, and also, inclination of the disk at the same part can be well controlled.

In order to achieve the object, according to a first aspect of the present invention, a recording/reproduction apparatus includes: a driving part rotating a flexible recording disk about a rotational axis thereof; a stabilizing part applying aerodynamic force to the recording medium so as to control disk axial runout of the recording disk and stabilize it; and a recording/reproduction unit carrying out recording/reproduction of information to/from the recording disk by scanning it, wherein: the stabilizing part includes a main stabilizing member for controlling disk axial runout at a recording/reproduction position with the recording/reproduction unit; and an auxiliary stabilizing member for stabilizing the disk surface at positions other than the recording/reproduction position; the auxiliary stabilizing member is applied for the recording disk in such a manner as to incline the disk surface of the recording disk from a plane perpendicular to the rotational axis of the recording disk, and the main stabilizing member is applied for the recording disk in such a manner that a positive or negative pressure is generated in the recording disk rotation direction, so as to cancel out inclination of the recording/reproduction surface of the recording disk.

In this configuration, thanks to a balance between the positive/negative pressure generated by the main stabilizing member and force of causing the disk surface to keep the inclined state, disk axial runout can be easily controlled.

Further, by appropriately adjusting the force of the disk surface inclination and the force generated by the main stabilizing member, disk axial runout at the recording/reproduction position can be controlled, and also, inclination of the same position in the disk circumferential tangential direction can be adjusted in the vicinity of zero (with respect to the ideal disk plane). This adjustment can be easily achieved only by moving control of the main stabilizing member in the disk rotational axis direction. Also, only by the same control, effect similar to tangential tilt control of the main stabilizing member can be obtained. As a result, tilt control of the main stabilizing member in the disk circumferential tangential direction can be made unnecessary. Also, tilt control of the recording/reproduction unit in the disk circumferential tangential direction can also be made unnecessary. That is, even without providing tilt control of the main stabilizing member and the recording/reproduction unit in the disk circumferential tangential direction, an angle between the recording/reproduction unit and the disk surface in the disk circumferential tangential direction can be kept perpendicular.

According to a second aspect of the present invention, a recording/reproduction apparatus includes: a driving part rotating a flexible recording disk about a rotational axis thereof; a stabilizing part applying aerodynamic force to the recording medium so as to control disk axial runout of the recording disk and stabilize it; and a recording/reproduction unit carrying out recording/reproduction of information to/from the recording disk by scanning it, wherein: the stabilizing part includes a main stabilizing member for controlling disk axial runout at a recording/reproduction position with the recording/reproduction unit; and an auxiliary stabilizing member for stabilizing the disk surface at positions other than the recording/reproduction position; the auxiliary stabilizing member is applied for the recording disk in such a manner as to incline the disk surface of the recording disk from a plane perpendicular to the rotational axis of the recording disk, and the main stabilizing member is applied for the recording disk in such a manner that, in the vicinity of a ridgeline part produced on the recording disk due to the inclination of the recording disk surface, positive or negative pressure is generated in the recording disk rotation direction, so as to cancel out inclination in the recording/reproduction surface of the recording disk.

In this configuration, in addition to the advantages obtained-from the above-mentioned first aspect of the present invention, the main stabilizing member can be applied for a disk portion having a high rigidity, and disk axial runout can be controlled even without deeply projecting the main stabilizing member for the disk surface. Thereby, tilt control of the main stabilizing member in the disk radial direction can be made unnecessary. Further, tilt control of the recording/reproduction unit in the disk radial direction can be made unnecessary. That is, even without providing tilt control of the main stabilizing member and the recording/reproduction unit in the disk radial direction, an angle between the recording/reproduction unit and the disk surface in the disk radial direction can be kept perpendicular. From these effects, even without providing any tilt control of the main stabilizing member and the recording/reproduction unit, an angle between the recording/reproduction unit and the disk surface in can be kept perpendicular.

According to a third aspect of the present invention, in the recording/reproduction apparatus according to the first or the second aspect of the present invention, the main stabilizing member is caused to generate positive pressure on the recording-disk-rotation-direction upstream side and negative pressure on the recording-disk-rotation-direction downstream side, and the main stabilizing member is applied from a direction such that a direction of the recording-disk-rotational-axis-direction velocity vector component on the surface for which the main stabilizing member is applied may coincide with the direction of the positive pressure generated by the main stabilizing member.

In this configuration, the main stabilizing member can be made to function in a direction such as to cancel out the recording disk inclination in the surface on which the main stabilizing member functions.

According to a fourth aspect of the present invention, in the recording/reproduction apparatus according to the first or the second aspect of the present invention, the main stabilizing member is caused to generate negative pressure on the recording-disk-rotation-direction upstream side and positive pressure on the recording-disk-rotation-direction downstream side, and the main stabilizing member is applied from a direction such that a direction of the recording-disk-rotational-axis-direction velocity vector component on the surface for which the main stabilizing member is applied may be reverse to the direction of the positive pressure generated by the main stabilizing member.

In this configuration, the main stabilizing member can be made to function in a direction such as to cancel out the recording disk inclination in the surface on which the main stabilizing member functions.

According to a fifth aspect of the present invention, in the recording/reproduction apparatus according to the first or the second aspect of the present invention, the main stabilizing member is applied in such a manner as to generate positive pressure in the rotation-direction upstream side and negative pressure in the rotation-direction downstream side for a portion which inclines in such a manner that the surface of the recording disk facing the main stabilizing member is lifted for the recording disk rotation direction.

In this configuration, the positive/negative pressure corresponding to a direction in which the main stabilizing member inclines the recording disk can be applied, and the main stabilizing member can be made to function in a direction such as to cancel out the recording disk inclination on the surface on which the main stabilizing member functions.

According to a sixth aspect of the present invention, in the recording/reproduction apparatus according to the first or the second aspect of the present invention, the main stabilizing member is applied in such a manner as to generate negative pressure in the rotation-direction upstream side and positive pressure in the rotation-direction downstream side for a portion which inclines in such a manner that the surface of the recording disk facing the main stabilizing member is lowered for the recording disk rotation direction.

In this configuration, the positive/negative pressure corresponding to a direction in which the main stabilizing member inclines the recording disk can be applied, and the main stabilizing member can be made to function in a direction such as to cancel out the recording disk inclination on the surface on which the main stabilizing member functions.

According to a seventh aspect of the present invention, in the recording/reproduction apparatus according to the second aspect of the present invention, the main stabilizing member is applied along a radius line on the recording disk shifted from the ridgeline by an arbitrary angle.

In this configuration the recording/reproduction apparatus can be achieved in which the main stabilizing member can be made function in such a manner that the conditions of the second aspect of the present invention may be met.

According to an eighth aspect of the present invention, in the recording/reproduction apparatus according to the second aspect of the present invention, the main stabilizing member is applied along a line on the recording disk parallel to the ridgeline.

In this configuration the recording/reproduction apparatus can be achieved in which the main stabilizing member can be made function in such a manner that the conditions of the second aspect of the present invention may be met.

According to a ninth aspect of the present invention, a recording/reproduction apparatus includes: a driving part rotating a flexible recording disk about a rotational axis thereof; a stabilizing part applying aerodynamic force to the recording disk so as to control disk axial runout of the recording disk and stabilize it; and a recording/reproduction unit carrying out recording/reproduction of information to/from the recording disk by scanning it, wherein: the stabilizing part includes a main stabilizing member for controlling disk axial runout at a recording/reproduction position with the recording/reproduction unit; and an auxiliary stabilizing member for stabilizing the disk surface at positions other than the recording/reproduction position; the auxiliary stabilizing member is applied for at least one of two areas of the recording disk surface divided by an arbitrary straight line passing through a neighborhood of the recording disk center, and is applied for the recording disk in such a manner as to incline the disk surface of the recording disk from a plane perpendicular to the rotational axis of the recording disk, and the main stabilizing member is applied along a disk radius line shifted by an arbitrary angle from a ridgeline part produced on the recording disk by a function of the auxiliary stabilizing member.

In this configuration, thanks to a balance between the positive/negative pressure generated by the main stabilizing member and force of causing the disk surface to keep the inclined state, disk axial runout can be easily controlled.

Further, by appropriately adjusting the force of the disk surface inclination and the force generated by the main stabilizing member, disk axial runout at the recording/reproduction position can be controlled, and also, inclination of the same position in the disk circumferential tangential direction can be adjusted in the vicinity of zero (with respect to the ideal disk plane). This adjustment can be easily achieved only by moving control of the main stabilizing member in the disk rotational axis direction. Also, only by the same control, effect similar to tangential tilt control of the main stabilizing member can be obtained. As a result, tilt control of the main stabilizing member in the disk circumferential tangential direction can be made unnecessary. Also, tilt control of the recording/reproduction unit in the disk circumferential tangential direction can also be made unnecessary. That is, even without providing tilt control of the main stabilizing member and the recording/reproduction unit in the disk circumferential tangential direction, an angle between the recording/reproduction unit and the disk surface in the disk circumferential tangential direction can be kept perpendicular.

According to a tenth aspect of the present invention, a recording/reproduction apparatus includes: a driving part rotating a flexible recording disk about a rotational axis thereof; a stabilizing part applying aerodynamic force to the recording medium so as to control disk axial runout of the recording disk and stabilize it; and a recording/reproduction unit carrying out recording/reproduction of information to/from the recording disk by scanning it, wherein: the stabilizing part comprises a main stabilizing member for controlling disk axial runout at a recording/reproduction position with the recording/reproduction unit; and an auxiliary stabilizing member for stabilizing the disk surface at positions other than the recording/reproduction position; the auxiliary stabilizing member is applied for at least one of two areas of the recording disk surface divided by an arbitrary straight line passing through a neighborhood of the recording disk center, and is applied for the recording disk in such a manner as to incline the disk surface of the recording disk from a plane perpendicular to the rotational axis of the recording disk, and the main stabilizing member is applied in the vicinity of a line parallel to a ridgeline part produced on the recording disk by a function of the auxiliary stabilizing member.

In this configuration, the functions the same as those of the ninth aspect of the present invention can be executed.

According to an eleventh aspect of the present invention, in the recording/reproduction apparatus according to any one of the first through tenth aspects of the present invention, the main stabilizing member is extended along a scanning route of a recording/reproduction head by which information is recorded and/or reproduced to/from the recording disk.

In this configuration, disk axial runout of the area scanned by the recording/reproduction unit can be controlled in a lump.

According to a twelfth aspect of the present invention, a disk cartridge containing a flexible recording disk, configured so that a main stabilizing member controlling a axial runout of the recording disk at least in the vicinity of a recording/reproduction position with the use of aerodynamic force during rotation of the recording disk may function for the recording disk, includes: an auxiliary stabilizing member functioning for the recording disk in such a manner as to stabilize the disk surface other than the recording/reproduction position and incline the disk surface of the recording disk from a plane perpendicular to the recording disk rotational axis, and positive or negative pressure is generated in the recording disk rotation direction by means of the main stabilizing member during rotation of the recording disk, and the inclination in the recording disk recording/reproduction surface can be cancelled out.

In this configuration, the recording disk surface can be inclined and the main stabilizing member can be made to function on the thus-inclined disk surface in the disk cartridge. Thus, the functions the same as those of the above-mentioned aspects of the present invention can be executed on the recording disk contained in the disk cartridge.

Further, since the auxiliary stabilizing member can be provided separately for each disk cartridge, the auxiliary stabilizing member can be designed separately for each particular disk specification of various ones, and thus, deviation from the stabilization condition occurring due to variation of disk specification can be easily corrected.

According to a thirteenth aspect of the present invention, a disk cartridge containing a flexible recording disk, configured so that a main stabilizing member controlling axial runout of the recording disk at least in the vicinity of a recording/reproduction position with the use of aerodynamic force during rotation of the recording disk may function for the recording disk, includes: an auxiliary stabilizing member functioning for the recording disk in such a manner as to stabilize the disk surface other than the recording/reproduction position, function for at least one of two areas of the recording disk surface divided by an arbitrary straight line passing through a neighborhood of the recording disk center and incline the disk surface of the recording disk from a plane perpendicular to the recording disk rotational axis, and positive or negative pressure is generated in the recording disk rotation direction by means of the main stabilizing member during rotation of the recording disk, and the inclination in the recording disk recording/reproduction surface can be cancelled out.

In this configuration, the recording disk surface can be inclined and the main stabilizing member can be made to function on the thus-inclined disk surface in the disk cartridge. Thus, the functions the same as those of the above-mentioned aspects of the present invention can be executed on the recording disk contained in the disk cartridge.

Further, since the auxiliary stabilizing member can be provided separately for each disk cartridge, the auxiliary stabilizing member can be designed separately for each particular disk specification of various ones, and thus, deviation from stabilization conditions occurring due to variation of disk specification can be easily corrected.

According to a fourteenth aspect of the present invention, in the disk cartridge according to the twelfth or the thirteenth aspect of the present invention, the main stabilizing member is provided to extend along a scanning route of a recording/reproduction head by which information is recorded and/or reproduced to/from the recording disk.

In this configuration, disk axial runout of the area scanned by the recording/reproduction head can be controlled in a lump. Especially, in this configuration, the main stabilizing member and the auxiliary stabilizing member are made unnecessary on the side of the recording/reproduction apparatus at all, and thus, a mechanism of a common recording/reproduction apparatus commonly employed can be employed as it is.

According to the first through fourteenth aspect of the present invention described above, a balance between aerodynamic pressure generated by the main stabilizing member and resilient force of the disk surface facing the main stabilizing member can be easily controlled, and thus, satisfactory disk axial runout characteristics can be obtained. Further, after the adjustment, the disk surface can be made perpendicular to the disk rotational axis at least at a recording/reproduction portion. Thus, without providing any tilt control mechanism in the recording/reproduction unit, recording/reproduction operation can be carried out with maintaining an angle perpendicular between the recording/reproduction unit and the disk surface. Thus, high quality recording/reproduction can be achieved.

The above-mentioned patent document 3 discloses a method of providing a stabilizing plate facing a disk surface. However, in this method, a condition required for stabilizing the disk surface disclosed is only to position the flat stabilizing plate in such a manner that it is approximately in parallel to the disk. Only by this condition, it may be difficult to positively stabilize the disk surface through the entire area thereof.

For example, as will be described later, in order to stabilize an entire disk surface with the use of a flat stabilizing plate, the inventors of the present invention and so forth have found out that the most important factor is relation between 'distance between the disk and the stabilizing plate' and 'disk rotation speed'. However, the patent document 3 is silent on this matter.

Further, the above-mentioned non-patent document 1 discloses a method in which a stabilizing plate called a saddle plate is used to curve a disk by means of negative pressure generated when the disk is rotated, and also, the disk is rotated in a condition in which the disk is inserted into a narrow gap produced by two stabilizing members called a U-shaped stabilizer. Thereby, disk axial runout at a specific area sandwiched by the U-shaped stabilizer is selectively stabilized.

However, in this method, a desired curved shape of the disk cannot be achieved since negative pressure generated by the saddle plate is overcome by centrifugal force of the disk rotation, and as a result, disk axial runout at the area sandwiched by the U-shaped stabilizer increases.

Another object of the present invention is to provide a recording/reproduction apparatus, a driving method therefor and a disk cartridge by which, in order to solve the above-mentioned problem, stabilization effect of a flat-plate-shaped stabilizing plate can be positively utilized, and thus, throughout a wide speed range between a low rotation speed zone and a high rotation speed zone, the entire surface of a flexible recording disk can be stabilized.

In order to achieve the object, according to a fifteenth aspect of the present invention, a recording/reproduction apparatus includes: a part fixing a flexible recording disk on a spindle and rotating it; a stabilizing plate applying aerodynamic force so as to control and stabilize disk axial runout of the flexible recording disk; and a recording/reproduction head scanning so as to recording information to and/or reproduce information from the recording disk, wherein: the stabilizing plate is configured like a flat plate covering at least a recording area of the recording disk; and a position adjustment part is provided for adjusting a mutual distance along the disk rotational axis direction between the spindle and the stabilizing plate.

In this configuration, by controlling one of the most important factors for stabilizing the recording disk with the use of the flat-plate-shaped stabilizing plate, i.e., a 'distance between the disk and the stabilizing plate', condition setting required for stabilizing the disk entire surface can be achieved, and thus, stabilization of the recording disk with the use of the flat-plat-shaped stabilizing plate is made possible. Especially, a proper stabilization condition can be always selected even when the disk rotation speed is changed by means of the position adjustment part, and disk surface stabilization can be achieved throughout a wide rotation speed zone from a low speed through a high speed.

According to a sixteenth aspect of the present invention, in the recording/reproduction apparatus according to the fifteenth aspect of the present invention, the position adjustment part is provided in the spindle.

In this configuration, the 'distance between the disk and the stabilizing plate' can be properly set by adjustment of a position of the spindle on which the recording disk is fixed.

According to a seventeenth aspect of the present invention, in the recording/reproduction apparatus according to the fifteenth aspect of the present invention, the position adjustment part is provided in the stabilizing plate.

In this configuration, the 'distance between the disk and the stabilizing plate' can be directly and properly set by adjustment of a position of the stabilizing plate.

According to an eighteenth aspect of the present invention, in the recording/reproduction apparatus according to any one of the fifteenth through seventeenth aspects of the present invention, a tilt detecting part is provided for detecting a tilt angle in a disk radial direction at a peripheral part of the recording disk.

In a configuration for stabilizing the recording disk with the use of the flat-plate-shaped stabilizing plate, the tilt angle comes to be the vicinity of zero in the proper stabilization condition, while the same increases when the proper stabilization condition is not achieved. From this relation, a stabilization state of the recording disk can be determined by detecting the tilt angle.

According to a nineteenth aspect of the present invention, a driving method applied for the recording/reproduction apparatus according to any one of the fifteenth through eighteenth aspects of the present invention, includes the steps of: a) storing a mutual distance adjustment pattern in the disk rotational axis direction between the spindle and the stabilizing plate with respect to a disk rotation speed; and b) adjusting the mutual distance according to the disk rotation speed during recording and/or reproduction operation.

In this method, even when the disk rotation speed is changed, the 'distance between the disk and the stabilizing plate' can be always kept in a proper value.

According to a twentieth aspect of the present invention, in the driving method according to the nineteenth aspect of the present invention, a plurality of the adjustment patterns are stored for a case where a configuration of the recording disk is changed, and the adjustment pattern is selected according to the particular configuration of the recording disk applied.

In this method, even when specification change concerning the disk mechanical characteristics is made, for example, the disk base material is changed, specification of the disk composition layer such as a recording film is changed, specification of the disk protective layer is changed, or such, the 'distance between the disk and the stabilizing plate can be set in a proper value.

According to a twenty-first aspect of the present invention, in the recording/reproduction apparatus driving method according to the nineteenth aspect of the present invention, a tilt detecting part detecting a tilt angle in a disk radial direction at a peripheral part of the recording disk; and the mutual distance is adjusted so that the tilt angle detected may be the neighborhood of zero.

In this method, stabilization condition for the recording disk with the use of the stabilizing plate can be adjusted in a proper value. Especially, by means of this adjustment method, without previously setting and managing a reference value for the 'distance between the disk and the stabilizing plate', proper stabilization of the disk with the use of the stabilizing plate can be achieved.

According to a twenty-second aspect of the present invention, in the recording/reproduction apparatus driving method according to the twenty-first aspect of the present invention, the maximum value of the tilt angle is adjusted in a range between −0.1 and +0.1 degrees.

In this method, disk axial runout can be adjusted within 20 µm throughout the disk entire surface.

According to a twenty-third aspect of the present invention, a disk cartridge containing a flexible recording disk and loaded in a recording/reproduction apparatus which includes a part fixing the flexible recording disk on a spindle and rotating it; a stabilizing plate applying aerodynamic force so as to control disk axial runout of the flexible recording disk and stabilize it; a recording/reproduction head scanning so as to recording information to and/or reproduce information from the recording disk; and a position adjustment part provided for adjusting a mutual distance along the disk-rotational-axis direction between the spindle and the stabilizing plate. The stabilizing plate is configured like a flat plate covering at least a recording area of the recording disk, and is provided on an inner wall of the disk cartridge.

In this configuration, also for when recording/reproduction is carried out with the use of the disk cartridge in the recording/reproduction apparatus, the above-mentioned disk stabilization effect by means of the flat-plate-shaped stabilizing plate can be obtained.

According to a twenty-fourth aspect of the present invention, a recording/reproduction apparatus includes: a part fixing a flexible recording disk on a spindle and rotating it; a stabilizing plate applying aerodynamic force so as to control and stabilize disk axial runout of the flexible recording disk; and a recording/reproduction head scanning so as to record information to and/or reproduce information from the recording disk, wherein: the stabilizing plate is configured like a flat plate covering at least a recording area of the recording disk; and information recording and/or reproduction by means of the recording/reproduction head is carried out in a specific disk stabilization condition range determined by a rotation speed Sr of the spindle and a distance Cbd between the recording disk and the stabilizing plate.

In this configuration, by thus determining the important conditions required for stabilization with the use of the flat-plate-shaped stabilizing plate, aerodynamic force of the stabilizing plate can be made to function throughout the recording disk entire surface, and thus, the disk surface can be positively stabilized.

According to a twenty-fifth aspect of the present invention, in the recording/reproduction apparatus according to the twenty-fourth aspect of the present invention, the stabilization condition range is a range defined by the following inequalities:

$$Cbd \leq A/Sr + \alpha,$$

$$Cbd \leq 0.00015 Sr + \beta,$$

$$Cbd \geq \gamma \exp(-0.0004Sr),$$

$$Cbd \geq \eta, \text{ and}$$

$$Sr \leq Srmax,$$

where A denotes a constant determined from the disk base material; $\alpha$ denotes a constant determined from a film thickness of the disk base material; $\beta$, $\gamma$ and $\eta$ denote constants concerning flatness of the disk base material; and Srmax denotes the maximum rotation speed of the spindle.

In this configuration, the condition range for positively stabilizing the recording disk with the use of the flat-plate-shaped stabilizing plate can be determined.

According to a twenty-sixth aspect of the present invention, in the recording/reproduction apparatus according to the twenty-fourth or the twenty-fifth aspect of the present invention, information recording and/or reproduction with the use of the recording/reproduction head is carried out in a disk rotation speed range from a disk rotation speed Sr1 corresponding to an intersection of a curve Cbd$\geq\gamma$exp(−0.0004Sr) and a straight line Cbd=$\eta$, through the Srmax or a disk rotation speed corresponding to an intersection of Cbd=A/Sr+$\alpha$ and Cbd=$\eta$, and also, in a condition range in the vicinity of a boundary zone of the inequality Cbd$\geq\eta$.

In this configuration, occurrence of disk axial runout can be restricted, and thus, satisfactory disk stability can be achieved throughout the disk entire surface.

According to a twenty-seventh aspect of the present invention, in a driving method for driving the recording/reproduction apparatus according to the twenty-fourth, the twenty-fifth or the twenty-sixth aspect of the present invention, at least during information recording and/or reproduction by means of the recording/reproduction head, the distance Cbd between the recording disk and the stabilizing plate is fixed in a fixed value, and information recording and/or reproduction by means of the recording/reproduction head is carried out in a disk rotation speed range satisfying the disk stabilization condition range determined from the fixed value.

In this configuration, conditions required for achieving a function of the flat-plate-shaped stabilizing plate being effectively applied throughout the recording disk entire surface can be positively managed.

Thus, in the fifteenth through twenty-seventh aspects of the present invention, stabilization effect of the flat-plate-shaped stabilizing plate can be positively obtained, and thus, throughout a wide speed range between a low rotation speed zone and a high rotation speed zone, the entire surface of the flexible recording disk can be stabilized.

A further understanding of the nature and the advantages of the invention disclosed herein may be realized by reference of the remaining portions of the specification and the attached drawings.

BRIEF DESCRIPTION OF THE DRAWINGS

FIG. 2 shows a general arrangement of a relevant part of a second carrying-out mode of a recording/reproduction apparatus according to the present invention, (a) shows a plan view and (b) shows a front view;

FIG. 3 shows a general arrangement of a relevant part of a third carrying-out mode of a recording/reproduction apparatus according to the present invention, (a) shows a plan view and (b) shows a front view;

FIGS. 40 and 41 show examples of Cbd adjustment values applied in embodiments;

FIG. 42 shows a test result of disk axial runout characteristics for embodiments and comparison examples;

FIGS. 57 through 59 show test results of disk axial runout characteristics for embodiments and comparison examples.

DETAILED DESCRIPTION OF THE PREFERRED EMBODIMENTS

With reference to figures, modes for carrying out the present invention (simply referred to as 'carrying-out modes' throughout the specification) and embodiments according to the first through fourteenth aspects of the present invention are described first.

Figure 1:
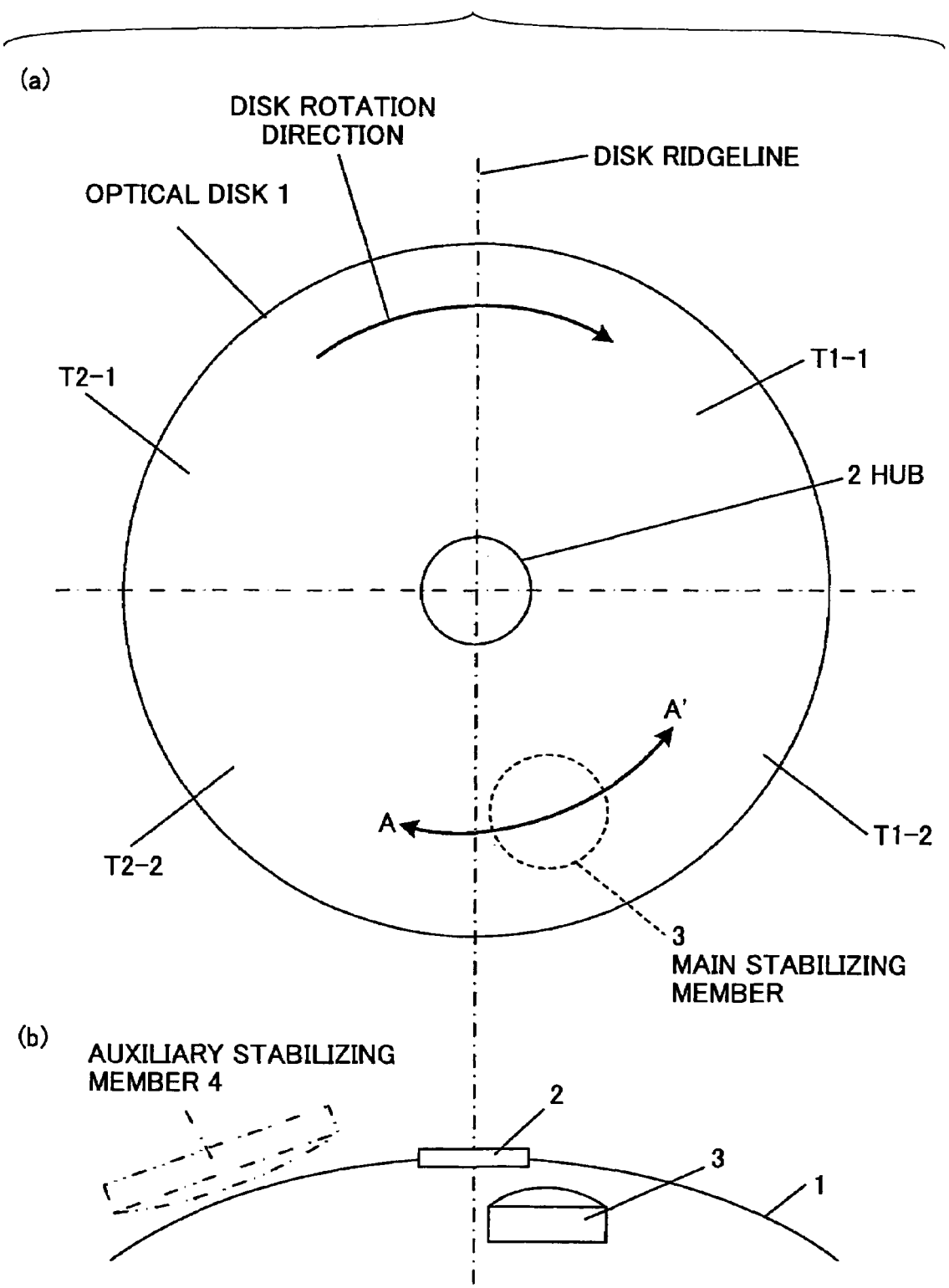
FIG. 1 shows a general arrangement of a relevant part of a first carrying-out mode of a recording/reproduction apparatus according to the present invention, (a) shows a plan view and (b) shows a front view.

FIG. 1 shows a general view of a relevant part of a first carrying-out mode of a recording/reproduction apparatus according to the present invention, (a) shows a plan view and (b) shows a front view. As shown, the recording/reproduction apparatus includes an optical disk 1 as a recording disk; a hub 2 fixed at a rotational center of the optical disk 1 to be held by a spindle motor (described later) rotating the optical disk 1; a main stabilizing member 3 projecting in a direction of the optical disk 1, and controlling disk axial runout occurring at a recording/reproduction position of a recording/reproduction unit (described later) by generating aerodynamic force with the use of aerodynamic effect; and auxiliary stabilizing member 4 generating aerodynamic force, stabilizing the disk surface of the optical disk 1 other than the recording/reproduction position, and functioning to incline the disk surface of the optical disk 1 from a plane perpendicular to a rotational axis of the optical disk 1.

In a first caring-out mode, the disk surface area is divided into four areas T1-1, T1-2, T2-1 and T2-2 (areas divided in left/right and top/bottom directions to have equal angle (90 degrees) as shown) by a ridgeline created as a result of the disk 1 is curved due to aerodynamic force applied by the auxiliary stabilizing member 4, and a perpendicular line passing through the disk center, and the main stabilizing member 3 is made to function on the area T1-2 (or T2-1).

In FIG. 1, a case where T1-2 is functioned is shown for example. A position at which the main stabilizing member 3 functions and a direction in which the main stabilizing member 3 function on the disk surface are set depending on a position at which positive/negative pressure is generated by the main stabilizing member 3, a disk rotation direction and a direction of the disk surface being curved due to the function of the auxiliary stabilizing member 4.

In the first carrying-out mode, a case is assumed in which pressure generated by the main stabilizing member 3 having a convex function surface facing the optical disk 1 is positive pressure on a disk-rotation-direction upstream side and negative pressure on a disk-rotation-direction downstream side. On this assumption, the main stabilizing part 3 is functioned from a direction shown, on the above-mentioned area T1-2 or area T2-1. It is noted that, for a case where the curved state of the optical disk 1 is changed upside-down, respective parts should be set in consideration of positions of positive/negative pressures generated by the main stabilizing member 3, the disk rotation direction, the disk surface curved direction and the position and the direction in which the main stabilizing member 3 functions.

In this configuration, sufficient effect can be obtained only as a result of the main stabilizing member 3 being made to function to one side of the optical disk 1, and there is no necessity to provide a structure to sandwich both sides of the optical disk 1. As a result, by providing a configuration in which a recording layer is produced on a side of the optical disk 1 opposite to a side on which the main stabilizing member 3 functions, there is no possibility that recorded information is destroyed so that error increases as a result of a collision between the main stabilizing member 3 and the optical disk 1.

FIG. 2 shows a general view of a relevant part of a second caring-out mode of a recording/reproduction apparatus according to the present invention, (a) shows a plan view and (b) shows a front view. The present carrying-out mode is different from the above-described first carrying-out mode in that a configuration is provided such as to provide a relation that a position of positive/negative pressure generated by a main stabilizing member 5 having a concave functioning surface facing the optical disk 1 is such that, reverse to the first carrying-out mode, negative pressure is applied on a disk-rotation-direction upstream side and positive pressure is applied on a disk-rotation-direction downstream side.

In the second carrying-out mode, on the above-mentioned assumption, a configuration is made such that the main stabilizing member 5 is made to function from a direction shown, on the area T2-2 or T1-1. FIG. 2 shows an example where the area T2-2 is functioned on.

In the second carrying-out mode, the same as the first carrying-out mode, even when the curved state of the optical disk 1 is changed upside-down or such, the same effect/advantage can be obtained as long as a position at which positive/negative pressure generated by the main stabilizing member 5 is applied, a disk rotation direction, a disk surface curved direction as well as a position and a direction in which the main stabilizing member 5 functions meet the above-mentioned relation.

FIG. 3 shows a general view of a relevant part of a third carrying-out mode of a recording/reproduction apparatus according to the present invention, (a) shows a plan view and (b) shows a front view. The present carrying-out mode differs from the first carrying-out mode in that a side on which the main stabilizing member 3 is made to function is a projecting surface side of the curved disk.

In the third carrying-out mode, the main stabilizing member 3 is made to function from a direction shown, on the area T2-2 or T1-1 on the above-mentioned assumption. FIG. 3 shows an example where the area T2-2 is functioned on for example.

In the third carrying-out mode, the same as the first carrying-out mode, even when the curved state of the optical disk 1 is changed upside-down or such, the same effect/advantage can be obtained as long as a position at which positive/negative pressure generated by the main stabilizing member 3 is applied, a disk rotation direction, a disk surface curved direction as well as a position and a direction in which the main stabilizing member 3 functions meet the above-mentioned relation.

Figure 4:
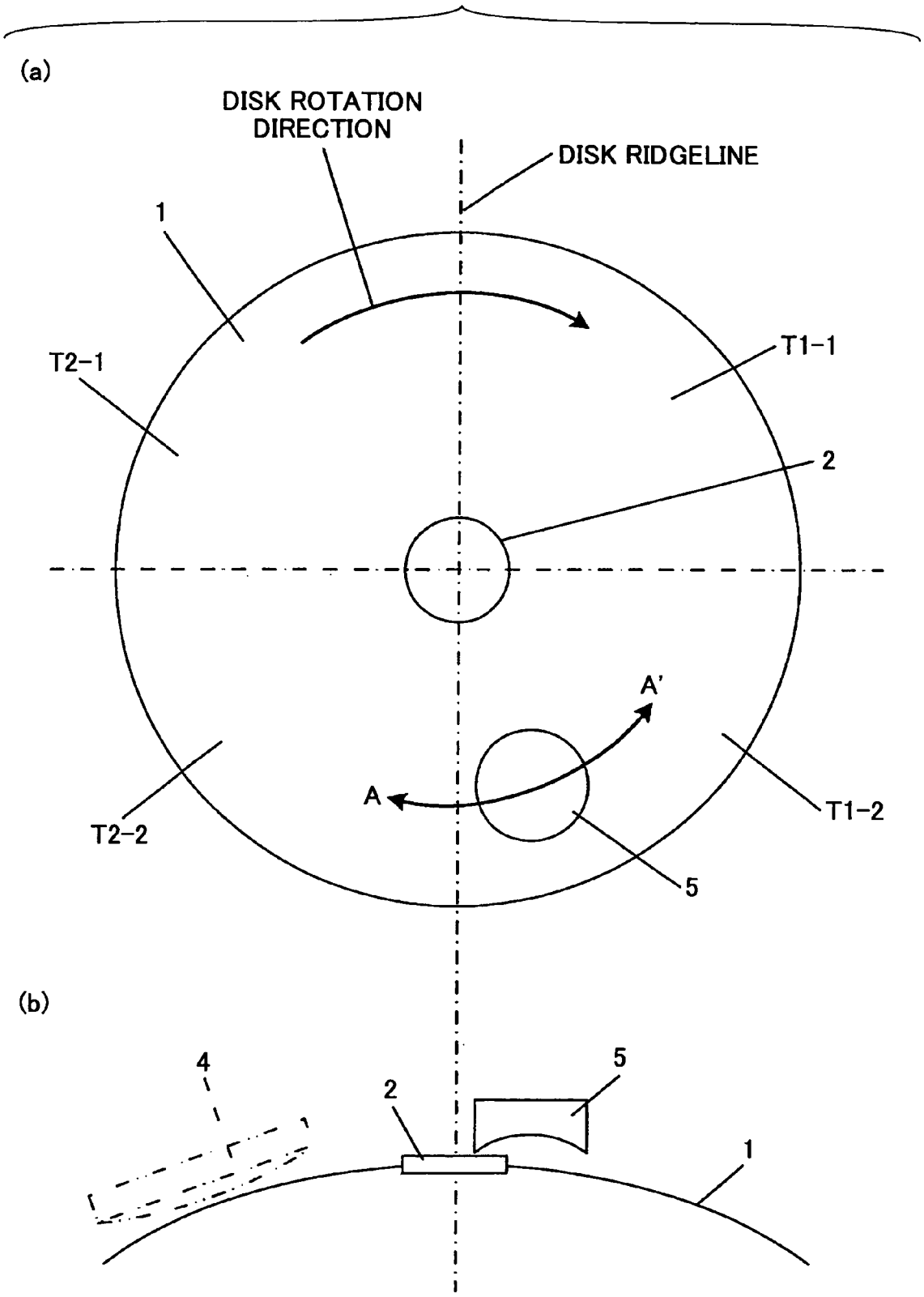
FIG. 4 shows a general arrangement of a relevant part of a fourth carrying-out mode of recording/reproduction apparatus according to the present invention, (a) shows a plan view and (b) shows a front view.

FIG. 4 shows a general view of a relevant part of a fourth carrying-out mode of a recording/reproduction apparatus according to the present invention, (a) shows a plan view and (b) shows a front view. The present carrying-out mode is different from the above-described first carrying-out mode in that a configuration is provided such as to provide a relation that a position of positive/negative pressure generated by a main stabilizing member 5 having a concave functioning surface facing the optical disk 1 is such that, reverse to the first carrying-out mode, negative pressure is applied on a disk-rotation-direction upstream side and positive pressure is applied on a disk-rotation-direction downstream side. Also, in the fourth carrying-out mode, a side on which the main stabilizing member 5 is made to function is a projecting surface side of the curved disk.

In the fourth carrying-out mode, on the above-mentioned assumption, a configuration is made such that the main stabilizing member 5 is made to function from a direction shown, on the area T1-2 or T2-1. FIG. 4 shows an example where the area T1-2 is functioned on.

In the fourth carrying-out mode, the same as the first carrying-out mode, even when the curved state of the optical disk 1 is changed upside-down or such, the same effect/advantage can be obtained as long as a position at which positive/negative pressure generated by the main stabilizing member 5 is applied, a disk rotation direction, a disk surface curved direction as well as a position and a direction in which the main stabilizing member 5 functions meet the above-mentioned relation.

In the above-mentioned first through fourth carrying-out modes, as a method of curving the disk surface, various ways may be applied. One thereof is to apply the auxiliary stabilizing member 4 described above. Further, as shown in FIG. 5, a way of functioning the auxiliary stabilizing members 4 and 4 on two areas T1 and T2 (the auxiliary stabilizing member should be provided at least one of these two areas T1 and T2) obtained from dividing the optical disk 1 surface by an arbitrary straight line A passing through the vicinity of the disk center may be applied.

Figure 5:
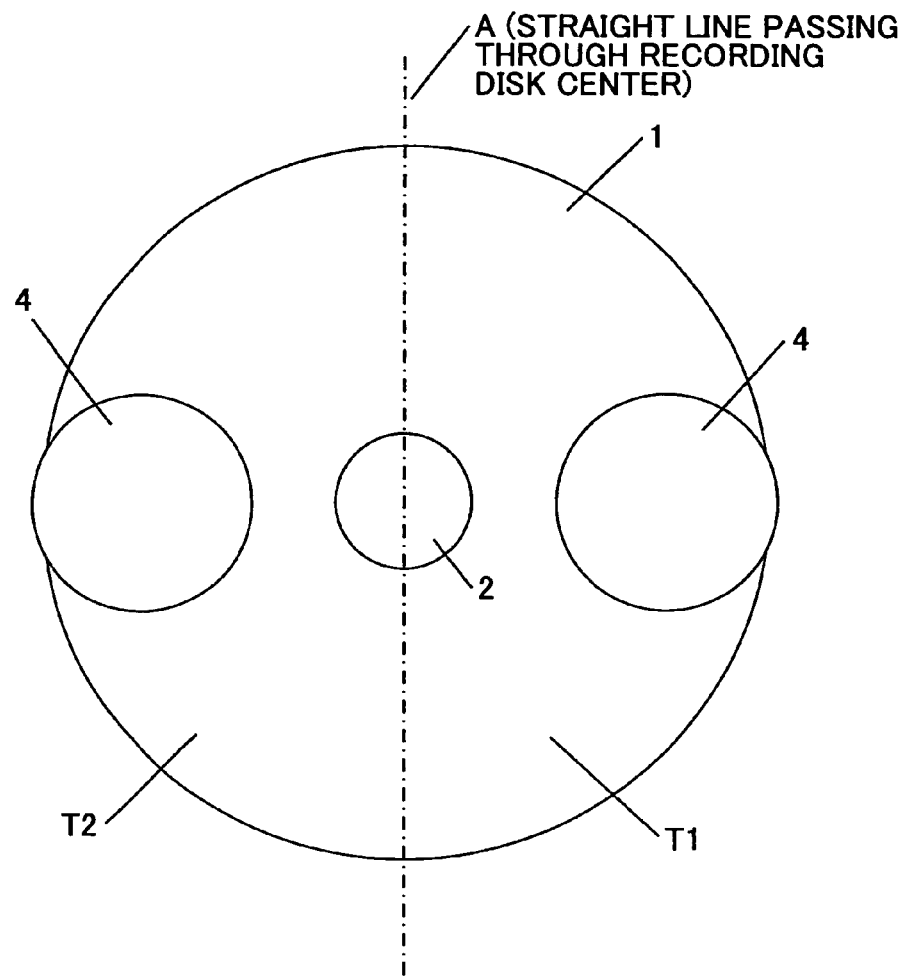
FIG. 5 shows a plan view of one example of setting an auxiliary stabilizing member according to the present carrying-out mode.

In FIG. 5, the members 4 and 4 are the auxiliary stabilizing members for stabilizing the disk surface other than the recording/reproduction portions for which axial runout is stabilized by the function of the main stabilizing member 3 or 5. Thereby, a ridgeline (the straight line A part passing through the vicinity of the disk center) is produced on the disk surface, and disk surfaces inclining from a rotation reference plane are created on both sides of the ridgeline.

Figure 6:
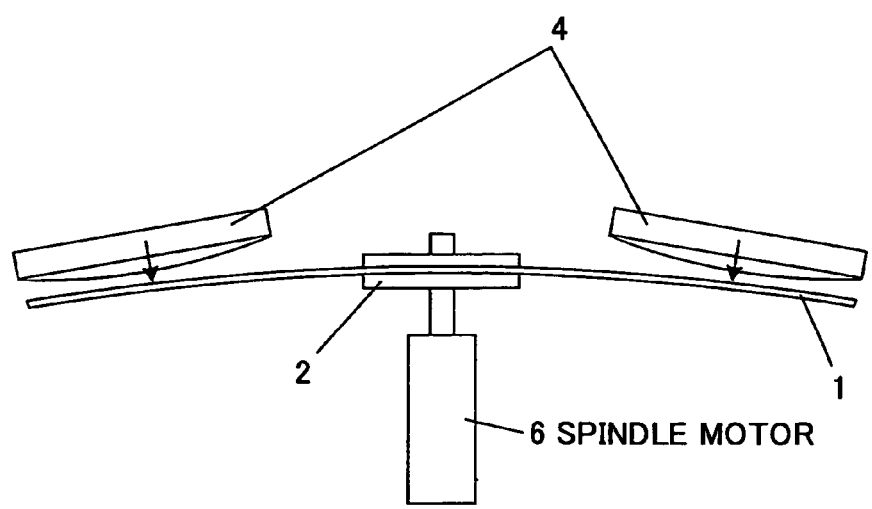
FIGS. 6 and 7 show front views of examples of setting the auxiliary stabilizing member according to the present carrying-out mode.
Figure 7:
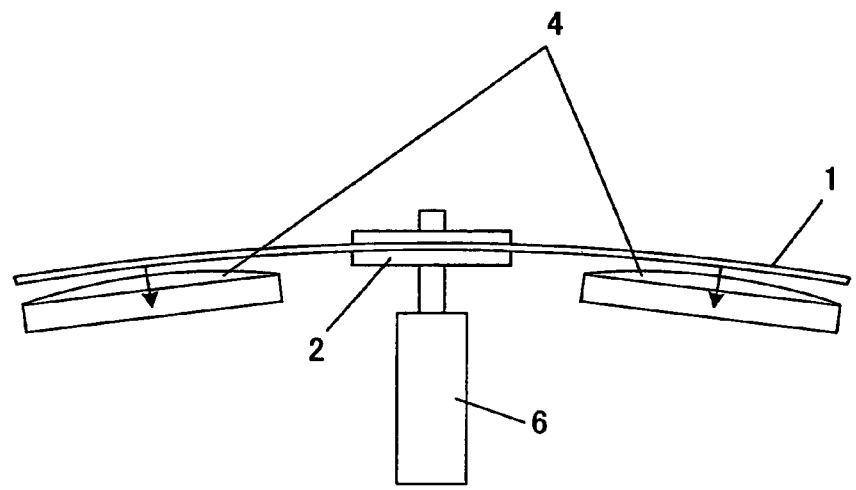

As a specific manner of providing the auxiliary stabilizing members, a manner as shown in FIG. 6 in which these members are made to project for the optical disk surface 1, a manner as shown in FIG. 7 in which the optical disk 1 is attracted, or such, may be applied. However, a specific manner is not limited, and any manner may be applied as long as the disk surface can be curved at a time of disk rotation.

In FIGS. 6 and 7, the reference numeral 6 denotes a spindle motor rotating and driving the optical disk 1 with a chucking part thereof fitted in the hub 2.

The ridgeline described above means a line created from points at which the disk surface is approximately perpendicular to the disk rotational axis in a ridge part created on the disk surface when the optical disk 1 is curved. For example, when the optical disk 1 is curved as shown in FIG. 1, 'disk ridgeline' shown corresponds to the above-mentioned ridgeline. Further, when the auxiliary stabilizing members 4 are applied as shown in FIGS. 5 through 7, the ridgeline position differs according to whether the optical disk is static or the same is rotated, strictly speaking. The ridgeline referred to here is one created due to the function of the auxiliary stabilizing members 4 when the optical disk 1 is rotated.

Operation of each carrying-out mode is described next.

As to a phenomenon occurring when aerodynamic force is applied to the rotating optical disk by the stabilizing member, which is a principle matter of each carrying-out mode, various types of experiments were carried out and consideration was made thereon. As a result, it has been found out that, when the stabilizing member is made to function on the rotating disk surface, positive and negative different pressures are generated on upstream and downstream sides in the disk rotation direction, and, due to the pressure difference, the disk surface inclines in the disk rotation direction with respect to the point at which the stabilizing member is functioned. At this time, on the disk surface, force in terms of theory of structures and centrifugal force generated upon rotation function in such a manner that the above-mentioned inclination may be reduced and the disk surface may be returned to the original state. This disk surface inclined state was maintained according to a condition of a balance between the above-mentioned force and the above-mentioned positive and negative pressures.

As a result of studying for the above-mentioned mechanical functioning relationship, it has been found out that a method of making the stabilizing member to function on the disk surface in a condition in which, the disk surface is previously inclined in a direction opposite to a direction in which the disk surface is inclined when the stabilizing member is functioned, is effective for disk surface stabilization. In this method, thanks to the previous disk inclination, force opposing the positive and negative pressures generated by the stabilizing member can be generated, and a balance condition important in disk surface stabilization can be managed.

Figure 8:
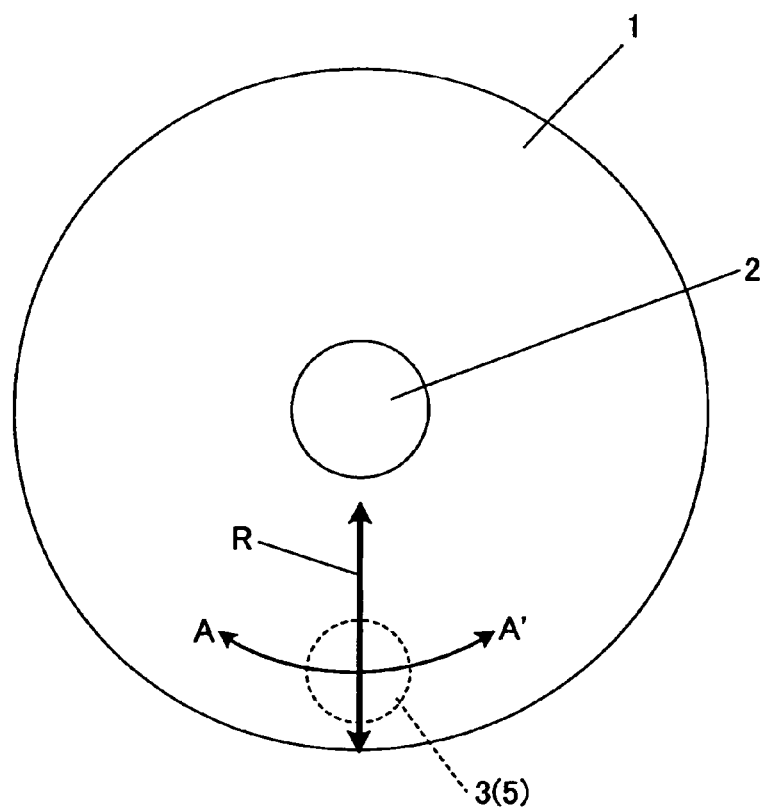
FIG. 8 shows a function of a main stabilizing member according to the present carrying-out mode.

Force generated on the disk surface is described next for when the disk surface is inclined in a circumferential direction at a position at which the main stabilizing member 3 (5) is functioned on the optical surface as shown in FIG. 8.

A line R shown in FIG. 8 denotes a scanning route of the recording/reproduction unit.

Figure 9:
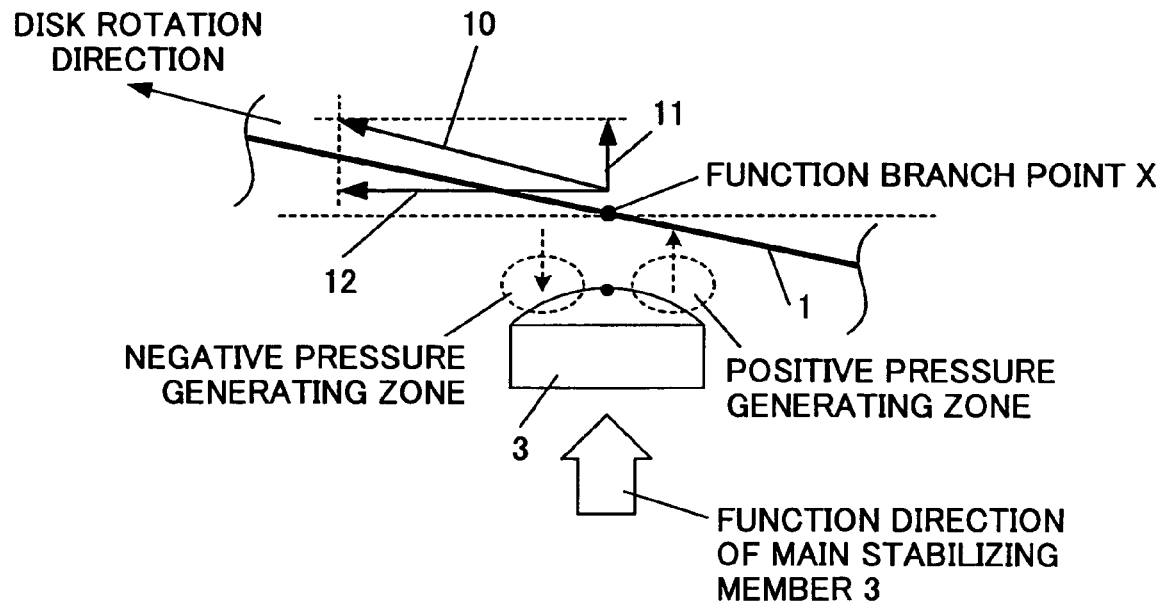
FIGS. 9 and 10 show states where positive/negative pressure is generated by means of the main stabilizing member according to the present carrying-out mode.

With reference to FIG. 9, a condition required for making it possible to obtain the effect of the present invention is described for when the main stabilizing member 3 is applied for generating positive pressure on an upstream side in the disk rotation direction and negative pressure on a downstream side. FIG. 9 shows a sectional view taken along an A-A' line of FIG. 8.

In FIG. 9, '10' denotes a velocity vector at a function branch point X of positive/negative pressures applied by the main stabilizing member 3 on the optical disk 1; '11' denotes a velocity vector component in a disk rotational axis direction; and '12' denotes a velocity vector component in a disk circumferential tangential direction.

The velocity vector means a vector in a tangential direction of a circle drawn by the above-mentioned branch point on the disk surface when the disk is rotated, and the magnitude thereof corresponds to a moving speed of the branch point. An important point in this configuration is that, the velocity vector 10 has a positive velocity component (the disk-rotational-axis-direction vector component 11) in a direction going away from the main stabilizing member 3, and the main stabilizing member 3 is made to function from such a direction that, the direction of the velocity component and the direction of the positive pressure generated by the main stabilizing member 3 coincide with one another.

Thereby, the positive pressure (larger than the atmospheric pressure applied on the top of the optical disk 1 and thus pressing the disk) is applied to the disk surface on a side (right side in the figure) approaching the main stabilizing member 3 while the negative pressure (smaller than atmospheric pressure applied on the top of the optical disk 1 and thus attracting the disk) is applied to the disk surface on a side (left side in the figure) going away therefrom. Thus, the direction of the optical disk 1 inclination can be made to oppose to the function of the main stabilizing member 3.

Figure 10:
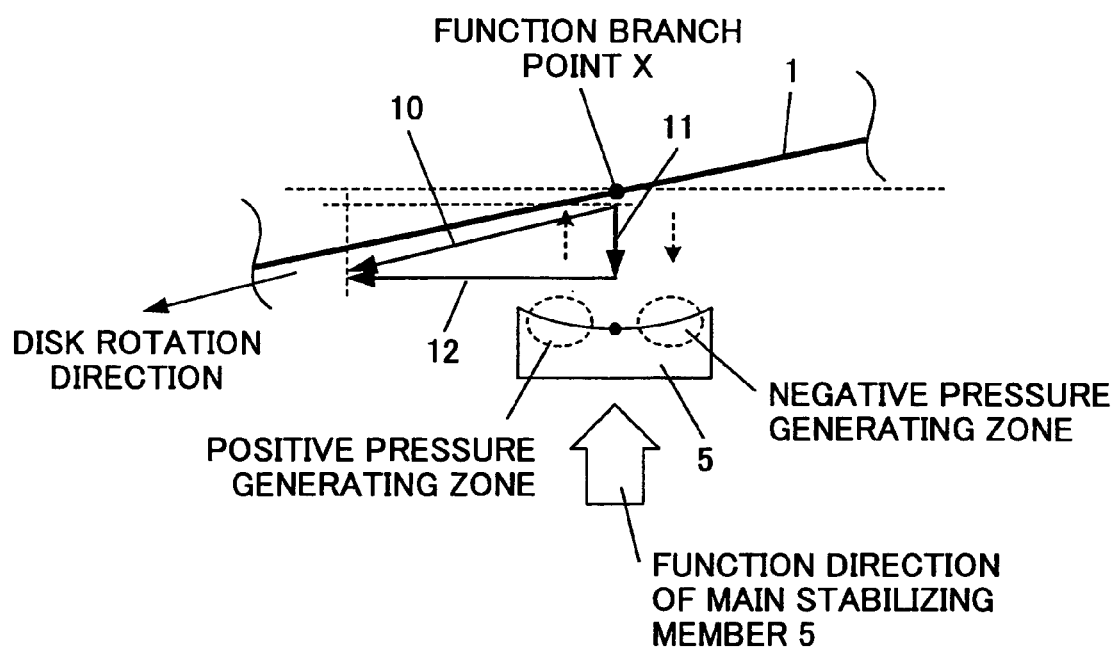

With reference to FIG. 10, a condition required for making it possible to obtain the effect of the present invention is described for when the main stabilizing member 5 is applied for generating negative pressure on an upstream side in the disk rotation direction and positive pressure on a downstream side. FIG. 10 shows a sectional view viewed along an A-A' line of FIG. 8.

In FIG. 10, '10' denotes a velocity vector at a function branch point X of positive/negative pressures applied by the main stabilizing member 5 on the optical disk 1; '11' denotes a velocity vector component in a disk-rotational-axis direction; and '12' denotes a velocity vector component in a disk circumferential tangential direction.

An important point in this configuration is that, the velocity vector 10 has a positive velocity component (the disk-rotational-axis-direction vector component 11) in a direction approaching the main stabilizing member 5, and the main stabilizing member 5 is made to function from such a direction that, the direction of the velocity component and the direction of the positive pressure generated by the main stabilizing member 5 are opposite to one another.

Thereby, the negative pressure is applied to the disk surface on a side (right side in the figure) approaching the main stabilizing member 5 while the positive pressure is applied to the disk surface on a side (left side in the figure) going away therefrom. Thus, the direction of the optical disk 1 inclination is made to oppose to the function of the main stabilizing member 5.

In the configuration shown in FIG. 9 or 10, the disk-circumferential-tangential-direction inclination at the position of the main stabilizing member 3 or 5 functioning, i.e., the inclination at the recording/reproduction position with the recording/reproduction unit can be adjusted in the vicinity of zero (with respect to the ideal disk plane), and thus, disk axial runout at the position can be effectively reduced.

The configuration shown in each of FIGS. 9 and 10 may be applied to the above-mentioned first through fourth carrying-out modes. For the first through fourth carrying-out modes, cases where the optical disk 1 is curved with the use of the auxiliary stabilizing members 4 have been described. However a method of curving or inclining the optical disk 1 is not limited to that applying the auxiliary stabilizing members 4. An important matter for the present invention is to realize a configuration pattern shown in FIG. 9 or 10 concerning inclination of the optical disk 1 and the function of the main stabilization member 3 or 5.

Further, another important condition in controlling disk axial runout by the main stabilizing member is a balance between the disk-rotational-axis-direction force from the main stabilizing member (force in combination of he above-mentioned positive and negative pressures) and resilience force of the disk opposing it. Especially, in order to control disk axial runout in the vicinity of the disk reference plane (a disk surface of the disk on the side of the main stabilizing member assuming that the disk is an ideal plane), the resilient force of the disk should be increased, i.e., rigidity of the disk should be increased.

As a result of further carrying out various experiments and study thereon, it has been found out that, by applying aerodynamic force to incline the disk surface in a disk radial direction at an arbitrary position of the disk surface, force straightening for a radial direction is applied on the disk surface at a position apart from the position at which the aerodynamic force is thus applied, by ±90° in upstream/downstream sides in the disk rotation direction, and also, rigidity of the disk surface increases there, such a phenomenon being able to be utilized to increase the rigidity of the disk surface.

A basic configuration to apply this phenomenon is the same as the configuration of FIGS. 5 through 7 described above for curving the disk surface, and, in this case, a function of the auxiliary stabilizing members 4 are important. By causing the main stabilizing member 3 or 5 to function at a position in the vicinity of the ridgeline of the disk surface curved by the function of the auxiliary stabilizing members 4, which position also meets the relevant configurations/requirements according to the present invention described above (for example, a position near one shown in FIGS. 1 through 4), disk axial runout can be reduced in the vicinity of the disk reference plane by means of the main stabilizing member 3 or 5. Further, by adjusting a position of the main stabilizing member 3 or 5 in the disk rotational axis direction at this time, inclination of the disk surface in the disk radial direction can be adjusted in the vicinity of zero (with respect to the ideal disk plane) in addition to the above-mentioned effect.

Figure 11:
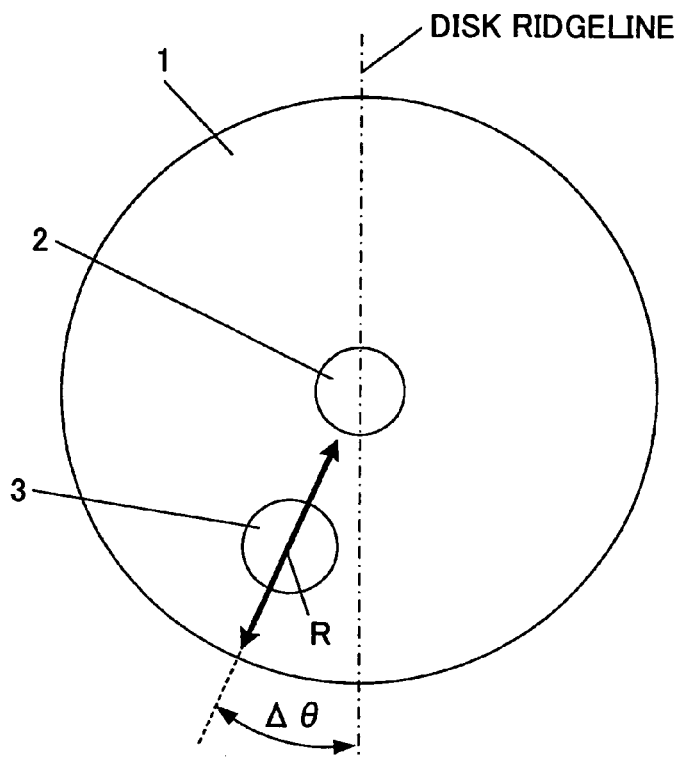
FIGS. 11, 12, 13, 14, 15 and 16 show examples of scanning of the main stabilizing member and an optical pickup in the present carrying-out mode.
Figure 12:
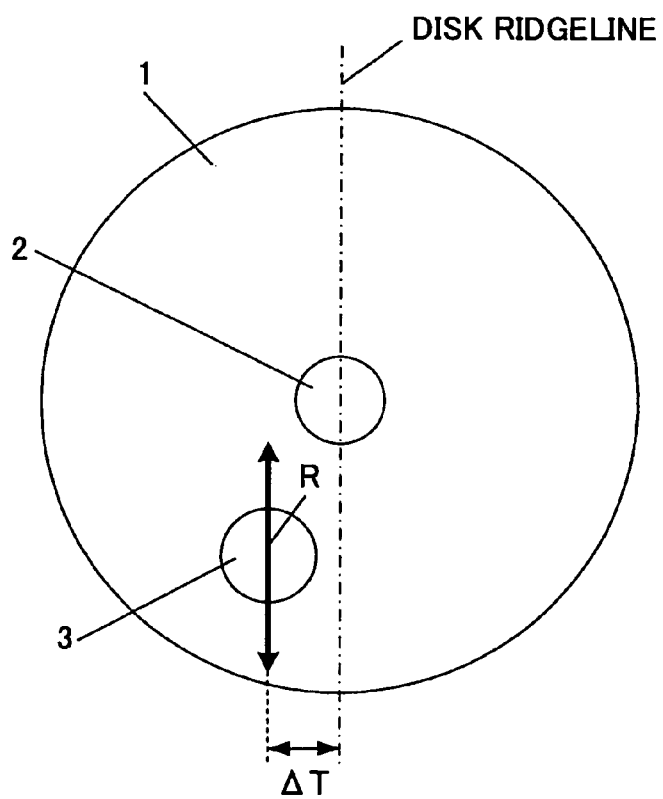
Figure 13:
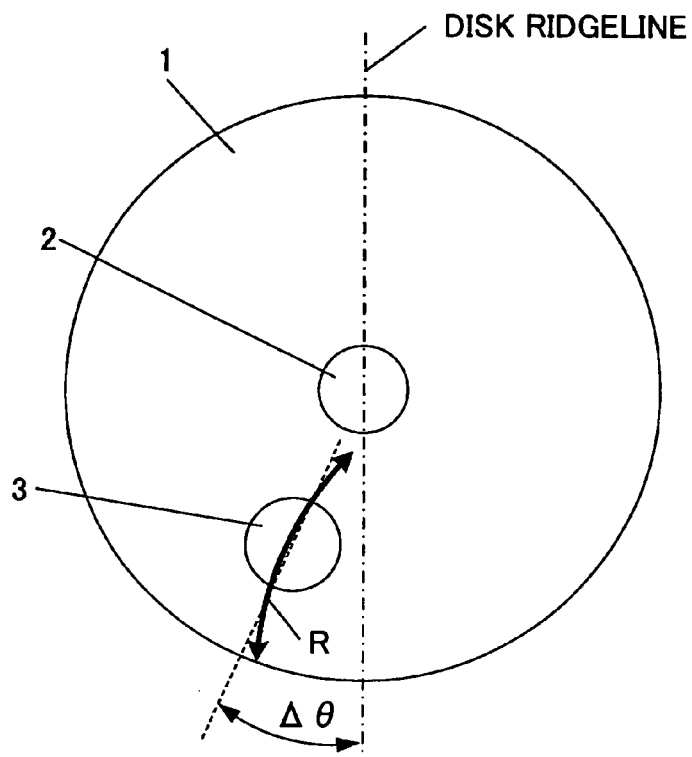
Figure 14:
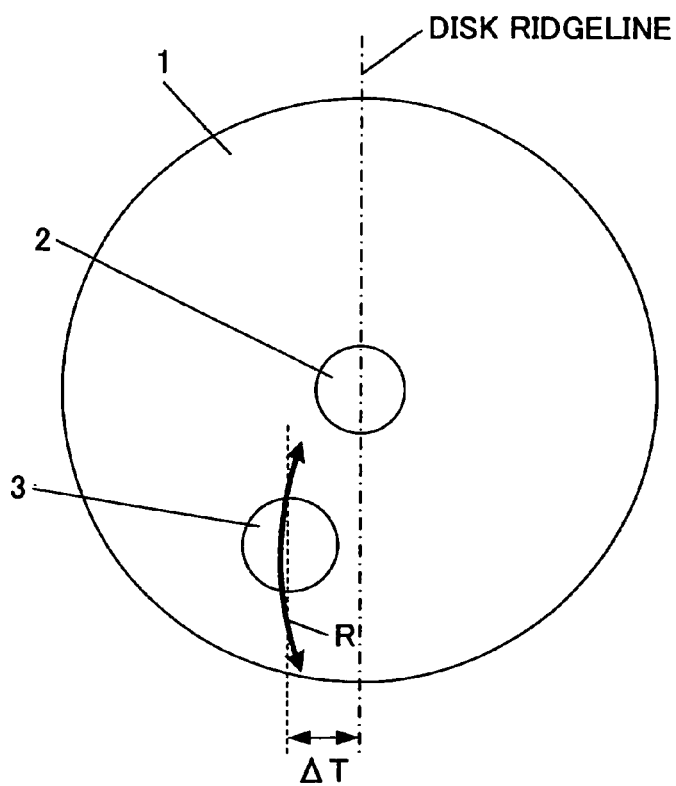

Further, various patterns may be applied for a position or a scanning route of actually applying the main stabilizing member 3 or 5 with respect to the disk ridgeline. For example, a pattern in which scanning is made in the vicinity of a position of a radius line inclined from the disk ridgeline by Δθ as shown in FIG. 11, a pattern in which scanning is made in a position parallel to the disk ridgeline apart therefrom by ΔT as shown in FIG. 12, a pattern in which scanning is made in the vicinity of a position inclined from the disk ridgeline by Δθ in a manner of swinging arm (swinging about a predetermined position) as shown in FIG. 13, a pattern in which scanning is made in a position parallel to the disk ridgeline apart therefrom by ΔT in the swinging arm manner as shown in FIG. 14, or such may be applied.

Figure 15:
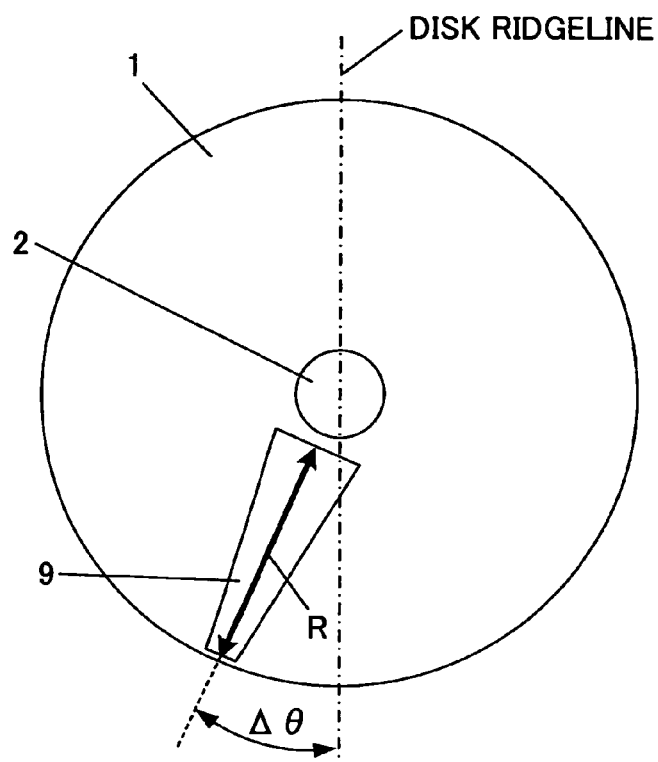
Figure 16:
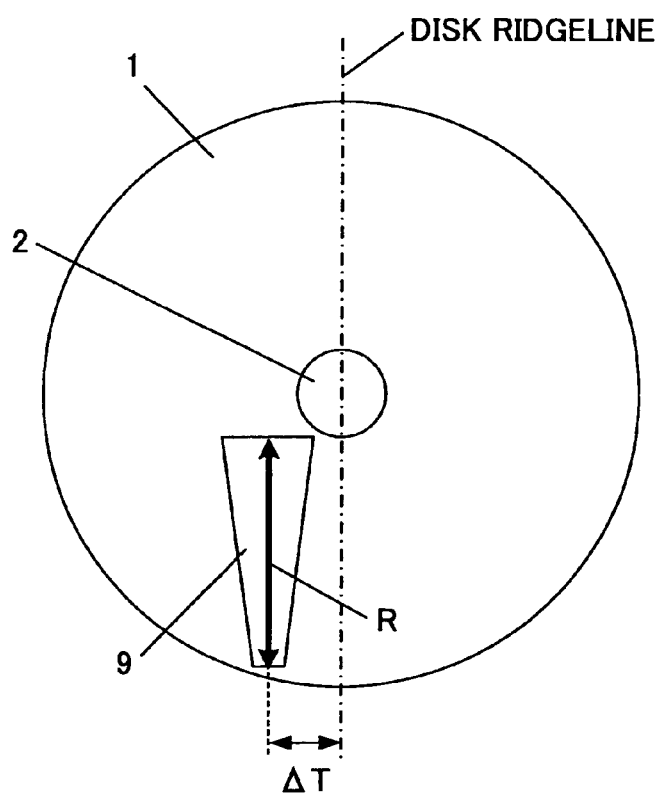

Further, a pattern in which a main stabilizing member 9 is fixed to extend in a disk radial direction in the vicinity of a position inclined from the disk ridgeline by Δθ as shown in FIG. 15, a pattern in which a main stabilizing member 9 is fixed to extend in a disk radial direction in a position parallel to the disk ridgeline apart therefrom by ΔT as shown in FIG. 16, or such may be applied.

In FIGS. 11 through 16, 'R' denotes the scanning route of the recording/reproduction unit, and, in FIGS. 11 through 14, this also denotes the scanning route of the main stabilizing member 3/5 moving together with the recording/reproduction unit. These patterns may be applied to any one of the above-mentioned first through fourth carrying-out modes.

Figure 17:
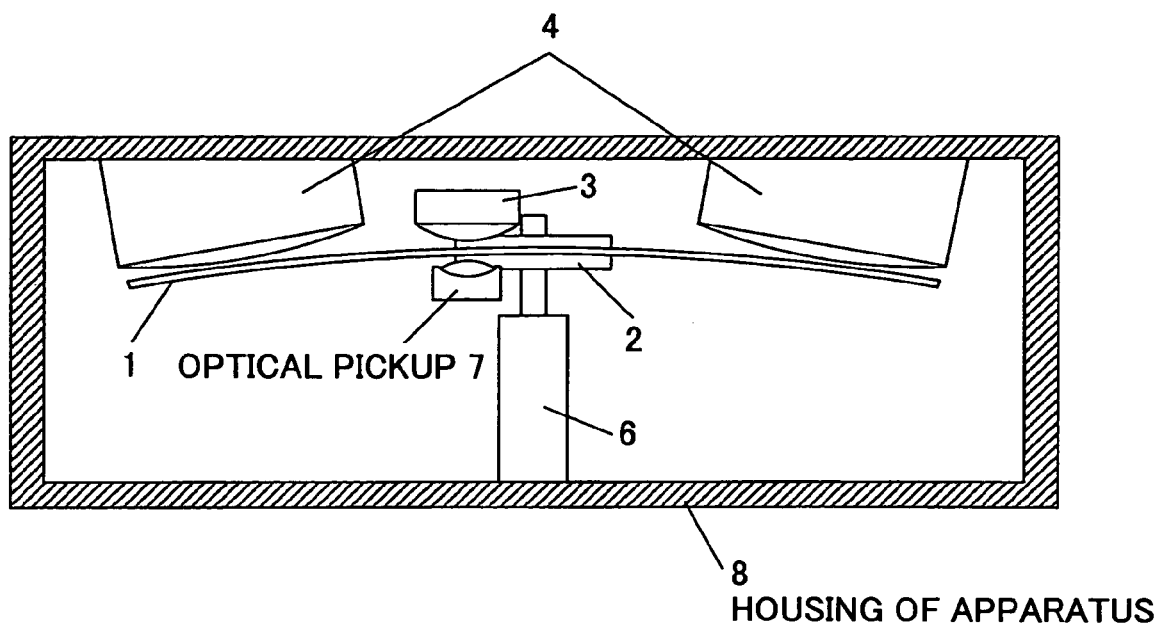
FIG. 17 shows a sectional view of a general configuration of a carrying-out mode of a recording/reproduction apparatus according to the present invention.

FIG. 17 shows a sectional view of a general configuration of a carrying-out mode of a recording/production apparatus according to the present invention. The same reference numerals are given to those corresponding to members already described above, and duplicated detailed description therefor is omitted.

In FIG. 17, '7' denotes an optical pickup moving in a radial direction of the optical disk 1, condensing a light beam for the optical disk 1, and carrying out optical scanning (in the above-mentioned scanning route R direction) on the optical disk 1 for carrying out information recording/reproduction thereto/from; and '8' denotes a housing of the apparatus body. In the housing 8, the auxiliary stabilizing members 4 are provided. FIG. 17 shows one example in which the same configuration as that of the third carrying-out mode described above is applied. In the housing 8, although not shown, a positional control mechanism for the main stabilizing member 3 and a positional control mechanism for the optical pickup 7 are provided.

Further, the positional control mechanism for the main stabilizing member 3 is provided for each of all the configuration examples shown in FIGS. 11 through 16. Further, the positional control mechanism for the optical pickup 7 is designed separately according to each configuration in which it is applied.

Figure 18:
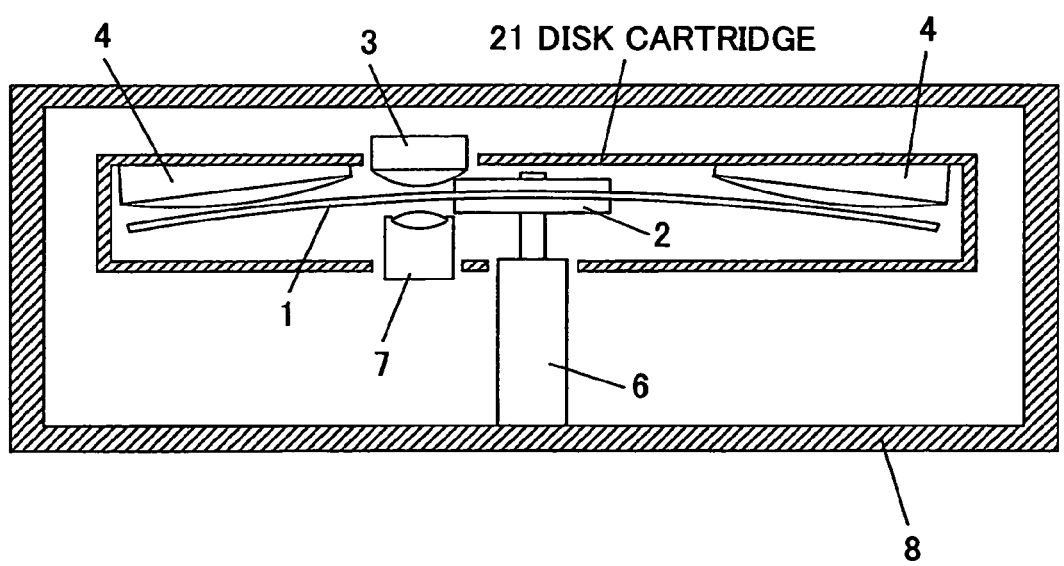
FIG. 18 shows a sectional view of a relevant part of a state in which a carrying-out mode of a disk cartridge according to the present invention is set in the recording/reproduction apparatus.

FIG. 18 shows a sectional view of a relevant part illustrating a state in which a carrying-out mode of a disk cartridge according to the present invention is set in the recording/reproduction apparatus. In this case, the auxiliary stabilizing members 4 are provided inside of the disk cartridge 21, and FIG. 18 shows an example in which the same configuration as that of the third carrying-out mode described above is applied. In the housing 8, although not shown, a positional control mechanism for the main stabilizing member 3 and a positional control mechanism for the optical pickup 7 are provided.

Further, the positional control mechanism for the main stabilizing member 3 is provided for each of all the configuration examples shown in FIGS. 11 through 16. Further, the positional control mechanism for the optical pickup 7 is designed separately according to each configuration in which it is applied.

For when the main stabilizing member 9 is fixed to extend along the disk radial direction as shown in FIG. 15 or 16 in the configuration example of FIG. 18, the main stabilizing member 9 may be fixed to an inner wall of the disk cartridge 21.

In the examples shown in FIGS. 17 and 18, a case has been described where the main stabilizing member 3 and the optical pickup 7 are provided coaxially as a basic configuration. However, the mutual position therebetween may be shifted along the disk surface. This shift should be within a range such that disk axial runout and disk surface inclination resulting therefrom may be controlled properly and thus recording/reproduction with the optical pickup 7 may be carried out properly for an area for which the disk axial runout is controlled by means of the main stabilizing member 3.

Figure 19:
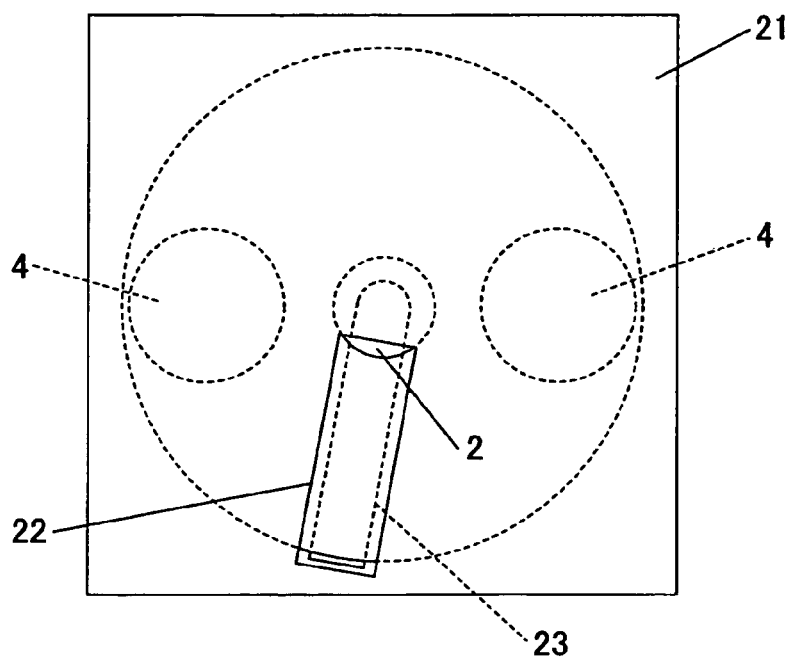
FIGS. 19 and 20 show plan views of configuration examples of the disk cartridge in the present carrying-out mode.

As a configuration example of the disk cartridge 21, one shown in FIG. 19 may be applied. In this figure, '22' denotes a first through hole for inserting the main stabilizing member 3 for scanning the disk surface; and '23' denotes a second through hole for inserting the optical pickup 7 and also making the optical pickup 7 movable in a disk radial direction.

In the example shown in FIG. 19, the second through hole 23 is also used for inserting a part of the spindle motor 5. Shutters opening/closing the through holes 22 and 23, a mechanism for fixing the optical disk 1 in the disk cartridge 21, and other necessary mechanisms and so forth required for loading the disk cartridge on the spindle motor 5 are omitted from being shown there. This configuration in which the through holes 22 and 23 are shifted by an angle may be applied for a case where the configuration example of the main stabilizing member 3, 6 or 9 shown in FIGS. 11, 13 or 15 is applied in which setting is made such that it is shifted by $\Delta\theta$ from the disk ridgeline.

Figure 20:
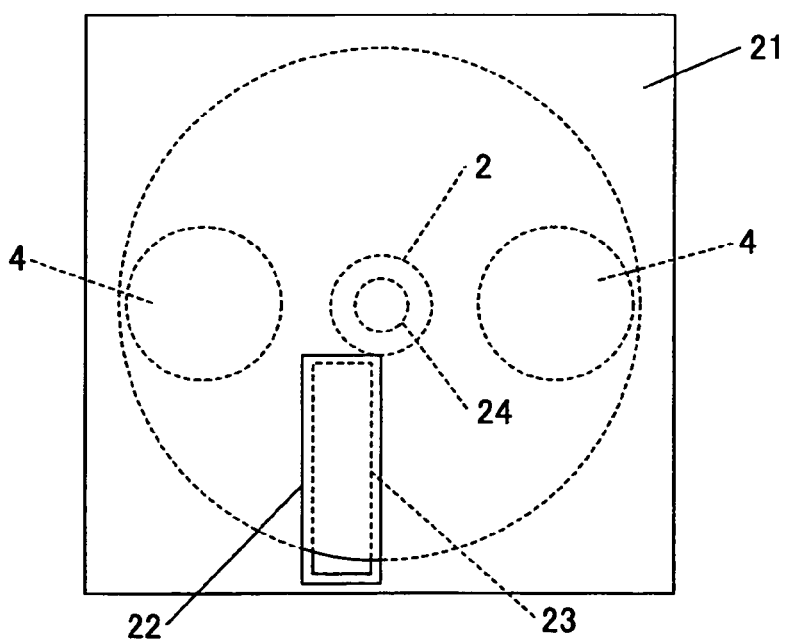

FIG. 20 shows another configuration example of the disk cartridge 21. In FIG. 20, '24' denotes a third through hole for inserting a part of the spindle motor and chucking the optical pickup 1. This configuration in which the through holes 22 and 23 are provided in parallel to a disk radial direction and apart from a central part may be applied for when the configuration example of the main stabilizing member 3, 6 or 9 shown in FIGS. 12, 14 or 16 is applied in which setting is made such that it is shifted in parallel by $\Delta T$ from the disk ridgeline).

Figure 21:
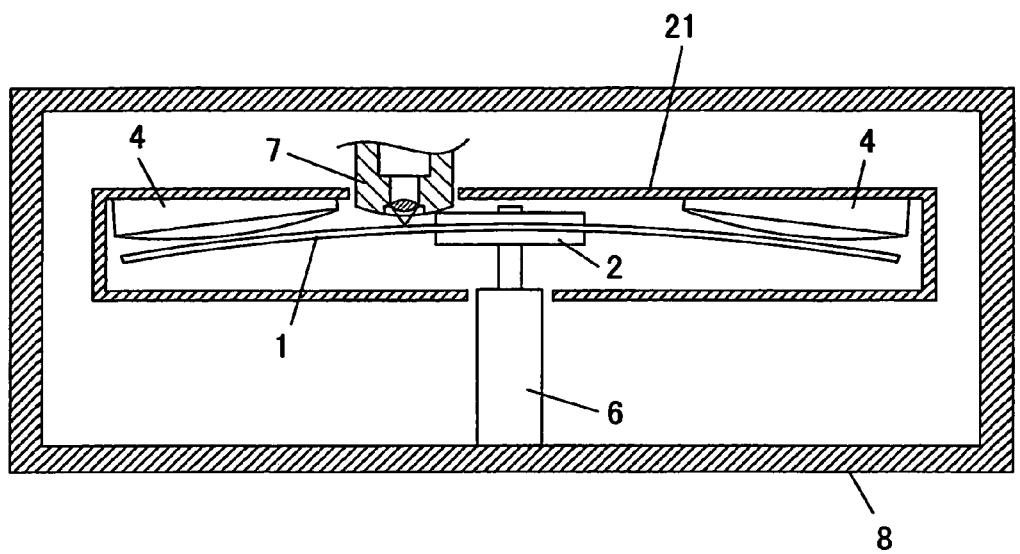
FIG. 21 shows a sectional view of a configuration example in which the main stabilizing member in the present carrying-out mode and the optical pickup are integrated.

FIG. 21 shows further another carrying-out mode of the present invention in which the optical pickup 7 has the function of the main stabilizing member 3 or 5. For example, in this case, the optical pickup 7 is applied for scanning operation in a configuration shown in FIG. 11 with the use of the disk cartridge 21 shown in FIG. 19. For the configuration example of FIG. 21, an example has been described in which the disk cartridge 21 is applied. However, the optical pickup 7 in the recording/reproduction apparatus shown in FIG. 17, not applying the disk cartridge 21, may have the function of the main stabilizing member 3 or 5, in the same manner.

Embodiments according to the first through fourteenth aspects of the present invention and comparison example are described next.

A first embodiment is described.

In the first embodiment, a recording/reproduction apparatus was configured as shown in FIG. 17 applying the spatial relationship of the respective components according to the third carrying-out mode shown in FIG. 3, and also, spatial relationship between the scanning position (the same as that of the optical pickup scanning route R) of the main stabilizing member 3 and the disk ridgeline was as shown in FIG. 11.

The auxiliary stabilizing members 4 had a cylindrical shape each with a diameter of 30 mm and with a functioning surface of a curvature radius of 100 mm facing the optical disk (diameter: 120 mm), and are inclined by 10° each in a disk radial direction shown in FIG. 17. Further, the two auxiliary stabilizing members 4 were provided to sandwich the centre of the optical disk 1, the central position of the functioning surface is positioned at a radius 45 mm and positioned to project for the disk surface by 5 mm with respect to a disk reference plane assuming that the disk is flat.

The main stabilizing member 3 had a cylindrical shape with a diameter of 10 mm, and had a convex surface of a curvature radius of 50 mm facing the optical disk 1. Although not shown, the main stabilizing member 3 was provided with a scanning-direction moving mechanism and a disk-rotational-axis-direction positional control mechanism, and the inclined angle $\Delta\theta$ of its scanning route from the disk ridgeline was 10°. The optical pickup 7 was made to scan the disk surface following scanning of the main stabilizing member 3.

Further, in the first embodiment, as a disk substrate, a polycarbonate-made sheet having a diameter of 120 mm and a thickness of 75 μm was applied. In order to prepare the disk, first, on the above-mentioned sheet, a groove of a pitch of a stamper in 0.6 μm and a width in 0.3 μm was transferred in a thermal transfer manner, after that, films were produced in the order of the sheet/Ag reflective layer of 120 nm/(ZrO—YO)—SiO$_2$ of 7 nm/AgInSbTeGe of 10 nm/ZnS—SiO$_2$ of 25 nm/Si$_3$N$_4$ of 10 nm by spattering. An information recording area was set from an inner diameter of 40 mm up to an outer diameter of 118 mm (radius between 20 and 58 mm). After that, UV resin was coated by a spin coating manner, and was set by ultraviolet ray radiation, and thus a transparent protective layer of a thickness of 5 μm was produced. On the opposite side, a hard coat of a thickness of 10 μm was provided. A hub 2 with an outer diameter of 30 mm, an inner diameter of 15 mm and a thickness of 0.3 mm was mounted at a disk centre. A final state of this disk was such that it was slightly curved on the hard coat side.

This optical disk 1 was rotated at 3180 rpm, the main stabilizing member 3 was made to function at a radius position of 45 mm (line velocity at this position was 15 meters/second), a laser displacement sensor was disposed at a position of the optical pickup 7, and therewith, disk axial runout was evaluated. Further, at the same position, a laser autocollimator was disposed for evaluating disk inclination in a disk circumferential tangential direction and in a disk radial direction. At this time, a disk-rotational-axis-direction position of the main stabilizing member 3 was fixed such that the functioning surface center thereof projects for the disk surface from an optical disk reference plane (surface on the side of the main stabilizing member 3 assuming that the optical disk 1 was flat) by 0.3 mm.

A second embodiment is described.

In the second embodiment, a recording/reproduction apparatus was configured as shown in FIG. 17 applying the spatial relationship of the respective components according to the fourth carrying-out mode shown in FIG. 4, and also, spatial relationship between the scanning position (the same as that of the optical pickup scanning route R) of the main stabilizing member 3 and the disk ridgeline was as shown in FIG. 11.

The auxiliary stabilizing members 4 had a cylindrical shape each with a diameter of 30 mm and with a functioning surface of a curvature radius of 100 mm facing the optical disk (diameter: 120 mm), and are inclined by 10° each in a disk radial direction shown. Further, the two auxiliary stabilizing members 4 were provided to sandwich the centre of the optical disk 1, the central position of the functioning surface is positioned at a radius 45 mm and positioned to project for the disk surface by 5 mm with respect to a disk reference plane assuming that the disk was flat. It is noted that the conditions of the auxiliary stabilizing members were the same as those of the first embodiment.

The main stabilizing member 3 had a cylindrical shape with a diameter of 10 mm, and had a concave surface of a curvature radius of 100 mm facing the optical disk 1. Although not shown, the main stabilizing member 3 was provided with a scanning-direction moving mechanism and a disk-rotational-axis-direction positional control mechanism, and the inclined angle $\Delta\theta$ of its scanning route from the disk ridgeline was 10°.

The optical pickup 7 was made to scan the disk surface following scanning of the main stabilizing member 3. Further, the optical disk 1 the same as that of the first embodiment was applied.

This optical disk 1 was rotated at 3180 rpm, the main stabilizing member 3 was made to function at a radius position of 45 mm (line velocity at this position was 15 meters/second), a laser displacement sensor was disposed at a position of the optical pickup 7, and therewith, disk axial runout was evaluated. Further, at the same position, a laser autocollimator was disposed for evaluating disk inclination in a disk circumferential tangential direction and in a disk radial direction.

At this time, a disk-rotational-axis-direction position of the main stabilizing member 3 was fixed such that the functioning surface center thereof was away from an optical disk reference plane (surface on the side of the main stabilizing member 3 assuming that the optical disk 1 was flat) by 0.2 mm.

A third embodiment is described.

In the third embodiment, a recording/reproduction apparatus was configured to apply a disk cartridge 21 as shown in FIG. 18, and applies the spatial relationship of the respective components according to the first carrying-out mode shown in FIG. 1, and also, spatial relationship between the scanning position (the same as that of the optical pickup scanning route R) of the main stabilizing member 3 and the disk ridgeline was as shown in FIG. 12. As the disk cartridge 21, a type shown in FIG. 20 was applied. The spatial relationships of the respective communications are different among the respective figures, and relationship among a disk curving direction, a rotation direction and a position at which the main stabilizing member 3 functions was based on the mutual spatial relationship shown in FIG. 1.

The auxiliary stabilizing members 4 had a cylindrical shape each with a diameter of 30 mm and with a functioning surface of a curvature radius of 100 mm facing the optical disk (diameter: 120 mm), are inclined by 10° each in a disk radial direction, and were provided on an inner wall of the disk cartridge 21. Further, the two auxiliary stabilizing members 4 were provided to sandwich the centre of the optical disk 1, the central position of the functioning surface is positioned at a radius 45 mm and positioned to project for the disk surface by 5 mm with respect to a disk reference plane assuming that the disk was flat. It is noted that the basic conditions of the auxiliary stabilizing members 4 were the same as those of the first embodiment.

The main stabilizing member 3 had a cylindrical shape with a diameter of 10 mm, and had a convex surface of a curvature radius of 50 mm facing the optical disk 1. Although not shown, the main stabilizing member 3 was provided with a scanning-direction moving mechanism and a disk-rotational-axis-direction positional control mechanism, and the shifting amount $\Delta T$ of its scanning route from the disk ridgeline was 10 mm.

The optical pickup 7 was made to scan the disk surface following scanning of the main stabilizing member 3. Further, the optical disk 1 the same as that of the first embodiment was applied.

This optical disk 1 was rotated at 3180 rpm, the main stabilizing member 3 was made to function at a radius position of 45 mm (line velocity at this position was 15 meters/second), a laser displacement sensor was disposed at a position of the optical pickup 7, and therewith, disk axial runout was evaluated. Further, at the same position, a laser autocollimator was disposed for evaluating disk inclination in a disk circumferential tangential direction and in a disk radial direction. At this time, a disk-rotational-axis-direction position of the main stabilizing member 3 was fixed such that the functioning surface center thereof project for the disk surface from an optical disk reference plane (surface on the side of the main stabilizing member 3 assuming that the optical disk 1 was flat) by 0.3 mm.

A fourth embodiment is described.

In the fourth embodiment, a recording/reproduction apparatus was configured to apply a disk cartridge 21 as shown in FIG. 21, and applies the spatial relationship of the respective components according to the third carrying-out mode shown in FIG. 3, and also, spatial relationship between the optical pickup 7 having the function of the main stabilizing member 3 and the disk ridgeline was as shown in FIG. 13. As the disk cartridge, a type shown in FIG. 19 was applied.

The auxiliary stabilizing members 4 had a cylindrical shape each with a diameter of 30 mm and with a functioning surface of a curvature radius of 100 mm facing the optical disk (diameter: 120 mm), are inclined by 10° each in a disk radial direction, and were provided on an inner wall of the disk cartridge 21. Further, the two auxiliary stabilizing members 4 were provided to sandwich the centre of the optical disk 1, the central position of the functioning surface is positioned at a radius 45 mm and positioned to project for the disk surface by 5 mm with respect to a disk reference plane assuming that the disk was flat. It is noted that the basic conditions of the auxiliary stabilizing members 4 were the same as those of the first embodiment.

The optical pickup 7 having the function of the main stabilizing member 3 had a spherical surface of a curvature radius of 200 mm other than an objective lens, and the objective lens having a surface diameter of 3 mm, a surface curvature radius of 15 mm and NA of 0.85 was embedded. A size of a surface facing the optical disk 1 in the optical pickup 7 was 15 mm in diameter.

Although not shown, the optical pickup 7 was provided with a scanning mechanism in a swinging arm type (radius of 50 mm) as well as a disk-rotational-axis-direction positional control mechanism, and the angle $\Delta\theta$ of its scanning route from the disk ridgeline was approximately 10°. Further, the optical disk 1 the same as that of the first embodiment was applied.

This optical disk 1 was rotated at 3180 rpm, the main stabilizing member 3 was made to function at a radius position of 45 mm (line velocity at this position was 15 meters/second), a laser displacement sensor was disposed at a position of the optical pickup 7, and therewith, disk axial runout was evaluated. Further, at the same position, a laser autocollimator was disposed for evaluating disk inclination in a disk circumferential tangential direction and in a disk radial direction. At this time, a disk-rotational-axis-direction position of the main stabilizing member 3 was fixed in such a position that a surface center thereof coincides with an optical disk reference plane (surface on the side of the main stabilizing member 3 assuming that the optical disk 1 was flat).

A fifth embodiment is described.

In the fifth embodiment, a recording/reproduction apparatus was configured to apply a disk cartridge 21 as shown in FIG. 18, and applies the spatial relationship of the respective components according to the third carrying-out mode shown in FIG. 3. The main stabilizing member 3 was configured to be fixed to extend in the optical pickup 7 moving route direction, and the spatial configuration shown in FIG. 16 was applied.

As the disk cartridge, a type shown in FIG. 20 was applied. In this embodiment, the first through hole 22 shown in FIG. 20 was covered, and the main stabilizing member 3 was provided at the same position.

The auxiliary stabilizing members 4 had a cylindrical shape each with a diameter of 30 mm and with a functioning surface of a curvature radius of 100 mm facing the optical disk (diameter: 120 mm), are inclined by 10° each in a disk radial direction, and were provided on an inner wall of the disk cartridge 21. Further, the two auxiliary stabilizing members 4 were provided to sandwich the centre of the optical disk 1, the central position of the functioning surface is positioned at a radius 45 mm and positioned to project for the disk surface by 5 mm with respect to a disk reference plane assuming that the disk was flat. It is noted that the basic conditions of the auxiliary stabilizing members 4 were the same as those of the first embodiment.

The main stabilizing member 3 was configured to have a surface facing the optical disk in a circular shape in a disk circumferential tangential direction, extend in a disk radial direction, and have a surface curvature radius and a width in a disk circumferential tangential direction changed continuously from a disk inner position through a disk outer position. The surface curvature radius is 50 mm at a position of 20 mm in radius, 5 mm at a position of 60 mm radius, and the same is changed continuously therebetween. The disk-circumferential-tangential-direction width is 12 mm at a position of 20 mm in radius, 3 mm at a position of 60 mm radius, and the same is changed continuously therebetween. Although not shown, the main stabilizing member 3 is provided with a disk-rotational-axis-direction positional control mechanism, and the sifting amount $\Delta T$ of its scanning route from the disk ridgeline was approximately 10 mm.

The optical pickup 4 was made to scan the optical disk 1 along a direction in which the main stabilizing member extended. Further, the optical disk 1 the same as that of the first embodiment was applied.

This optical disk 1 was rotate at 3180 rpm, the main stabilizing member 3 was made to function at a radius position of 45 mm (line velocity at this position was 15 meters/second), a laser displacement sensor was disposed at a position of the optical pickup 7, and therewith, disk axial runout was evaluated. Further, at the same position, a laser autocollimator was disposed for evaluating disk inclination in a disk circumferential tangential direction and in a disk radial direction. At this time, a disk-rotational-axis-direction position of the main stabilizing member 3 was fixed such that a surface center thereof coincides with the optical disk reference plane.

A comparison example is described next.

Figure 22:
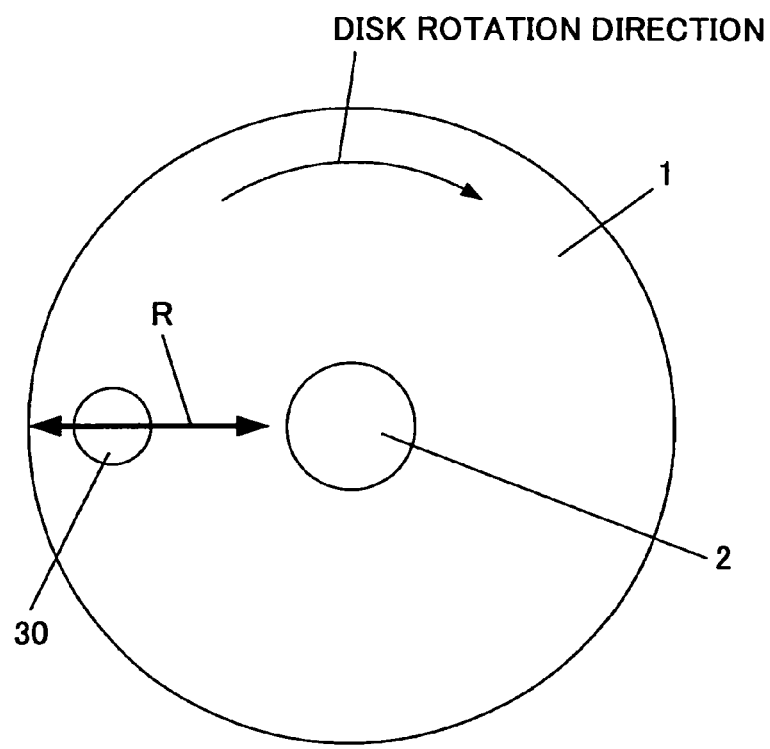
FIG. 22 shows a plan view of a relevant part of a recording/reproduction apparatus as a comparison example.
Figures 23, 24:
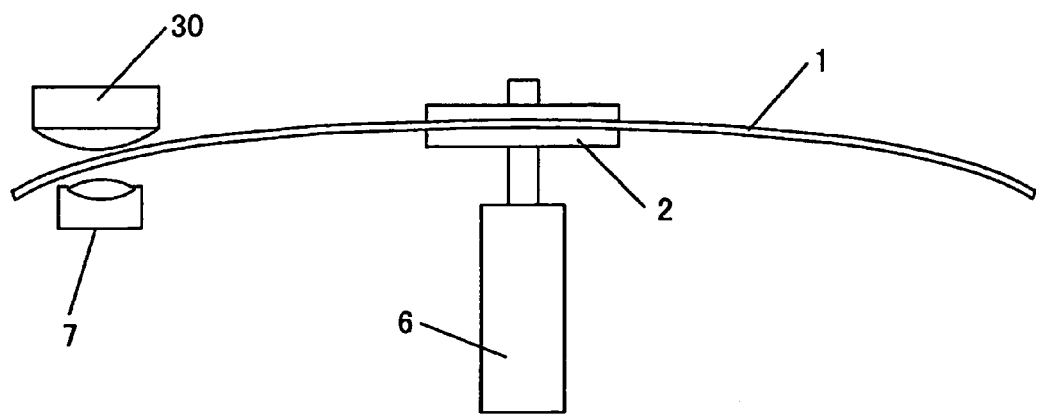
FIG. 23 shows a front view of a relevant part of the recording/reproduction apparatus as the comparison example.
FIG. 24 shows results of measurement of disk axial runout for each radial positioning in embodiments and comparison example.

The comparison example was one shown in FIGS. 22 and 23, in which only one cylindrical stabilizing member 30 was applied. The stabilizing member 30 had an end surface facing the optical disk 1 in a curvature radius of 100 mm, and had a cylindrical shape of an average apparent diameter of 10 mm.

The figures show a minimum necessary configuration for illustration, a detailed control system is omitted therefrom, and the stabilizing member was provided with a disk-radial-direction and disk-rotational-axis-direction moving mechanism.

Also in this comparison example, the optical disk 1 the same as that in the first embodiment was rotated at 3180 rpm. After that, the stabilizing member 30 was disposed so that its functioning surface was in the vicinity of the disk reference plane, and at a position of a disk radius position of 45 mm, with the use of a laser displacement sensor disposed at a position of the optical pickup 7, disk axial runout was measured. Further, at the same position, a laser autocollimator was disposed for evaluating disk inclination in a disk circumferential tangential direction and in a disk radial direction.

FIG. 24 shows measurement results of disk axial runout in each radial position for the present embodiments and the comparison example described above. As shown in FIG. 24, according to the present embodiments (embodiments 1 through 5 corresponding to the first through fifth embodiments described above, respectively), satisfactory axial runout could be obtained. Further, disk-circumferential-tangential-direction and disk-radial-direction disk surface inclination could be controlled within a very small value equal to or less than 0.1° for a portion for which disk axial runout was controlled. Further, these satisfactory disk axial runout characteristics could be obtained without carrying out complicated control of the main stabilizing member, or such. Furthermore, these satisfactory disk axial runout characteristics could be obtained in the vicinity of the disk reference plane.

The difference from the comparison example is clear, and it is understandable that an advantage of the present invention is overwhelming, from the experiment results. In fact, in the comparison example, opposing force of the optical disk 1 against the main stabilizing member 30 was short, sufficient disk axial runout stabilizing effect could not be obtained, and also, due to influence of aerodynamic positive/negative pressure generated upstream/downstream zone of the main stabilizing member 30, the disk surface inclined much in the disk circumferential tangential direction.

The present invention can be applied to a recording/reproduction apparatus carrying out information recording/reproduction to/from a flexible recording disk, and a disk cartridge containing the recording disk. Recording disks to which the present invention is directed to include all of those such as a phase change memory, a magneto-optical memory, a hologram memory and so forth, applied in disk-shaped recording disks.

Carrying-out modes and embodiments according to the fifteenth through twenty-third aspects of the present invention are described next.

Figure 25:
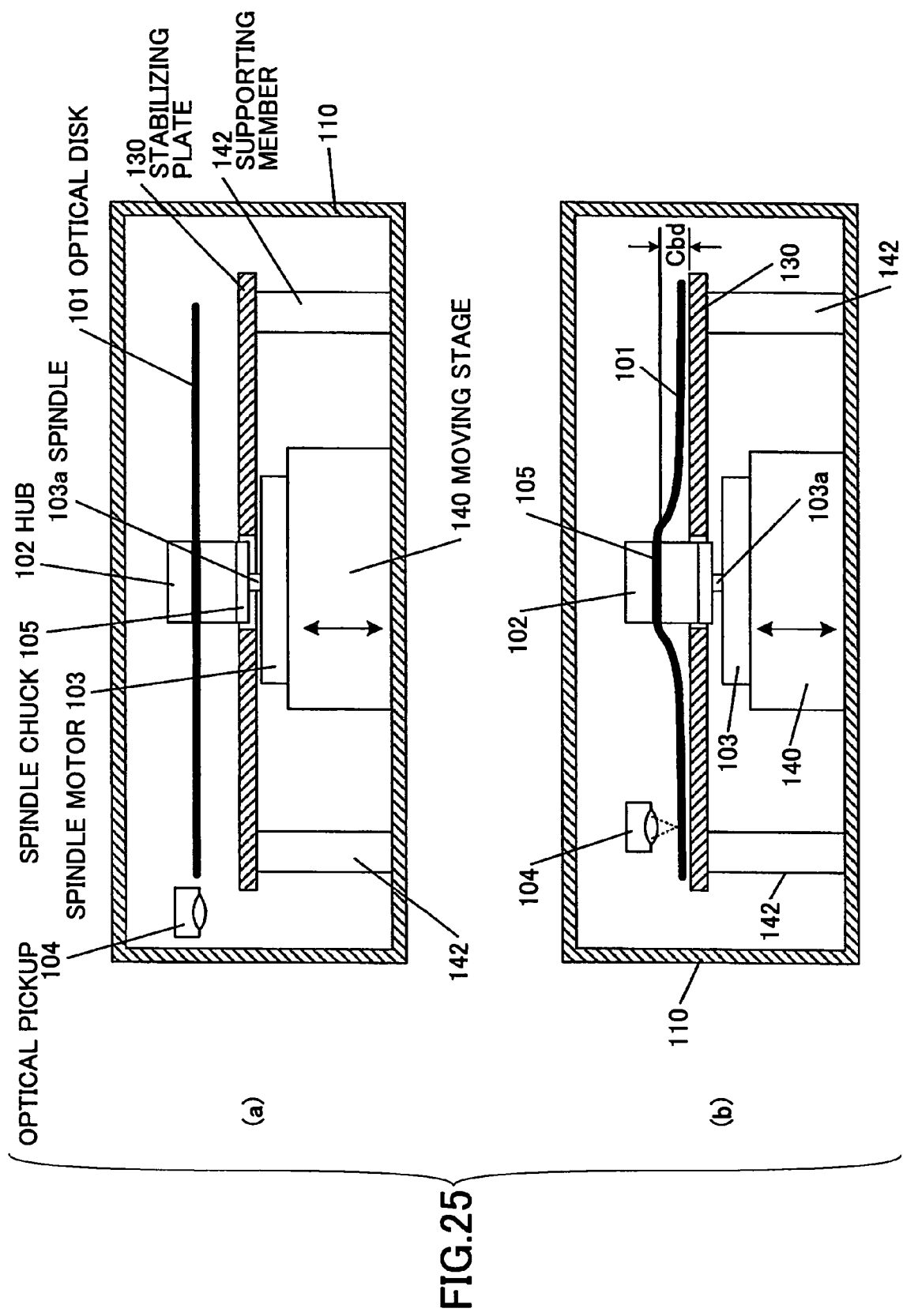
FIG. 25 shows a general configuration of a relevant part of a fifth carrying-out mode of a recording/reproduction apparatus according to the present invention.

FIG. 25 shows a general view of a relevant part of a fifth carrying-out mode of a recording/reproduction apparatus according to the present invention, (a) shows a state of not operating and (b) shows a state of operating.

In FIG. 25, '101' denotes an optical disk which is a flexible optical disk; '102' denotes a hub mounted at a rotation center of the optical disk 101 for holding and rotating the optical disk 101: '103' denotes a spindle motor to actually drive and rotate the optical disk 101; '104' denotes an optical pickup acting as a recording/reproduction unit, moving along a radial direction of the optical disk 101, condensing and applying a light beam on the optical disk 1, and carrying out optical scanning of the optical disk 1 so as to record information to the optical disk or to reproduce information from the same; '105' denotes a chuck for fixing the optical disk 1 onto a spindle 103a; and '110' denotes a housing of the recording/reproduction apparatus.

Further, '130' denotes a flat—plate-shaped stabilizing plate for controlling disk axial runout; '140' denotes a moving stage on which the spindle motor 103 is fixed for adjusting a disk-rotational-axis-direction position of the spindle 103a by being lifted or lowered; and '142' denotes a supporting member for fixing the stabilizing member 130 in the apparatus for setting a position of the stabilizing member 130 in a disk rotational axis direction.

Components such as a pickup scanning mechanism which do not directly relate to the present invention are omitted from the figure.

In the non-operating state of FIG. 25, (a), the optical disk 101 fixed on the spindle 103*a* in its central part is rotated as a result of the spindle motor 103 being started up and thus, the spindle 103*a* being rotated. As a result of the optical pickup 101 being thus rotated, aerodynamic force is generated between the optical disk 101 and the stabilizing plate 130, which results in the optical disk 101 being attracted toward the stabilizing plate 130 as shown in FIG. 25, (b). As a result, a major surface of the optical disk 101 is approximately straightened in a disk radial direction, and also, disk axial runout in this part is effectively reduced. Accordingly, axial runout of the optical disk 1 at least at a recording/reproduction position with the optical pickup 104 is controlled and thus, satisfactory information recording/reproduction is ensured.

Furthermore, according to the fifth carrying-out mode, the moving stage 140 is provided as a disk-rotational-axis-direction positional control part for the spindle motor 103, so as to adjust a distance between the spindle 103*a* and the stabilizing plate 130 in the disk rotational axis direction. Thereby, the stabilizing plate 130 is made to properly function on the optical disk 101 loaded on the spindle 103*a*, and thus, axial runout of the optical disk 1 is stabilized (or axial runout is controlled).

Figure 26:
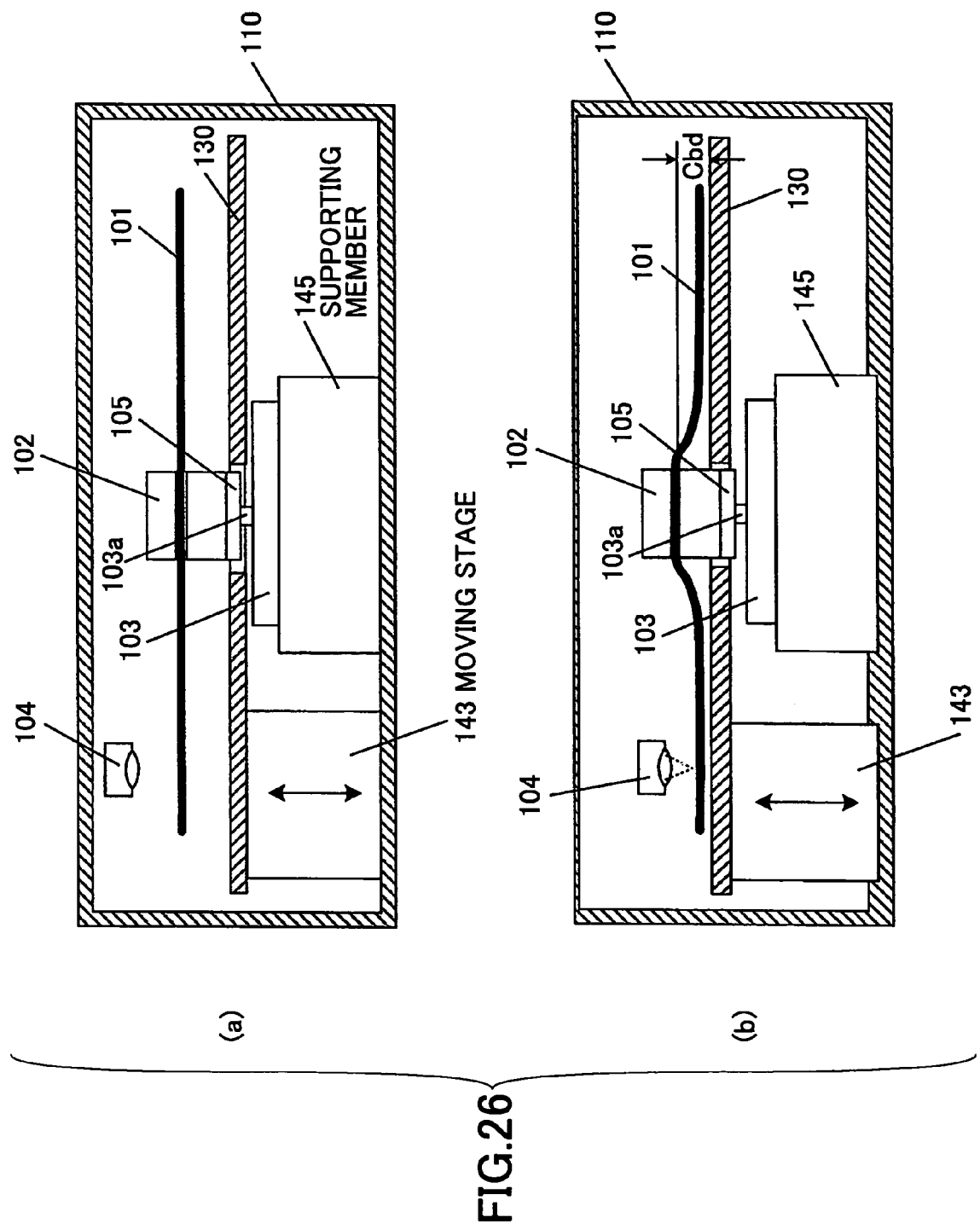
FIG. 26 shows a general configuration of a relevant part of a sixth carrying-out mode of a recording/reproduction apparatus according to the present invention.

FIG. 26 shows a general view of a relevant part of a sixth carrying-out mode of a recording/reproduction apparatus according to the present invention, (a) shows a state of not operating and (b) shows a state of operating. The same reference numerals are given to members already described above, and detailed description therefor is omitted.

In FIG. 26, '143' denotes a moving stage on which the stabilizing plate 130 is fixed for adjusting a disk-rotational-axis-direction position of the stabilizing plate 130 by being lifted or lowered; and '145' denotes a supporting member for fixing the spindle motor 103 in the apparatus for setting a position of the spindle 103*a* in a disk rotational axis direction.

According to the sixth carrying-out mode, the moving stage 143 is provided as a disk-rotational-axis-direction positional control part for the stabilizing plate 130, so as to adjust a distance between the spindle 103*a* and the stabilizing plate 130 in the disk rotational axis direction. Thereby, the stabilizing plate 130 is made to properly function on the optical disk 101 loaded on the spindle 103*a*, and thus, axial runout of the optical disk 1 is stabilized the same as the fifth carrying-out mode.

Figure 27:
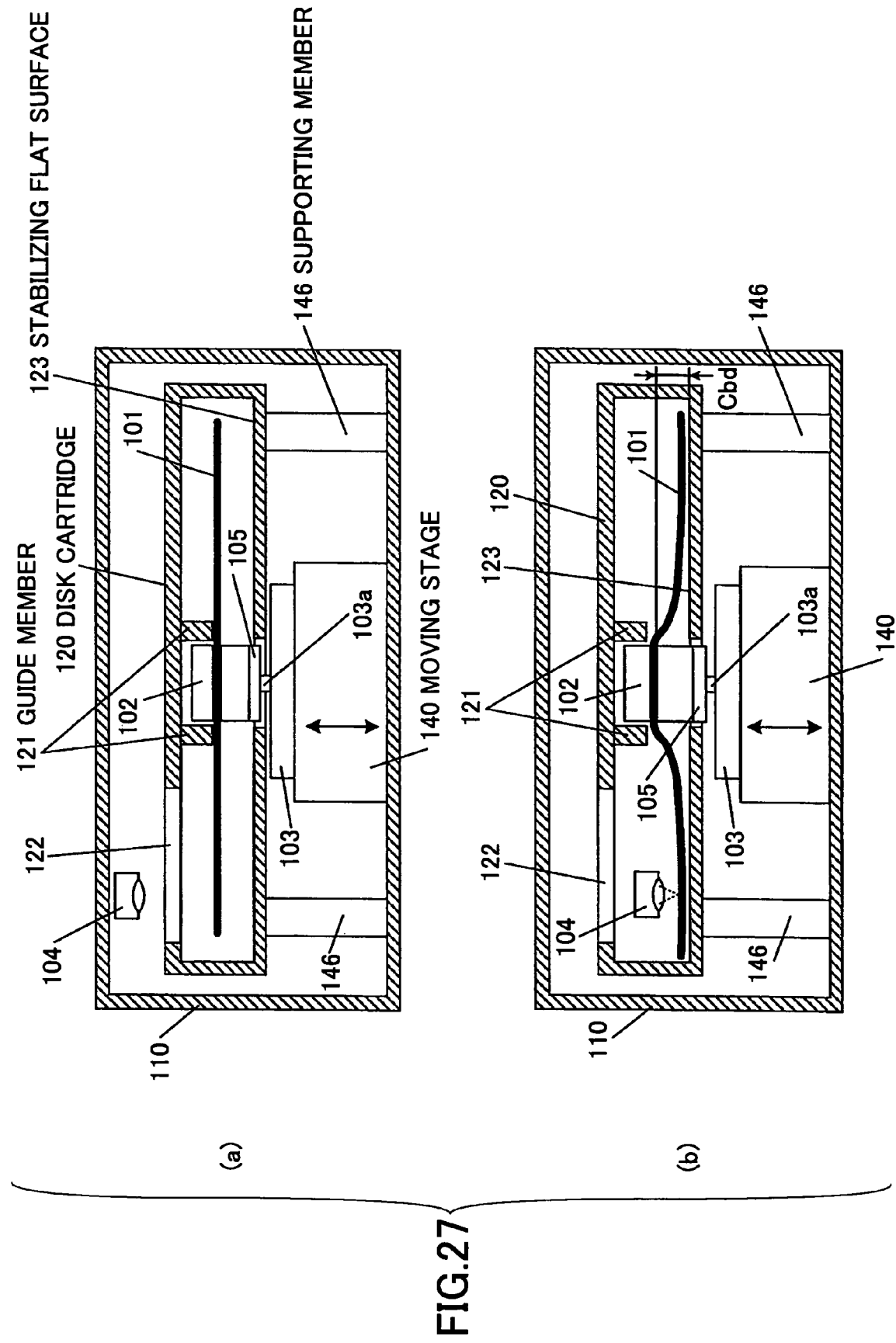
FIG. 27 shows a general configuration of a relevant part of a seventh carrying-out mode of a recording/reproduction apparatus according to the present invention.

FIG. 27 shows a general view of a relevant part of a seventh carrying-out mode of a recording/reproduction apparatus according to the present invention, (a) shows a state of not operating and (b) shows a state of operating.

In FIG. 27, '120' denotes a disk cartridge containing the optical disk 101; '121' denotes a guide member guiding a position of the optical disk 101 in the disk cartridge 120 in such a manner that it may be positioned in a proper position; '122' denotes a slot part enabling the optical pickup 104 to enter/exit the disk cartridge 120; '123' denotes a stabilizing flat surface (inner bottom wall of the disk cartridge in this example) acting as a stabilizing plate for stabilizing axial runout of the optical disk 101; and '146' denotes a supporting member holding and fixing the disk cartridge 120 in the apparatus for adjusting a disk-rotational-axis-direction position of the stabilizing flat surface 123 by setting the disk-rotational-axis-direction position of the disk cartridge 120.

In the seventh carrying-out mode, the stabilizing flat surface 123 is provided inside of the disk cartridge 120. Further, the moving stage 140 is provided as a disk-rotational-axis-direction positional control part for the spindle motor 103, so as to adjust a distance between the spindle 103*a* and the stabilizing flat surface 123 in the disk rotational axis direction. Thereby, the stabilizing flat surface 123 is made properly function on the optical disk 101, and thus, axial runout of the optical disk 1 is stabilized the same as the fifth or sixth carrying-out mode.

Figure 28:
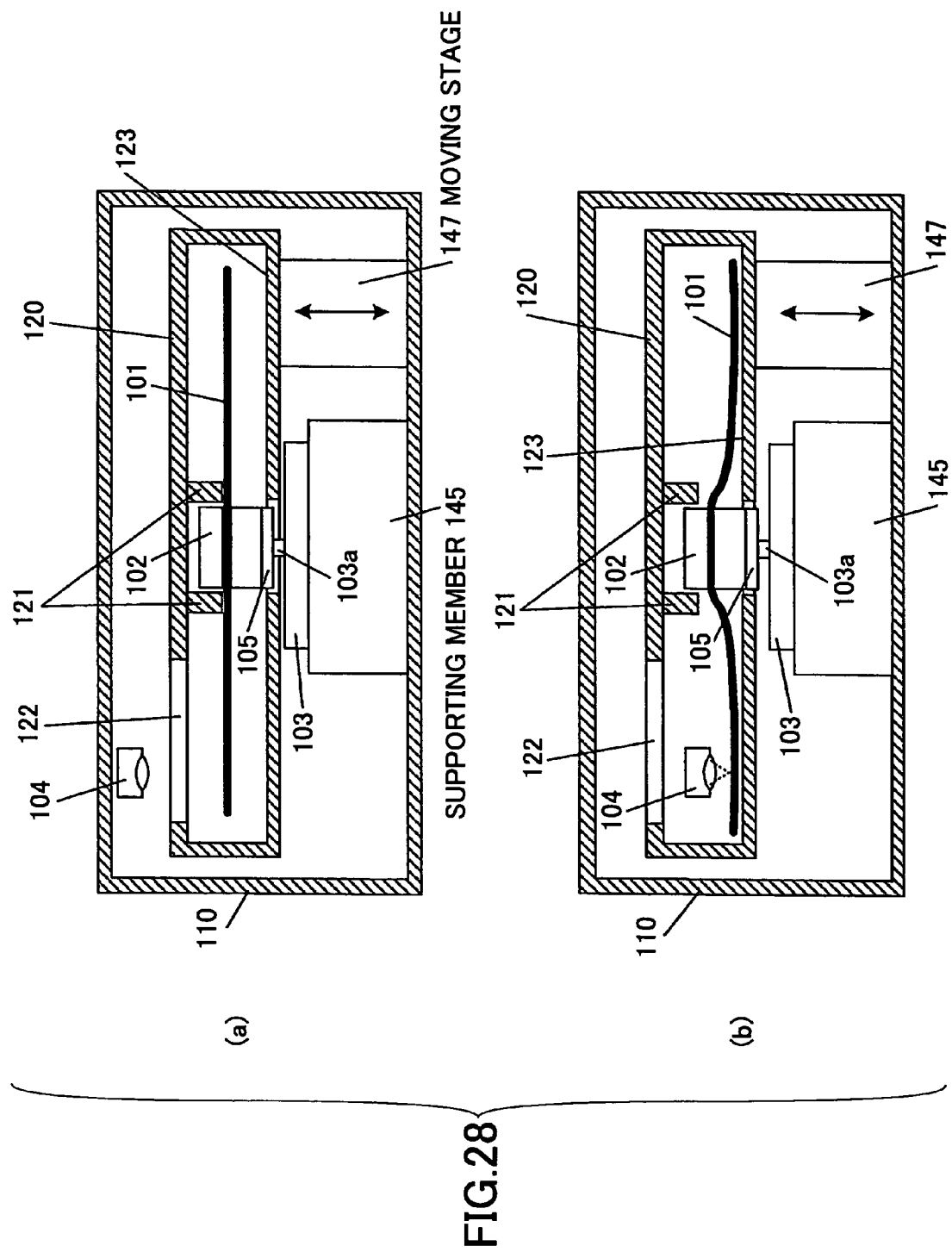
FIG. 28 shows a general configuration of a relevant part of an eighth carrying-out mode of a recording/reproduction apparatus according to the present invention.

FIG. 28 shows a general view of a relevant part of an eighth carrying-out mode of a recording/reproduction apparatus according to the present invention, (a) shows a state of not operating and (b) shows a state of operating.

In FIG. 28, '147' denotes a moving stage acting as a positional control part for holding and fixing the disk cartridge 120, and for adjusting a disk-rotational-axis-direction position of the stabilizing flat surface 123 by adjusting the disk-rotational-axis direction position of the disk cartridge 120.

In the eighth carrying-out mode, the stabilizing flat surface 123 is provided inside of the disk cartridge 120. Then, by controlling a disk-rotational-axis-direction position of the disk cartridge 120, a disk-rotational-axis-direction position of the stabilizing flat surface 123 is adjusted, so that a distance between the spindle 103*a* and the stabilizing flat surface 123 in the disk rotational axis direction is adjusted. Thereby, the stabilizing flat surface 123 is made to properly function on the optical disk 101, and thus, axial runout of the optical disk 1 is stabilized the same as the fifth, the sixth or the seventh carrying-out mode.

Next, operation of the respective carrying-out modes is described.

As a result of various experiments and consideration therefor being carried out for a phenomenon for a case where aerodynamic force is applied on the rotating optical disk by the flat-plate-shaped stabilizing plate, which is a basic operation of each carrying-out mode, it has been found out that specific relationship exists between a 'distance between the optical disk and the stabilizing plate'/a 'disk rotation speed' and disk surface stability, and that, to properly adjust this relationship is very important point for achieving disk surface stability.

Figure 29:
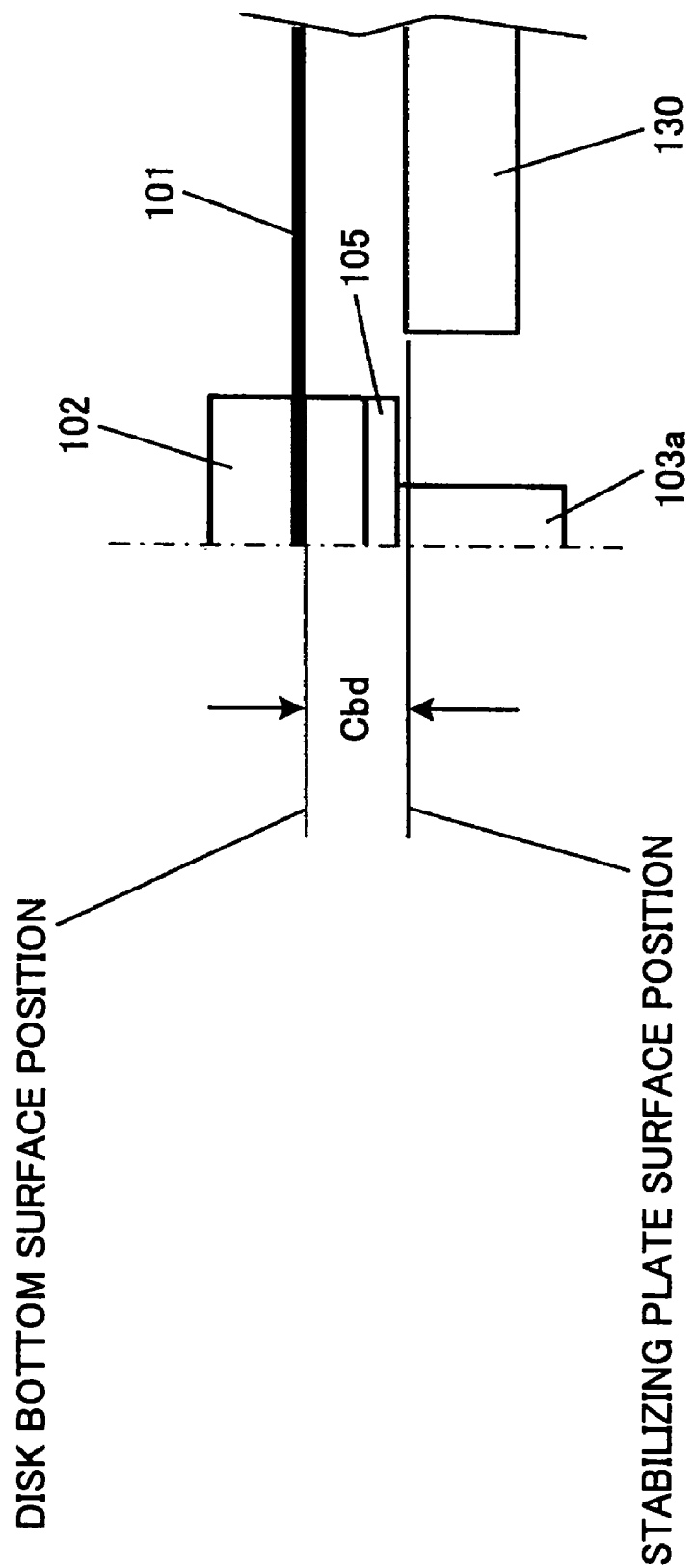
FIG. 29 shows a general configuration around a disk center for illustrating the present carrying-out mode.

The above-mentioned distance between the disk and the stabilizing plate means a gap Cbd, shown in FIG. 29 showing a general view of a disk central portion, between a position of the optical disk 101 surface on the side of the stabilizing plate 130 and a surface position of the stabilizing plate 130. The position of the optical disk 101 surface on the side of the stabilizing plate 130 means a position at which the hub contacts the disk when the hub is applied to sandwich and fix the disk, or a position at which the disk contacts the spindle when the disk is directly fixed to the spindle chuck.

Below, importance of properly adjusting the relationship between the 'distance Cbd between the disk and the stabilizing plate' and the 'disk rotation speed Sr' is described based on experiment data on which study has been made.

Figure 30:
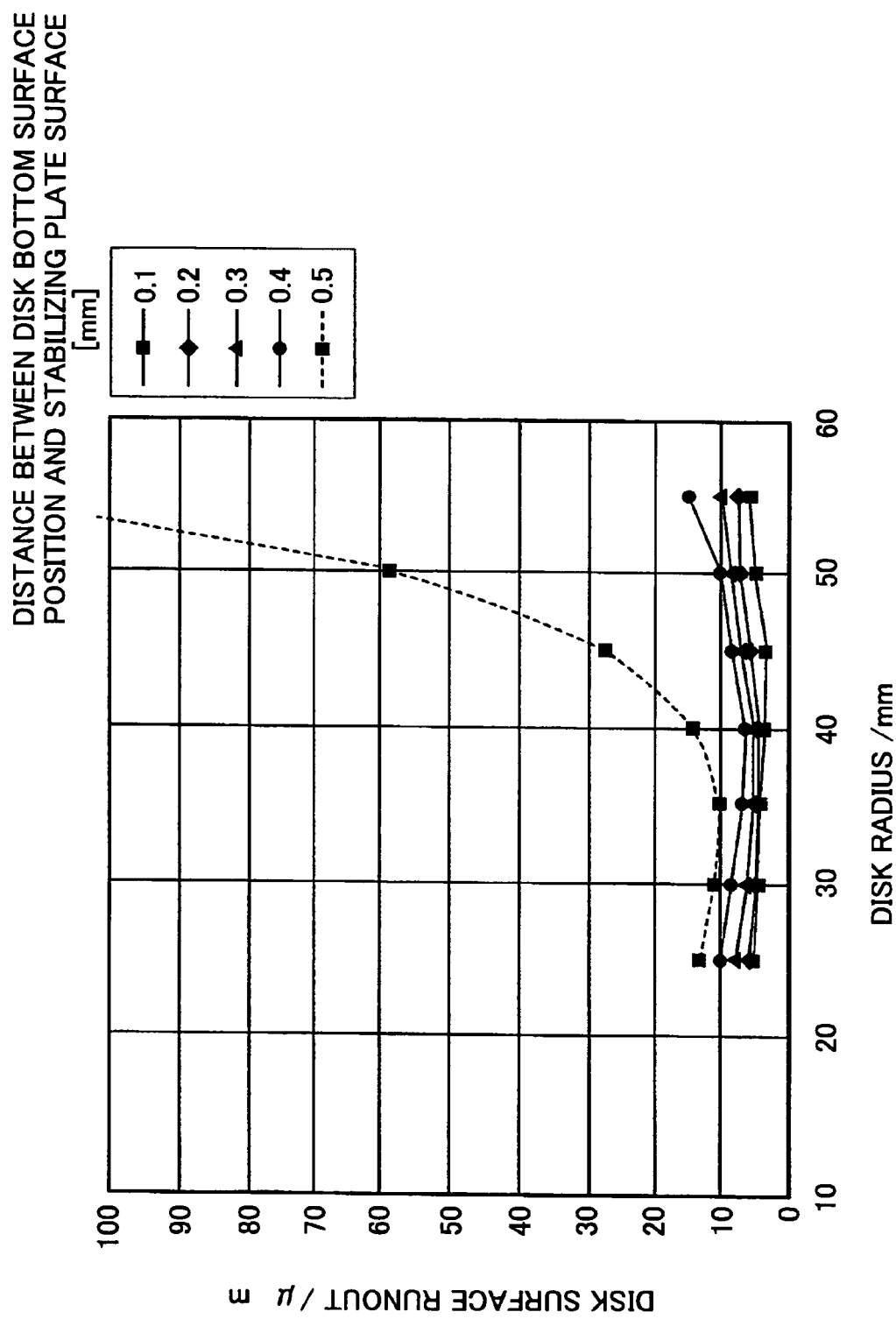
FIG. 30 shows change in axial runout stability along a disk radial direction occurring when a 'distance between a disk and a stabilizing plate' is changed in the present carrying-out mode.

One of important points found out as a result of the inventors and so forth studying the experiment data is that the 'distance Cbd between the disk and the stabilizing plate' should be limited within a specific range for achieving disk stabilization. One example of this result is shown in FIG. 30. FIG. 30 shows a change in axial runout stability throughout a disk radial direction for when the distance Cbd between the disk and the stabilizing plate is changed.

As shown, axial runout stability remarkably switched at a value of the 'distance Cbd between the disk and the stabilizing plate' around 0.4 mm as a border, and axial runout exceeded 100 µm at 0.5 mm. This is one example for a specific rotation speed (6000 rpm). However, even when a disk rotation speed was changed, such an inflection point occurred in the 'distance Cbd between the disk and the stabilizing plate' at which axial runout characteristics switched remarkably, approximately commonly.

As can be seen from FIG. 30, degradation in axial runout started from a disk peripheral portion when this inflection point was exceeded. Aerodynamic force applied to the disk by the stabilizing plate being reduced as the disk is away from the stabilizing plate can be easily presumed as a physical phenomenon, and degradation of axial runout occurring when the 'distance Cbd between the disk and the stabilizing plate' increases can be explained from a fact of existence of a limitation in a zone where the stabilizing plate functions effectively. However, a most important point found out as a result of the inventors and so forth studying eagerly is that this phenomenon was remarkably switched at a specific 'distance Cbd between the disk and the stabilizing plate' as a border.

A second point found out by the inventors and so forth is described next.

A value of the 'distance Cbd between the disk and the stabilizing plate' at which axial runout characteristics was switched remarkably (referred to as Cbdmax, hereinafter) drew a specific curve. Specifically, such a phenomenon appeared that this value increases along with increase in a disk rotation speed in a low rotation speed zone, while the same decreases along with increase in a disk rotation speed in a high rotation speed zone.

Figure 31:
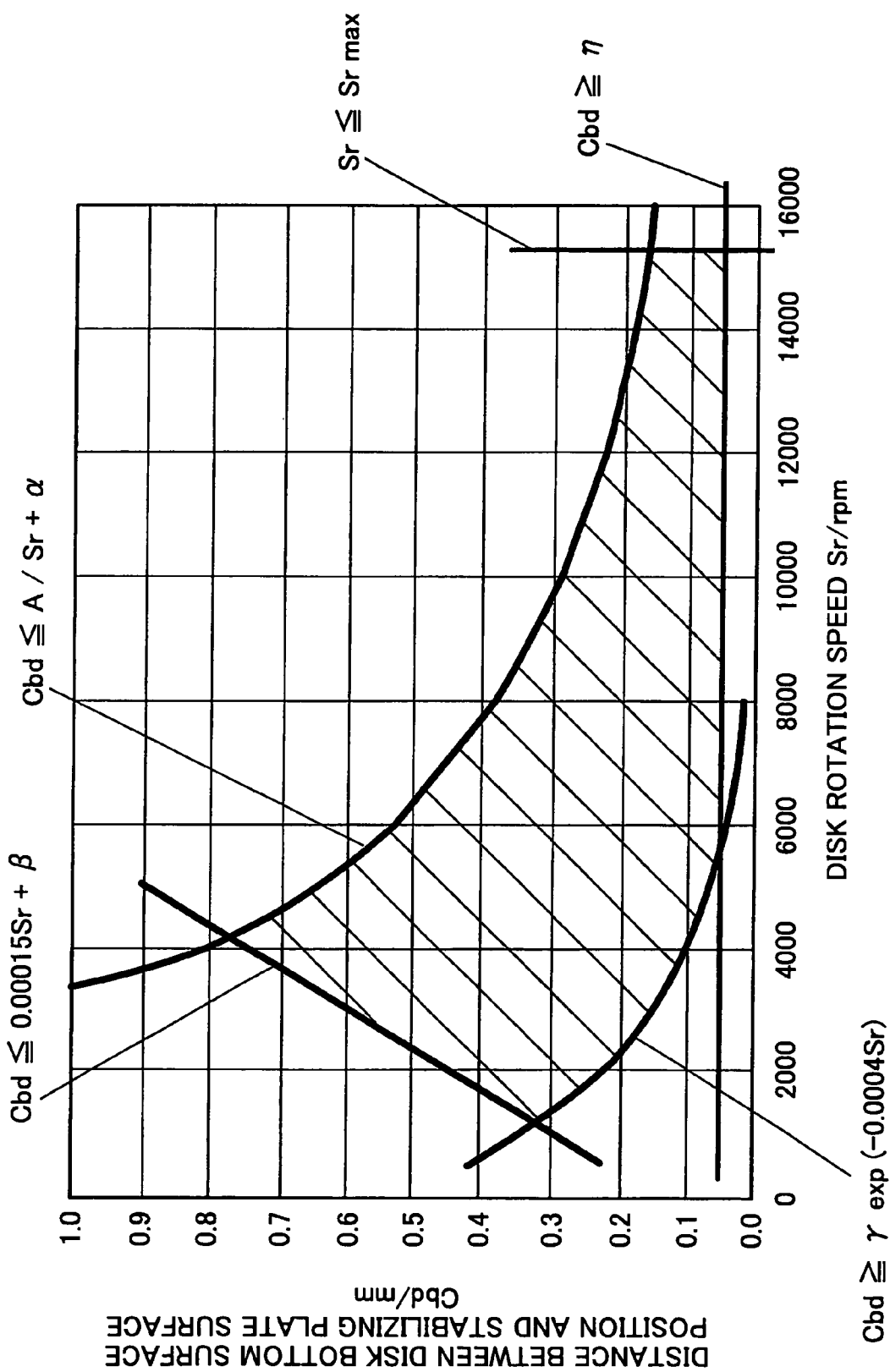
FIG. 31 shows a determination curve of a value Cbdmax of 'a distance Cbd between a disk and a stabilizing plate' of sharp change in axial runout stability in the present carrying-out mode.

FIG. 31 shows a general view of this curve. FIG. 31 shows a range of a 'distance Cbd between the disk and the stabilizing plate' in which a disk can be stabilized by means of the stabilizing plate where the ordinate axis denotes a distance Cbd between a disk and a stabilizing plate' and the abscissa axis denotes a disk rotation speed.

A cause of the phenomenon in which Cbdmax increase in a low rotation speed zone may be that function force of the stabilizing plate increases as a flow rate or air flow generated in the vicinity of the disk surface increases along with increase in the disk rotation speed. A cause of the phenomenon in which Cbdmax decreases in a high rotation speed zone may be that vibration in the disk rotational axis direction increases along with increase in the disk rotation speed, and larger functioning force is required for controlling the vibration so that functioning force of the stabilizing plate should be increased by reducing the 'distance Cbd between the disk and the stabilizing plate' for sufficiently controlling disk axial runout.

The second point found out by the inventors and so forth from eager study is that the above-mentioned 'Cbdmax behaves differently in a low disk rotation speed zone and a high disk rotation speed zone, and has a specific profile with respect to the disk rotation speed'.

The inventors and so forth found out that the above-mentioned Cbdmax can be expressed by $Cbd\text{max}=0.00015Sr+\beta$ for a low rotation speed zone, while, by $Cbd\text{max}=A/Sr+\alpha$ for a high rotation speed zone.

A phenomenon was complicated for a low rotation speed zone and Cbdmax varied due to influence of slight disk distortion occurring upon disk chucking. The above-mentioned formulas are obtained in consideration of the variation. A disk surface could be properly stabilized as long as Cbdmax expressed by the formula was not exceeded.

A, $\alpha$ and $\beta$ in the above-mentioned formulas are arbitrary constants. A is a constant determined from a disk base material, had a value of approximately the order of (1E3), and tended to have a larger value for a disk base material having a large Young's modulus. For example, a value of A was around 3500 for polycarbonate having Young's modulus of approximately 2.5 GPa, while, a value of A was around 2500 for polyethylene terephthalate having Young's modulus of approximately 5.5 GPa.

$\alpha$ is determined mainly from a film thickness of a disk base material, has a value of approximately the order of (1E-1), and tended to have a larger value as the film thickness increased. For example, $\alpha$ was around −0.1 when polycarbonate was applied as a disk base material, and changed according to a disk film thickness.

$\beta$ is a constant relating to flatness of a recording disk, has a value of approximately the order of (1E-1), and tended to increase as distortion in the disk increases. For example, $\beta$ was around +0.3 when polycarbonate was applied as the disk base material, and decreased as distortion of the disk increased.

On the other hand, as shown in FIG. 31, a lower limit Cbdmin also existed for achieving disk surface stabilization on the side of reducing the 'distance Cbd between the disk and the stabilizing plate'. This lower limit Cbdmin was limited by a phenomenon of contacting/sliding between the disk and the stabilizing plate. It can be easily presumed that, as the 'distance Cbd between the disk and the stabilizing plate' is reduced much, the disk and the stabilizing plate contact or slide on one another, which situation is not suitable for driving the recording/reproduction apparatus. An important point is that, not only Cbdmax but also Cbdmin changed along with change in a disk rotation speed. Cbdmin decreased along with increase in the disk rotation speed in a low rotation speed zone, and after that, had a fixed value. A fact that 'Cbdmin has a specific profile with respect to a disk rotation speed' is a third point found out from eager study by the inventors and so forth.

Further, the present inventors and so forth found out the Cbdmin can be expressed by $Cbd\text{min}=\gamma\exp(-0.0004Sr)$ for a low rotation speed zone, and $Cbd\text{min}=\eta$ for a high rotation speed zone. $\gamma$ is a constant mainly relating to flatness of a recording disk, as same as $\beta$. $\gamma$ had a value of approximately the order of (1E-1), and tended to increase as distortion of the disk increased. For example, when polycarbonate was applied as a disk base material, $\gamma$ has a value around +0.25, and increased as distortion of the disk increased.

$\eta$ is also a constant mainly relating to flatness of a recording disk the same as $\beta$ and $\gamma$, and increased as distortion of a disk increased. Actually, $\eta$ has a fixed value in the vicinity of approximately +0.05 unless a recording disk degraded in flatness much and had large distortion. This value was a typical value of $\eta$. A recording disk having large $\eta$, i.e., having a large distortion was not stabilized by a flat-plate-shaped stabilizing plate, and, practically, it was important to apply a disk having reduced distortion.

From the above-mentioned three points, a specific condition range for stabilizing a disk by means of a flat-plate-shaped stabilizing plate was determined, and disk stabilization could be achieved by adjustment within this limited range. This range was specified by the following inequalities:

$Cbd \leq A/Sr+\alpha;$ $Cbd \leq 0.00015Sr+\beta;$ $Cbd \geq \gamma \exp(-0.0004Sr);$ and $Cbd \geq \eta$ As described above, A, α, β, γ and η are arbitrary constants determined from disk specification such as disk base material, thickness, distortion and so forth.

It is noted that an upper limit of a disk rotation speed is limited by the above-mentioned inequalities basically. However, practically, a limitation range of $Sr \leq Srmax$ determined by a rotation speed limitation/threshold Srmax of the spindle motor 103 should also be taken into account. Depending on disk specification, this range was a limitation range for stabilization. FIG. 31 shows a case where a disk rotation speed upper limit is limited by the critical rotation speed of the spindle motor 103.

Thus, in order to stabilize a disk by means of a flat-plate-shaped stabilizing plate, a specific condition range shown in FIG. 31 is very important. Taking these points into account, apparatus configuration, driving method and disk cartridge configuration have been created for achieving disk stabilization in this specific condition range.

The fifth through eighth carrying-out modes embody apparatus configurations for carrying out recording/reproduction driving in the above-mentioned specific condition range. In each of all these carrying-out modes, mutual position in the disk rotational axis direction between the spindle 103a holding the optical disk 101 and the stabilizing plate 130 (123) is adjusted. Thereby adjustment of the 'distance Cbd between the disk and the stabilizing plate' in the range of Cbdmin and Cbdmax is intended actually.

In order to stabilize a disk by means of a flat-plate-shaped stabilizing plate, it is important to adjust a 'distance Cbd between the disk and the stabilizing plate' in the specific condition range shown in FIG. 31. For this purpose, a driving method may be applied in which, with the use of recording/reproduction apparatuses in the above-mentioned carrying-out modes, an adjustment pattern of the above-mentioned mutual position with respect to a disk rotation speed is stored, and the mutual position (distance) is adjusted according to a disk rotation speed upon actual recording and/or reproduction.

Figure 32:
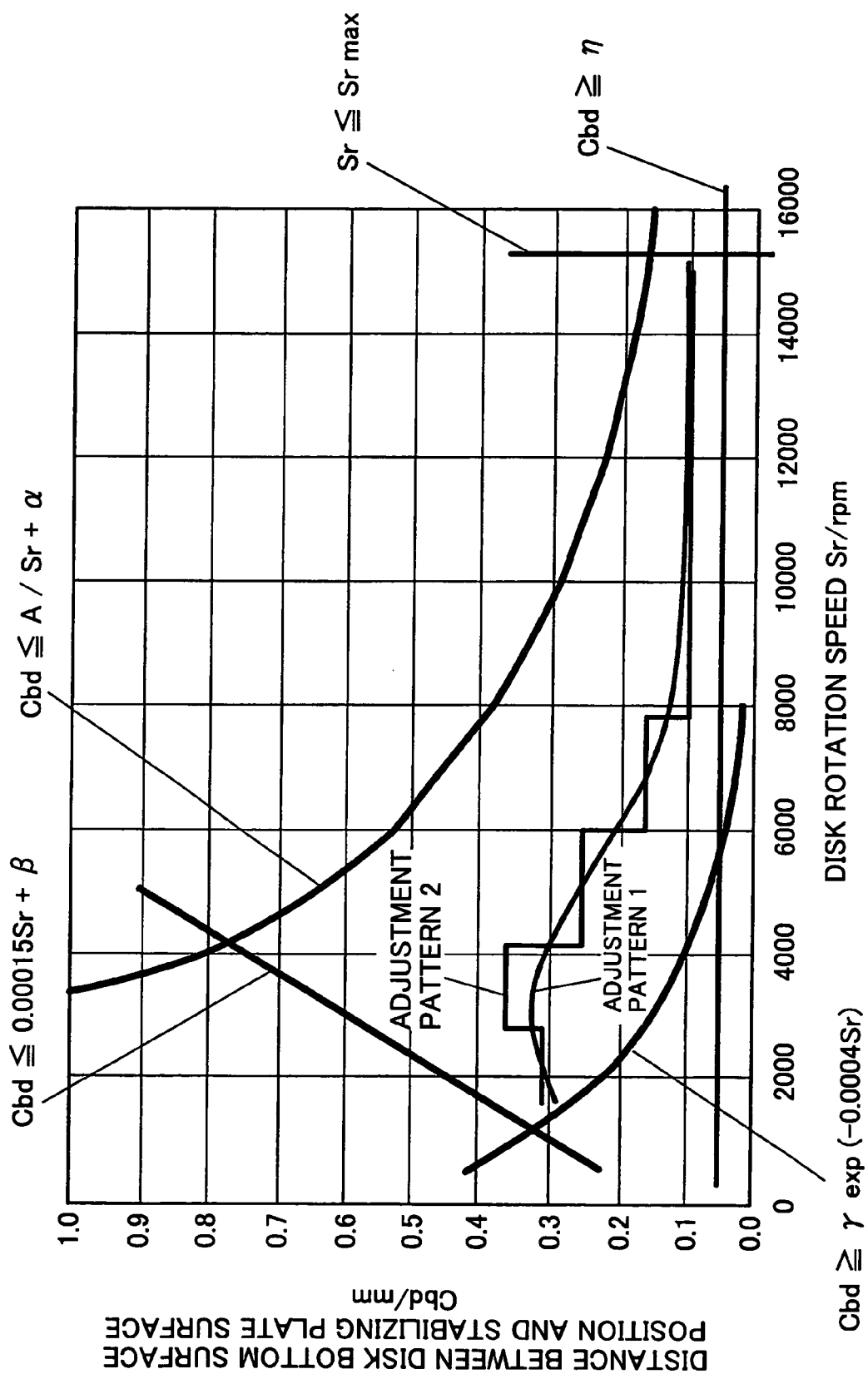
FIG. 32 shows conditions (adjustment patterns) by which, in a specific zone of a stabilization condition range in the present carrying-out mode, very small disk axial runout is obtained throughout the disk entire surface.

As the adjustment pattern, as shown in FIG. 32, an adjustment pattern 1 in which a 'distance Cbd between a disk and a stabilizing plate' is continuously changed, or an adjustment pattern 2 in which the same is changed stepwise, with respect to a disk rotation speed, may be applied. With the use of any pattern, the effect can be sufficiently obtained.

Further, a plurality of the above-mentioned adjustment patterns for a case where a disk configuration is changed may be stored, and an appropriately one thereof may be selected according to each particular disk configuration to apply. Thereby, a change in disk specification can be easily and rapidly dealt with.

After various experiments were carried out, it was found out that, in a condition in which a disk was properly stabilized by means of the stabilizing plate 130 (123), a tilt angle in a disk radial direction in the periphery of the disk was in the vicinity of zero, i.e., the disk surface was horizontal.

Figure 33:
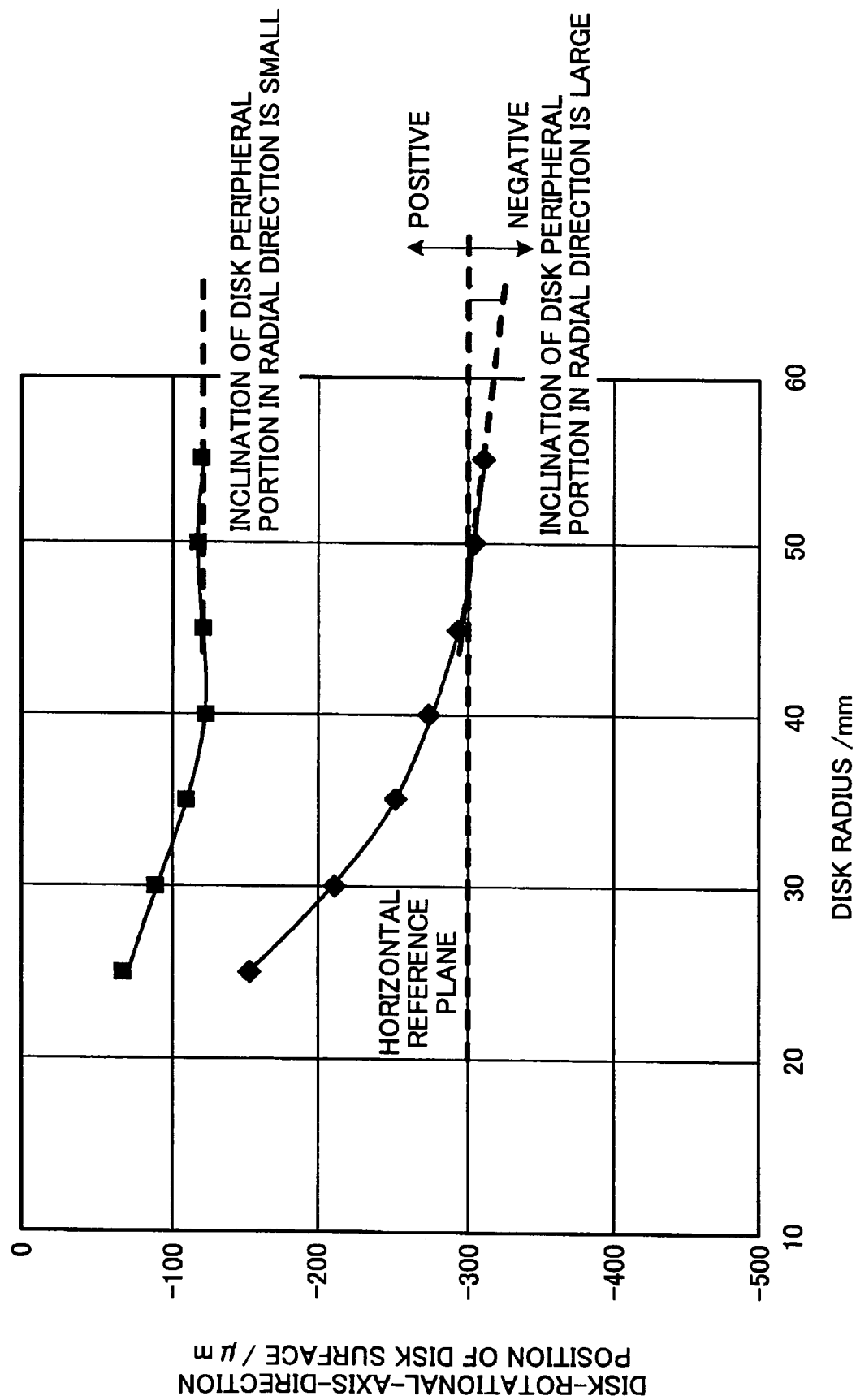
FIG. 33 illustrates disk shapes in a disk radial direction in one case where disk surface stabilization is property carried out and another case.

FIG. 33 shows a disk shape for when a disk surface is properly stabilized or not. One having a small inclination of a disk peripheral part is a result of proper stabilization, while the other is a result of not proper stabilization. The tilt angle there is an inclination of a disk surface in a disk radial direction with respect to a horizontal surface (a surface perpendicular to a disk rotational axis), and positive/negative directions are those shown.

Based on the result, consideration was made for a recording/reproduction apparatus provided with a tilt angle detection mechanism and for a driving method therefor. For example, as shown in FIG. 34, when the tilt angle is adjusted in a specific range between −0.1° and +0.1°, axial runout stability throughout the entire disk surface can be controlled within 20 μm.

Figure 34:
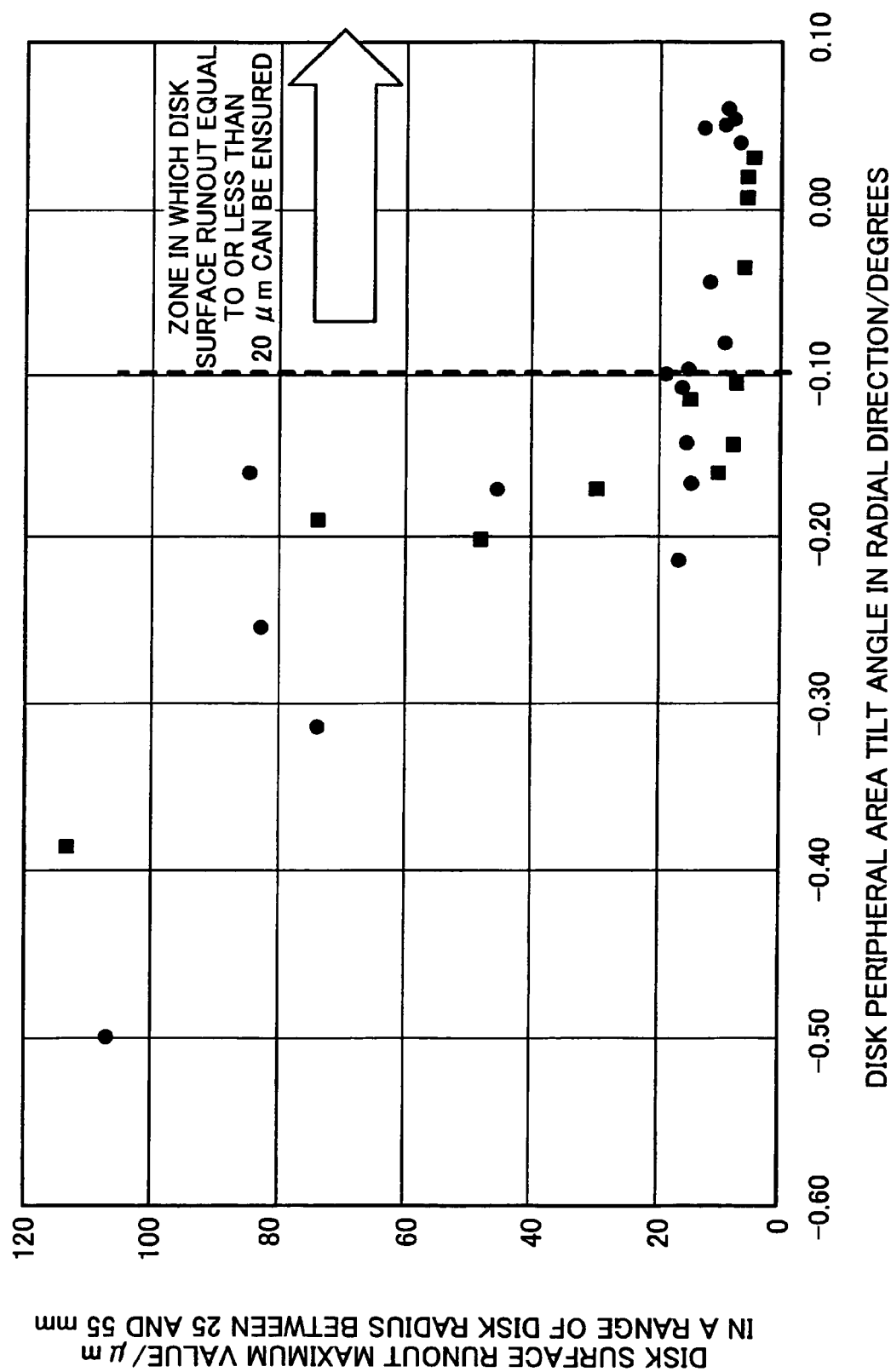
FIG. 34 shows relation between a tilt angle and axial runout stability for optical disks having different disk specifications.
Figure 35:
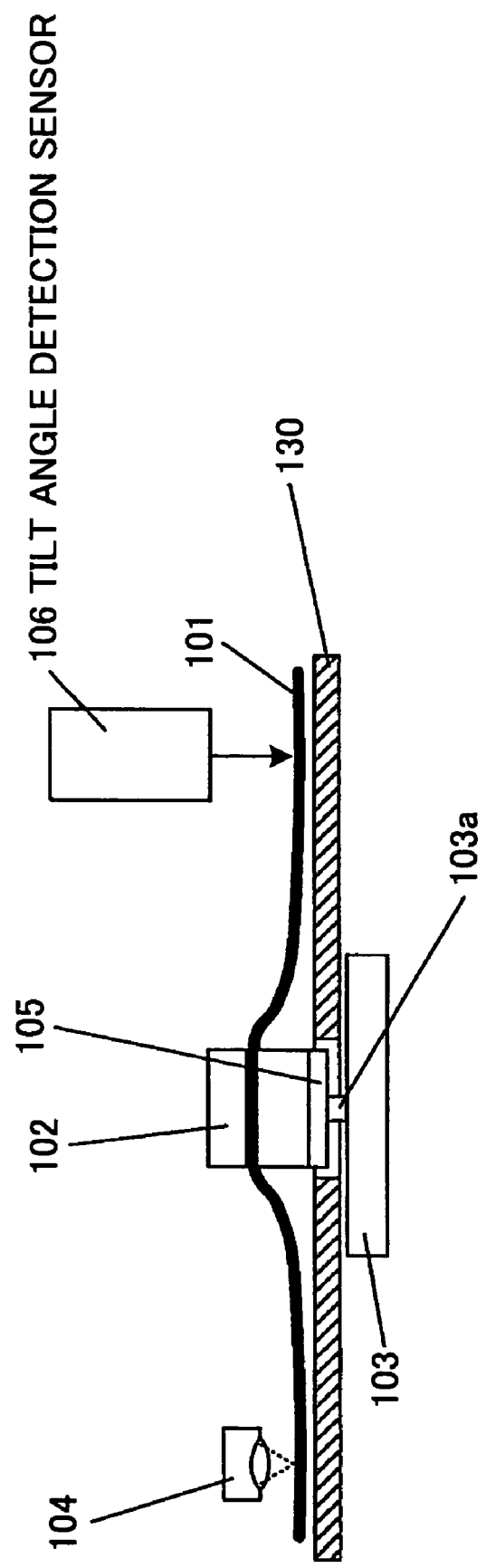
FIG. 35 shows a general configuration illustrating an example of setting of a tilt angle sensor in the present carrying-out mode.

FIG. 34 shows relationship between a tilt angle at a disk periphery 50 mm position detected by a tilt angle detection sensor 106 shown in FIG. 35 and axial runout stability (black circle marks and black square marks in FIG. 34 represent detected data values for different disk specifications).

Figure 36:
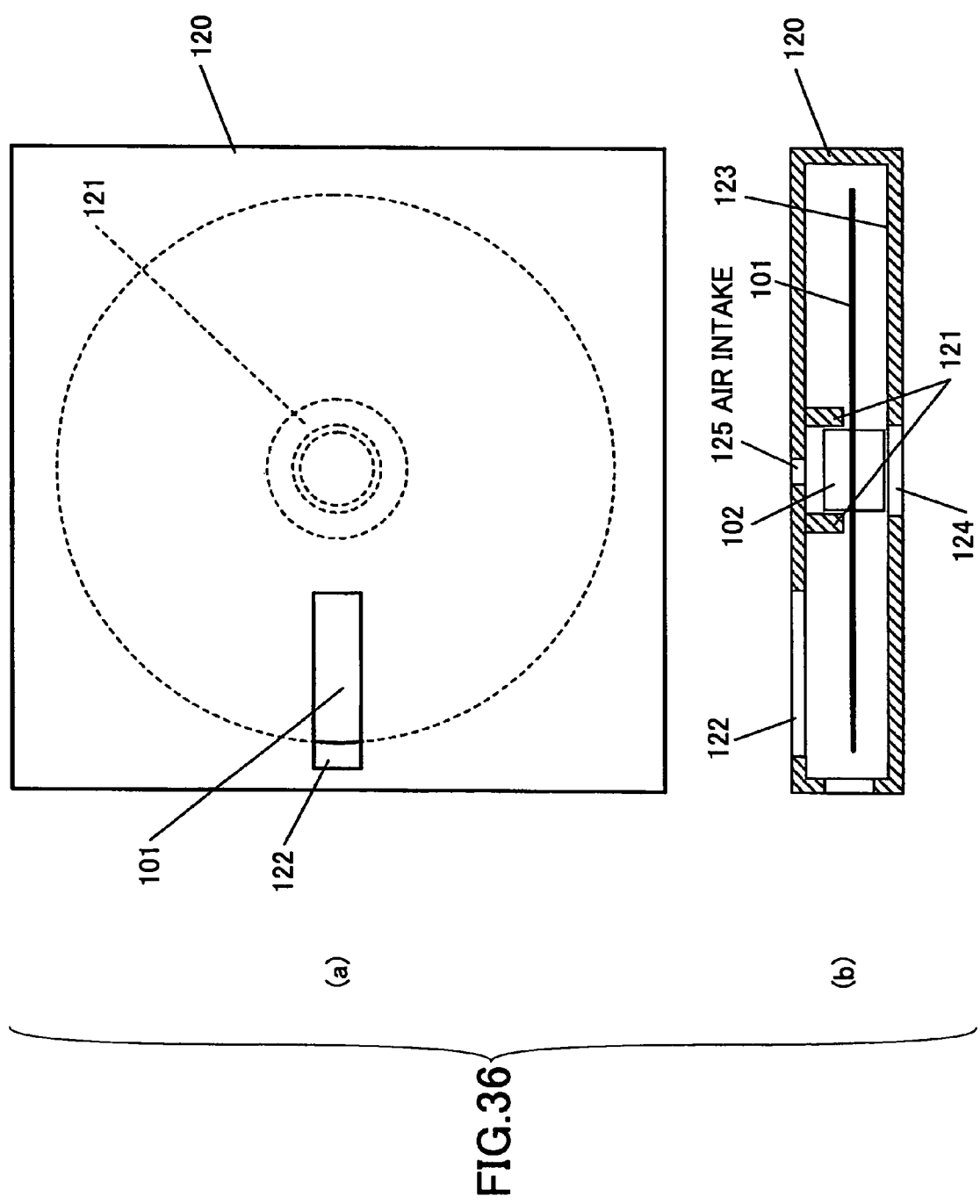
FIG. 36 shows a configuration example of a disk cartridge applied in the carrying-out modes 7 and 8.

FIG. 36 shows a configuration example of a disk cartridge applied in the seventh and eighth carrying-out modes, (a) shows a plan view and (b) shows a cross-sectional view.

In FIG. 36, the same reference numerals are given to members already described for FIGS. 27 and 28, and description is omitted. 124 denotes an opening part for inserting the spindle 103a for fitting the spindle 103a to the optical disk 101 in the disk cartridge 120.

It is noted that, in operation of the apparatus according to each carrying-out mode, accuracy should be ensured for many parts for accurately setting a 'distance Cbd between a disk and a stabilizing plate' such as flatness accuracy of the stabilizing plate, a mounting accuracy of the stabilizing plate in the apparatus body, a mounting accuracy of the spindle in the housing, a shape accuracy of the disk central hub, and so forth. Depending on a particular portion, it is preferable that the part shape accuracy and assembling accuracy are managed within a range of ±0.01 mm.

Actually, the maximum value of inclination between a disk surface on the side of the stabilizing plate in a condition in which a disk is mounted on a spindle and the stabilizing plate surface should be preferably within 0.1°, and also, an adjustment error of the mutual position in a disk rotational axis direction should be preferably within +0.02 mm. The disk surface means a surface on which the hub and the disk contact with one another when the disk is fixed as a result of being sandwiched by the hub, or a surface on which the disk and the spindle contact with one another when the disk is directly fixed on the spindle chuck without the use of the hub.

Further, in the present carrying-out modes, a measure not to obstruct a behavior of air flowing on the disk surface is needed. Description is made for this point taking an example of the disk cartridge 120 containing the optical disk 101, below.

Figure 37:
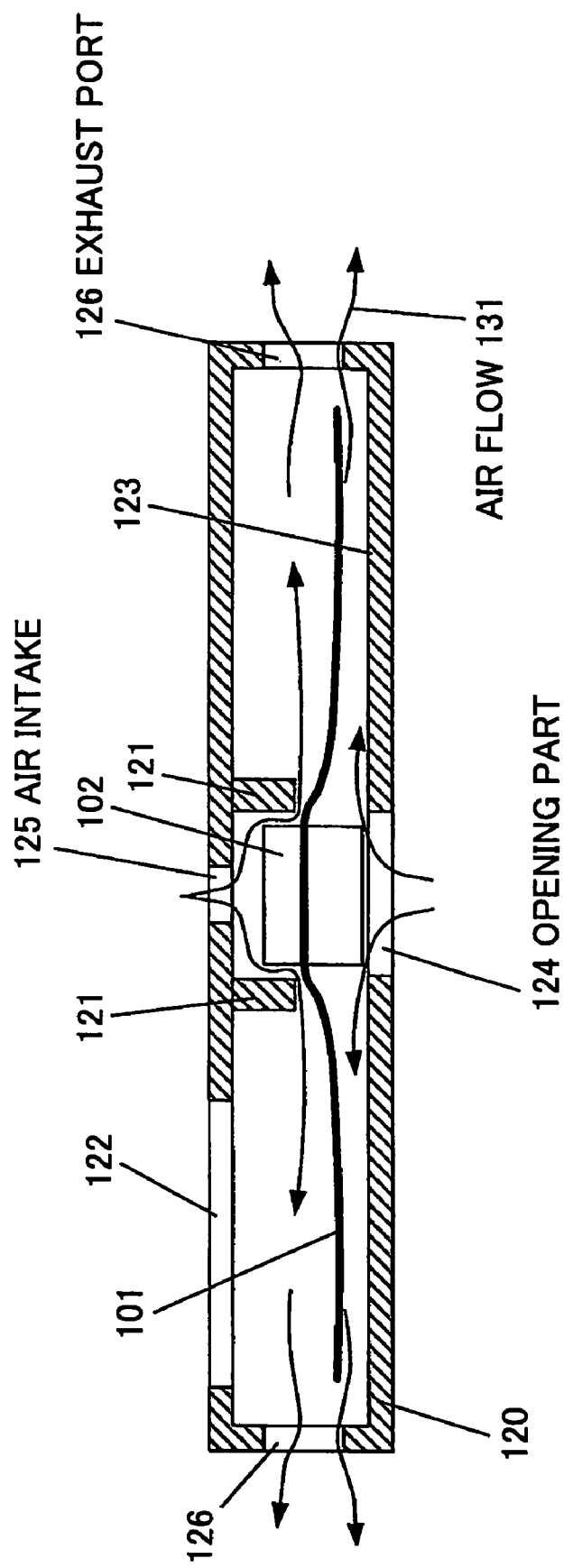
FIG. 37 shows a general sectional view illustrating a state in which the disk is stabilized by means of a stabilizing flat surface in a disk cartridge according to the present carrying-out mode.

FIG. 37 shows a general sectional view illustrating a state in which the disk is stabilized by means of the stabilizing flat surface in the disk cartridge, '125' denotes an intake vent (air intake), '126' denotes an exhaust vent (exhaust port), and '131' denotes an air flow.

In FIG. 37, when the optical disk 101 is rotated, air flows 131 are generated basically from an inner end for an outer end on both sides, and, these air flows have an important role even after the stabilizing flat surface 123 stabilizes the optical disk 101. In order not to obstruct the air flows 131 from the disk inner end to the disk outer end, air is introduced externally in the disk cartridge 120 via the intake vent 125 produced in a central part in the disk cartridge 120 of FIG. 36, or the exhaust vent is provided for discharging air externally from the disk cartridge 120 smoothly in the disk periphery after the air flows from the disk inner end toward the outer end. Further, the opening part 124 for fixing the optical disk 101 on the spindle 103*a* also functions as an air introduction mouth on the opposite side of the intake vent 125.

Thus, on both sides of the optical disk 101, the measures are provided for smooth flow of the air flows 131 from the inner end to the outer end. In this disk cartridge 120, 16 exhaust vents 126 were provided at peripheral positions equally dividing the circumference by 16. There, at least for the intake vent 125 and the opening part 124 of the disk cartridge 120, filters should be provided for avoiding entrance of dust/dirt externally in the disk cartridge 120, and also, the same filter may preferably be provided for the exhaust vent 126. The above-mentioned thought for the air flows 131 should be applied not only for the disk cartridge 120 but also for a configuration such as that of the fifth or sixth carrying-out mode in the same manner.

Figure 38:
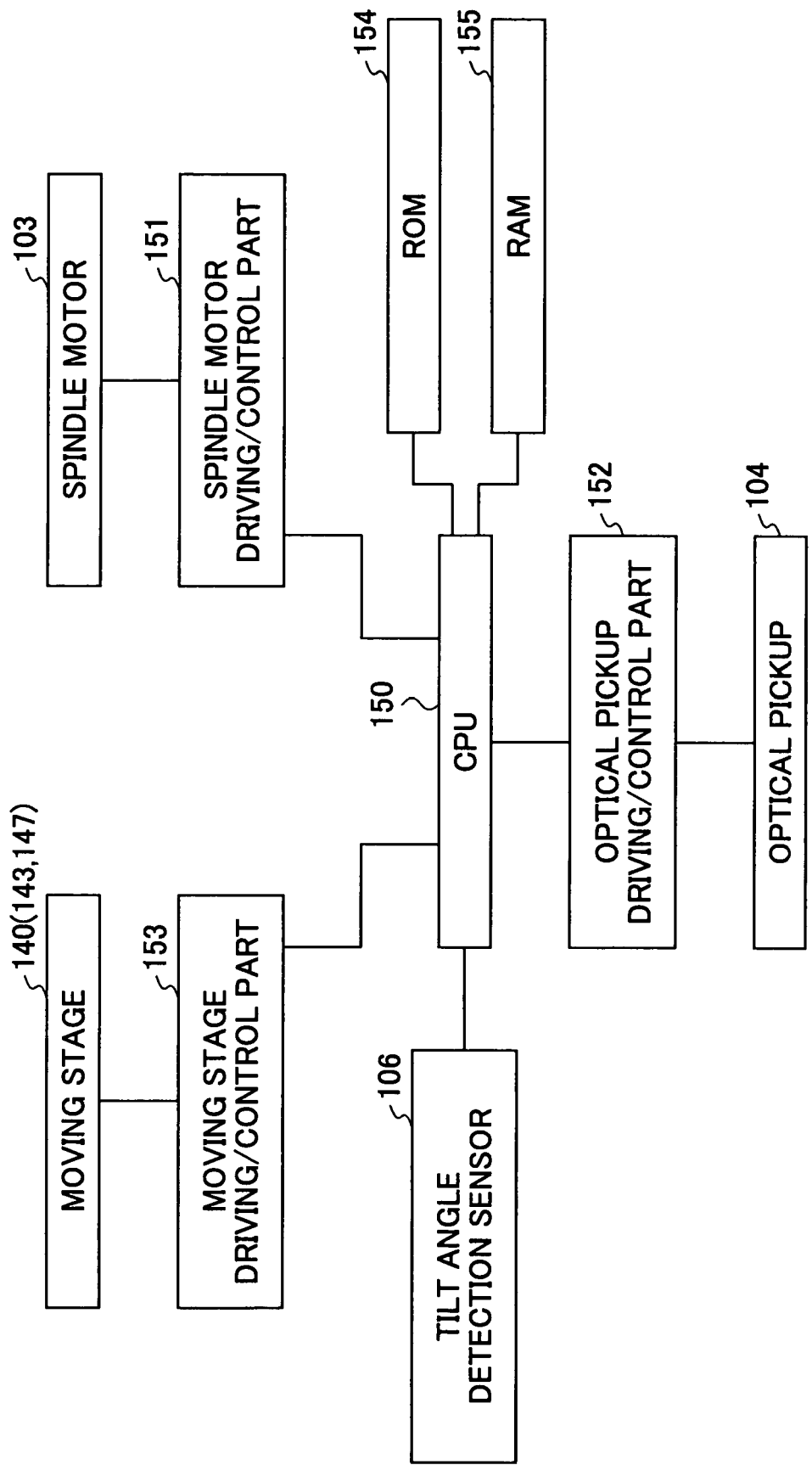
FIG. 38 shows a block diagram of a control system in a recording/reproduction apparatus according to the present carrying-out mode.

FIG. 38 shows a block diagram of a control system of the recording/reproduction apparatus according to the present carrying-out modes, and respective parts are controlled by a CPU 150.

In the configuration of FIG. 38, a spindle motor driving/control part 151 drives/controls the spindle motor 103 according to control data from the CPU 150; an optical pickup driving/control part 152 similarly drives/controls seek operation, recording/reproduction operation, focus/tracking control and so forth of the optical pickup 104 according to control data from the CPU 150; a moving stage driving/controlling part 153 drives/controls the moving stage 140 (143, 147) according to control data from the CPU 150; a ROM 154 stores predetermined operation/control programs for the entire apparatus; and a RAM 155 stores various setting programs.

Figure 39:
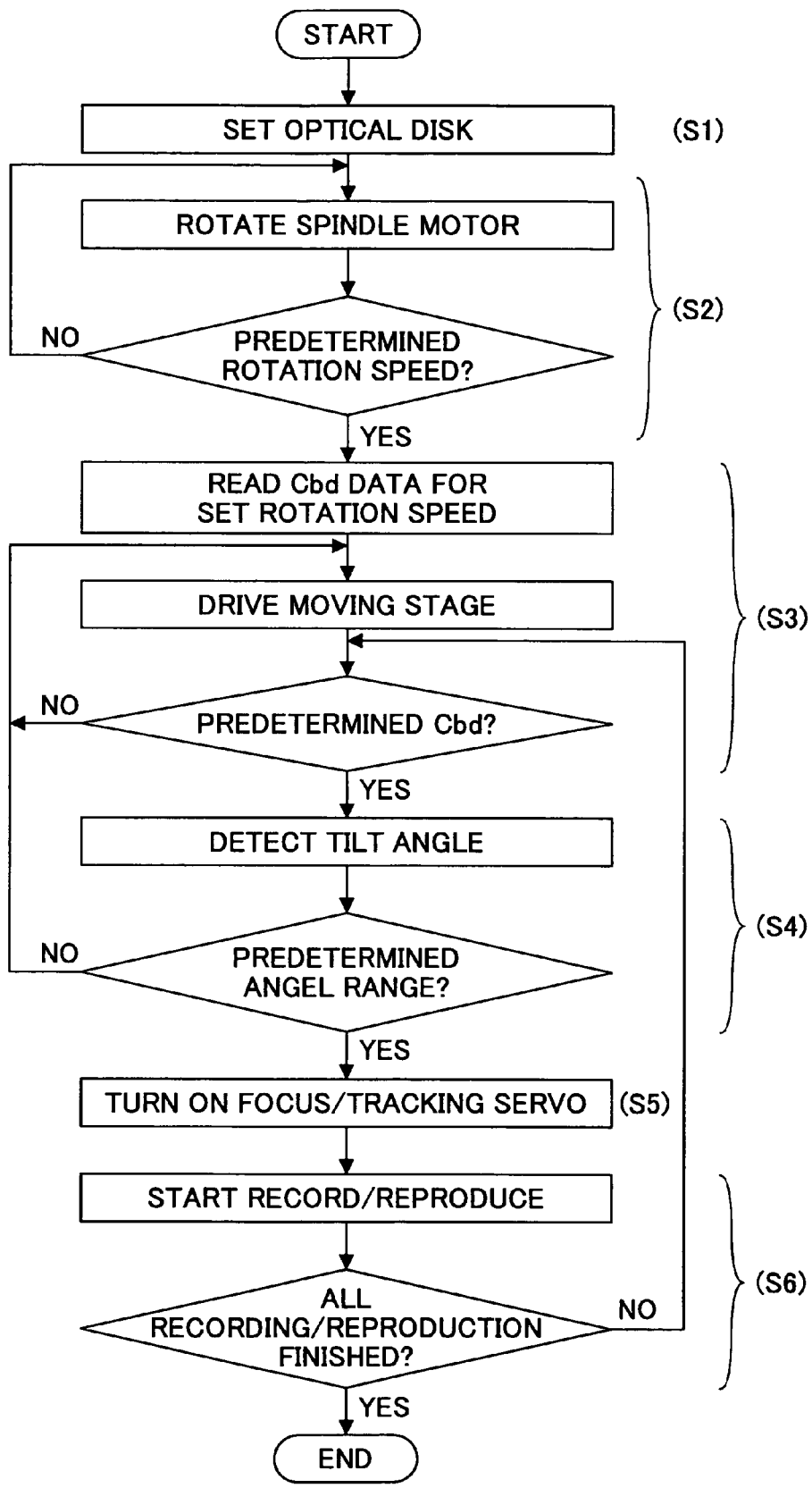
FIG. 39 shows an operation flow chart of disk stabilizing operation through recording/reproduction operation in the present carrying-out mode.

With reference to FIG. 39, a flow chart, a general flow from disk stabilizing operation on the optical disk by means of the stabilizing plate through recording/reproduction operation in the recording/reproduction apparatus according to the fifth through eighth carrying-out modes is described.

First, the optical disk 101 is set on the spindle chuck 105 via the hub 102, and is held by the spindle 103*a* (Step S1); and, in response to turning on of a start switch, the CPU 150 outputs a driving signal to the spindle motor driving/controlling part 151, so as to start up the spindle motor 103, and thus, rotates the optical disk 101 at a desired rotation speed (Step S2).

After that, in Step S3, a 'distance Cbd between the disk and the stabilizing plate' corresponding to the rotation speed of the spindle motor 103 is set. That is, operation is carried out so that the state of (a) is changed to the state of (b) of FIGS. 25 through 28. Relationship between the rotation speed of the spindle motor 103 and the 'distance Cbd between the disk and the stabilizing plate' is previously set from a testing result or such carried out for each specification/configuration of the optical disk 101 to apply, the corresponding relationship data is stored in the RAM 155 or such in a form of a data table, and the distance Cbd setting control driving is carried out as a result of the CPU 150 appropriately reads out the data from the RAM 155.

Specifically, a control signal based on the data is output from the moving stage driving/controlling part 153, and thus, in the fifth and seventh carrying-out modes, a disk-rotational-axis-direction position of the spindle 103*a* is controlled by means of the moving stage 140, and a final position thereof is determined by means of the positioning mechanism 141. In the sixth carrying-out mode, a disk-rotational-axis-direction position of the stabilizing plate 130 is controlled by means of the moving stage 143, and a final position thereof is determined by means of the positioning mechanism 144. In the eighth carrying-out mode, a disk-rotational-axis-direction position of the disk cartridge 120 is controlled by means of the moving stage 147, and a final position thereof is determined by means of the positioning mechanism 147.

After the completion of the setting in Step S3, the tilt angle sensor 106 is applied to detect a tilt angle of the optical disk 101, the CPU 150 receiving the detection data drives the moving stage 143/147 via the moving stage driving/controlling part 153, and thus, controls the tilt angle of the optical disk 101 in zero or within a predetermined allowable range, in Step S4.

After that, the optical pickup 104 is moved to a radial position for carrying out recording/reproduction on the optical disk 101, the disk-rotation-axis-direction position of the optical pickup 104 is adjusted so that focus servo operation is carried out, and thus, a focal position is controlled to a layer for carrying out recording/reproduction in the optical disk 101. Further, tracking servo control is carried out on the optical pickup 104, and thus, the optical pickup 104 is made to follow a target groove on the optical disk 101 (Step S5). In this state, predetermined recording/reproduction operation is carried out in Step S6.

It is preferable that Cbd is adjusted in both operations of Steps S3 and S4 as shown. However, basically, adjustment of Cbd may be carried out only in any one of these operations, and, for example, the driving mechanism may be simplified as a result of the tilt detection mechanism being omitted. Also in this case, the effect of the present invention can be sufficiently obtained.

The fifteenth through twenty-third aspects of the present invention are described more specifically based on embodiments and comparison examples, as follows:

A sixth embodiment is described first.

In the sixth embodiment, the recording/reproduction apparatus according to the fifth carrying-out mode shown in FIG. 25 was applied.

In the sixth embodiment, as a disk substrate, a polycarbonate-made sheet having a diameter of 120 mm and a thickness of 75 μm was applied. In order to prepare the disk, first, on the above-mentioned sheet, a groove of a pitch of a stamper in 0.6 μm and a width in 0.3 μm was transferred in a thermal transfer manner, after that, films were produced in the order of the sheet/Ag reflective layer of 120 nm/($ZrO_2$—$Y_2O_3$)—$SiO_2$ of 7 nm/AgInSbTeGe of 10 nm/ZnS—$SiO_2$ of 25 nm/$Si_3N_4$ of 10 nm by spattering. An information recording area was set from an inner diameter of 40 mm up to an outer diameter of 118 mm (radius between 20 and 58 mm). After that, UV resin was coated by a spin coating manner, and was set by ultraviolet ray radiation, and thus a transparent protective layer of a thickness of 10 μm was produced. On the opposite side, a hard coat of a thickness of 10 μm was provided. A hub 102 with an outer diameter of 30 mm, an inner diameter of 15 mm and a thickness of 0.3 mm was mounted at a disk centre. A final state of this disk 101 was approximately flat.

The optical disk 101 was rotated in a range between 1000 and 12000 rpm, a 'distance Cbd between the disk 101 and the stabilizing plate 130' was adjusted as a result of adjustment of the disk-rotational-axis-direction position of the spindle 103a according to the adjustment pattern shown in FIG. 40, and, disk axial runout at this time at positions of a disk radius between 25 and 55 mm was evaluated by means of a laser displacement sensor disposed instead of the optical pickup 104.

A seventh embodiment is described.

In the seventh embodiment, also the recording/reproduction apparatus according to the fifth carrying-out mode shown in FIG. 25 was applied.

In the seventh embodiment, as a disk substrate, a polycarbonate-made sheet having a diameter of 120 mm and a thickness of 75 μm was applied. In order to prepare the disk, first, on the above-mentioned sheet, a groove of a pitch of a stamper in 0.6 μm and a width in 0.3 μm was transferred in a thermal transfer manner, after that, films were produced in the order of the sheet/Ag reflective layer of 120 nm/($ZrO_2$—$Y_2O_3$)—$SiO_2$ of 7 nm/AgInSbTeGe of 10 nm/ZnS—$SiO_2$ of 25 nm/$Si_3N_4$ of 10 nm by spattering. An information recording area was set from an inner diameter of 40 mm up to an outer diameter of 118 mm (radius between 2 and 58 mm). After that, UV resin was coated by a spin coating manner, and was set by ultraviolet ray radiation, and thus a transparent protective layer of a thickness of 5 μm was produced. On the opposite side, a hard coat of a thickness of 10 μm was provided. A hub 102 with an outer diameter of 30 mm, an inner diameter of 15 mm and a thickness of 0.3 mm was mounted at a disk centre. A final state of this disk 101 was such that it was slightly curved on the side of the hard coat.

The optical disk 101 was rotated in a range between 1000 and 14000 rpm, a 'distance Cbd between the disk 101 and the stabilizing flat surface 123' was adjusted as a result of adjustment of the disk-rotational-axis-direction position of the spindle 103a according to the adjustment pattern shown in FIG. 41, and, disk axial runout at this time at positions of a disk radius between 25 and 55 mm was evaluated by means of a laser displacement sensor disposed instead of the optical pickup 104.

In an eighth embodiment, the recording/reproduction apparatus according to eighth carrying-out mode shown in FIG. 28 was applied. The optical disk 101 the same as that in the sixth embodiment was applied.

Then, the optical disk 101 was rotated in a range between 1000 and 12000 rpm, a 'distance Cbd between the disk 101 and the stabilizing flat surface 123' was adjusted as a result of adjustment of the disk-rotational-axis-direction position of the disk cartridge 120 by means of the moving stage 147 according to the adjustment pattern shown in FIG. 40, and, disk axial runout at this time at positions of a disk radius between 25 and 55 mm was evaluated by means of a laser displacement sensor disposed instead of the optical pickup 104.

In a ninth embodiment, the recording/reproduction apparatus according to sixth carrying-out mode shown in FIG. 26 was applied. The optical disk 101 the same as that in the sixth embodiment was applied. Furthermore, the tilt detection sensor 106 shown in FIG. 35 was applied. This tilt detection sensor 106 was disposed in such a position that a tilt angle in a disk radial direction at a radius 50 mm position from the disk periphery can be detected.

Then, the optical disk 101 was rotated in a range between 1000 and 12000 rpm, a 'distance Cbd between the disk 101 and the stabilizing plate 130' was adjusted as a result of adjustment of the disk-rotational-axis-direction position of the stabilizing plate 130 by means of the moving stage 143, and, disk axial runout at this time at positions of a disk radius between 25 and 55 mm was evaluated by means of a laser displacement sensor disposed instead of the optical pickup 104. In this adjustment, control was made in such a manner that a value of the tilt angle detected by the tilt angle detection mechanism might be equal to or more than −0.1°.

Figure 43:
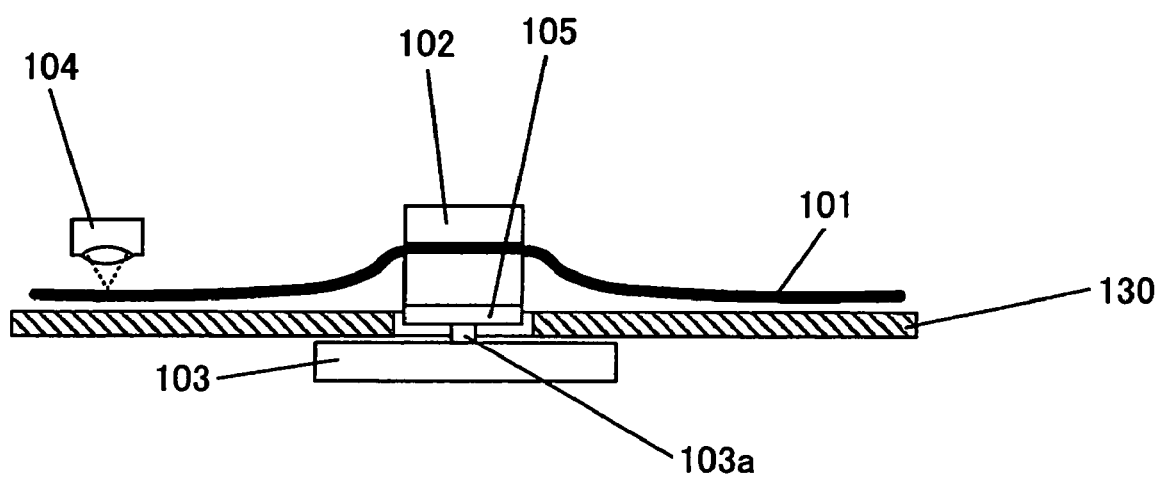
FIG. 43 shows a general configuration of a comparison example.

In a second comparison example, as shown in FIG. 43, a recording/reproduction apparatus without employing a moving stage and a supporting member was applied. The optical disk 101 the same as in the sixth embodiment was applied.

The optical disk 101 was rotated in a range between 1000 and 12000 rpm, and disk axial runout at this time at positions of a disk radius between 25 and 55 mm was evaluated by means of a laser displacement sensor disposed instead of the optical pickup 104. The 'distance Cbd between th disk and the stabilizing plate' was fixed in 0.5 mm.

In a third comparison example, also, as shown in FIG. 43, a recording/reproduction apparatus without employing a moving stage and a supporting member was applied. The optical disk 101 the same in the seventh embodiment was applied.

The optical disk 101 was rotated in a range between 1000 and 12000 rpm, and disk axial runout at this time at positions of a disk radius between 25 and 55 mm was evaluated by means of a laser displacement sensor disposed instead of the optical pickup 104. The 'distance Cbd between th disk and the stabilizing plate' was fixed in 0.5 mm.

FIG. 42 shows axial runout characteristics of the optical disk 101 stabilized by means of the flat-plate-shaped stabilizing plate in the above-mentioned sixth through ninth embodiments (embodiments 6 through 9) and the second and third comparison examples (those 2-3). As shown, from the embodiments, satisfactory disk axial runout characteristics were obtained in a wide range of disk rotation speed. In the ninth embodiment, control of Cbd by tilt angle detection was not converged, in a range of rotation speed less than 2000 rpm, so that disk stabilization could not be achieved. However, satisfactory stability could be obtained for a rotation speed range more than 4000 rpm.

Difference in effect of the present carrying-out modes is clear from comparison with the comparison examples. Accordingly, it can be seen that the effect of the present invention is very advantageous. In the comparison examples, Cbd adjustment was not carried out, and Cbd was fixed in 0.5 mm. In the second and third comparison examples, stabilization of the optical disks having different specifications was tried. For any optical disk, a disk rotation speed range in which disk stabilization could be achieved was narrow, and the level is not so high that the configurations in these comparison examples may not be applied practically.

The present invention can be applied to a recording/reproduction apparatus carrying out information recording/reproduction to/from a flexible recording disk, and a disk cartridge containing the recording disk. Recording disks to which the present invention is directed to include all of those such as a phase change memory, a magneto-optical memory, a hologram memory and so forth, applied in disk-shaped recording disks.

Carrying-out modes and embodiments according to the twenty-fourth through twenty-seventh aspects of the present invention are described next.

Figure 44:
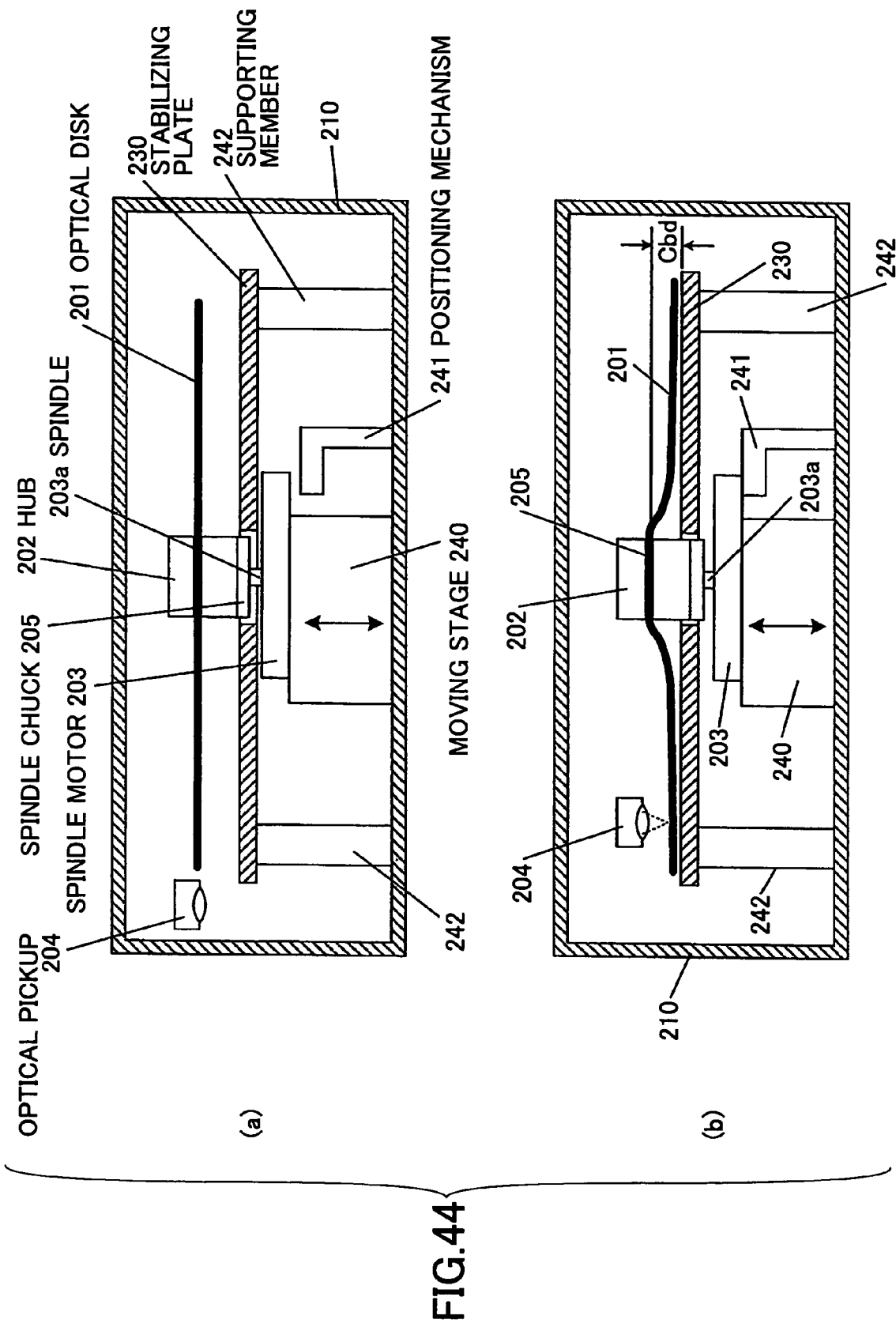
FIG. 44 shows a general configuration of a relevant part of a ninth carrying-out mode of a recording/reproduction apparatus according to the present invention.

FIG. 44 shows a general view of a relevant part of a ninth carrying-out mode of a recording/reproduction apparatus according to the present invention, (a) shows a state of not operating and (b) shows a state of operating.

In FIG. 44, '201' denotes an optical disk which is a flexible optical disk; '202' denotes a hub mounted at a rotation center of the optical disk 101 for holding and rotating the optical disk 201: '203' denotes a spindle motor to drive and rotate the optical disk 201; '203a' denotes a spindle which is a rotation output shaft of the spindle motor 203; '204' denotes an optical pickup acting as a recording/reproduction unit, moving along a radial direction of the optical disk 201, condensing a light beam on the optical disk 201, and carrying out optical scanning of the optical disk 201 so as to record information to the optical disk or to reproduce information from the same; '205' denotes a spindle chuck for fixing the optical disk 201 onto the spindle 203a; and '210' denotes a housing of the recording/reproduction apparatus.

Further, '230' denotes a flat-plate-shaped stabilizing plate disposed on a side opposite to the recording surface of the optical disk 201 for controlling disk axial runout; '240' denotes a moving stage on which the spindle motor 203 is fixed for adjusting a disk-rotational-axis-direction position of the spindle 203a by being lifted or lowered; and '241' denotes a positioning mechanism for setting a disk-rotational-axis-direction position of the spindle motor 203 by contacting the same; and '242' denotes a supporting member for fixing the stabilizing member 230 in the apparatus for setting a position of the stabilizing member 230 in a disk rotational axis direction.

Components in the recording/reproduction apparatus such as a pickup scanning mechanism which doe not directly relate to the present invention are omitted from the figure.

In the non-operating state of FIG. 44, (a), the optical disk 201 fixed on the spindle 203a in its central part is rotated as a result of the spindle motor 203 being started up and thus, the spindle 203a being rotated. As a result of the optical pickup 201 being thus rotated, aerodynamic force is generated between the optical disk 201 and the stabilizing plate 230, which results in the optical disk 201 being attracted by the stabilizing plate 230 as shown in FIG. 44, (b). As a result, a major surface of the optical disk 201 is approximately straightened in a disk radial direction, and also, disk axial runout in this part is reduced. Accordingly, axial runout of the optical disk 201 at least at a recording/reproduction position with the optical pickup 204 is controlled and thus, satisfactory information recording/reproduction is ensured.

In the ninth carrying-out mode, a position control mechanism for the spindle 203a in a disk rotational axis direction is provided, the moving stage 240 is driven at least upon recording/reproduction, and the positioning mechanism 241 is contacted by the spindle motor 203, and the disk-rotational-axis-direction position of the spindle 203a is thus controlled. Thereby, distance setting can be accurately carried out in such a manner that a distance Cbd between the optical disk 201 fixed on the spindle 203a via the spindle chuck 205 and the stabilizing plate 230 may fall within a predetermined limitation range. Thereby, the stabilizing plate 230 can be properly made to function on the optical disk 201, and thus, disk axial runout can be satisfactorily stabilized (axial runout control).

The positioning mechanism 241 is an effective device for accurately setting the above-mentioned distance Cbd in a specific fixed value. However, it may be omitted when another mechanism enabling accurate positional control is provided in the moving stage 240 for example.

Figure 45:
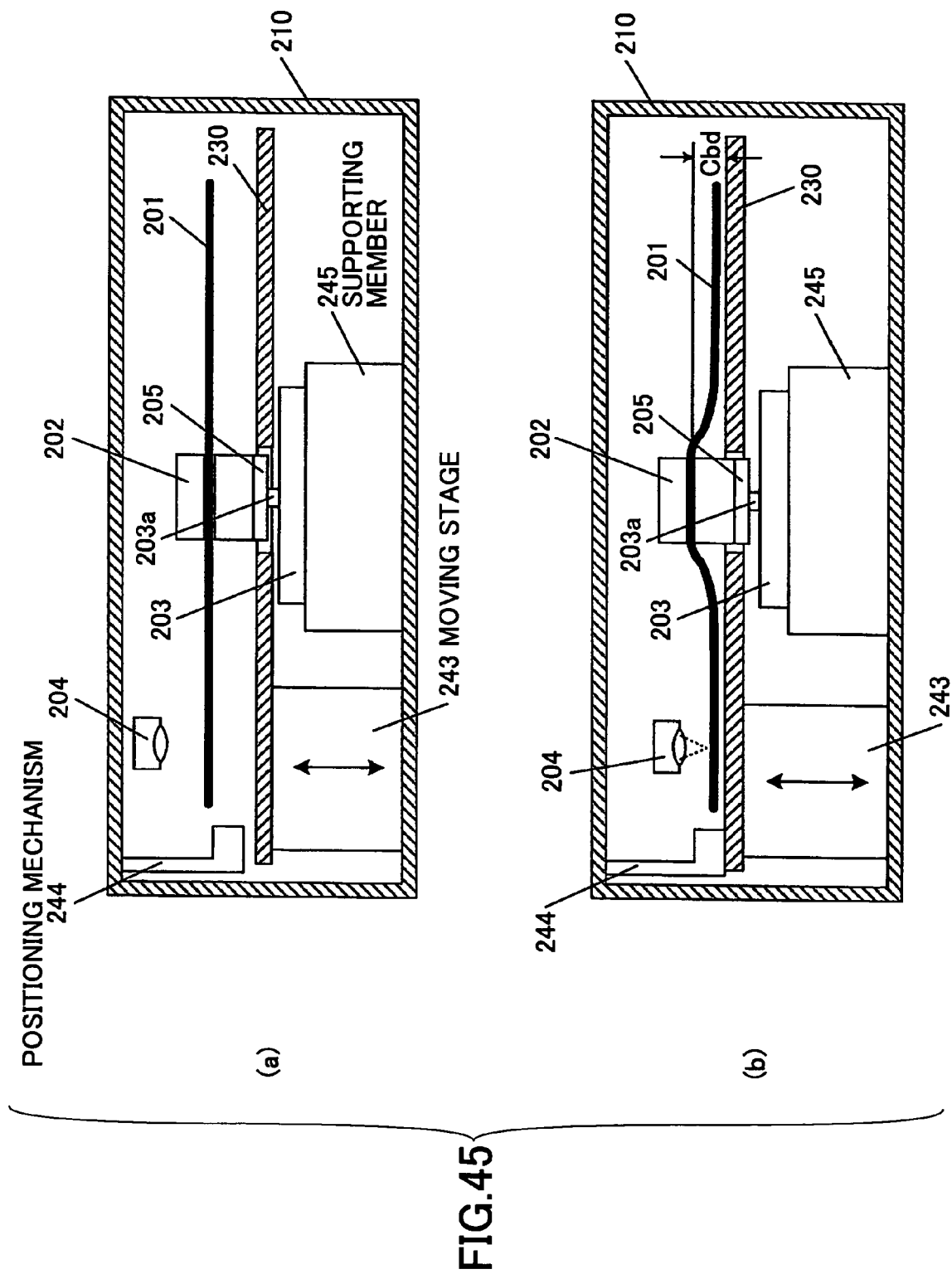
FIG. 45 shows a general configuration of a relevant part of a tenth carrying-out mode of a recording/reproduction apparatus according to the present invention.

FIG. 45 shows a general view of a relevant part of a tenth carrying-out mode of a recording/reproduction apparatus according to the present invention, (a) shows a state of not operating and (b) shows a state of operating. The same reference numerals are given to members already described above, and detailed description therefor is omitted.

In FIG. 45, '243' denotes a moving stage on which the stabilizing plate 230 is fixed for adjusting a disk-rotational-axis-direction position of the stabilizing plate 230 by being lifted or lowered; '244' denotes a positioning mechanism contacting the stabilizing plate 230 for setting a disk-rotational-axis-direction position thereof; and '245' denotes a supporting member for fixing the spindle motor 203 in the apparatus for setting a position of the spindle 203a in a disk rotational axis direction.

In the tenth carrying-out mode, a position control mechanism for the stabilizing plate 230 in a disk rotational axis direction is provided, the moving stage 240 is driven at least upon recording/reproduction, the positioning mechanism 241 is contacted by the stabilizing plate 230, and the disk-rotational-axis-direction position of the stabilizing plate 230 is thus controlled. Thereby, distance setting can be accurately carried out in such a manner that a distance Cbd between the optical disk 201 and the stabilizing plate 230 may fall within a predetermined limitation range. Thereby, the stabilizing plate 230 can be properly made to function on the optical disk 201, and thus, disk axial runout can be satisfactorily stabilized, the same as in the ninth carrying-out mode.

The positioning mechanism 244 is an effective device for accurately setting the above-mentioned distance Cbd in a specific fixed value. However, it may be omitted when another mechanism enabling accurate positional control is provided in the moving stage 243 for example.

Figure 46:
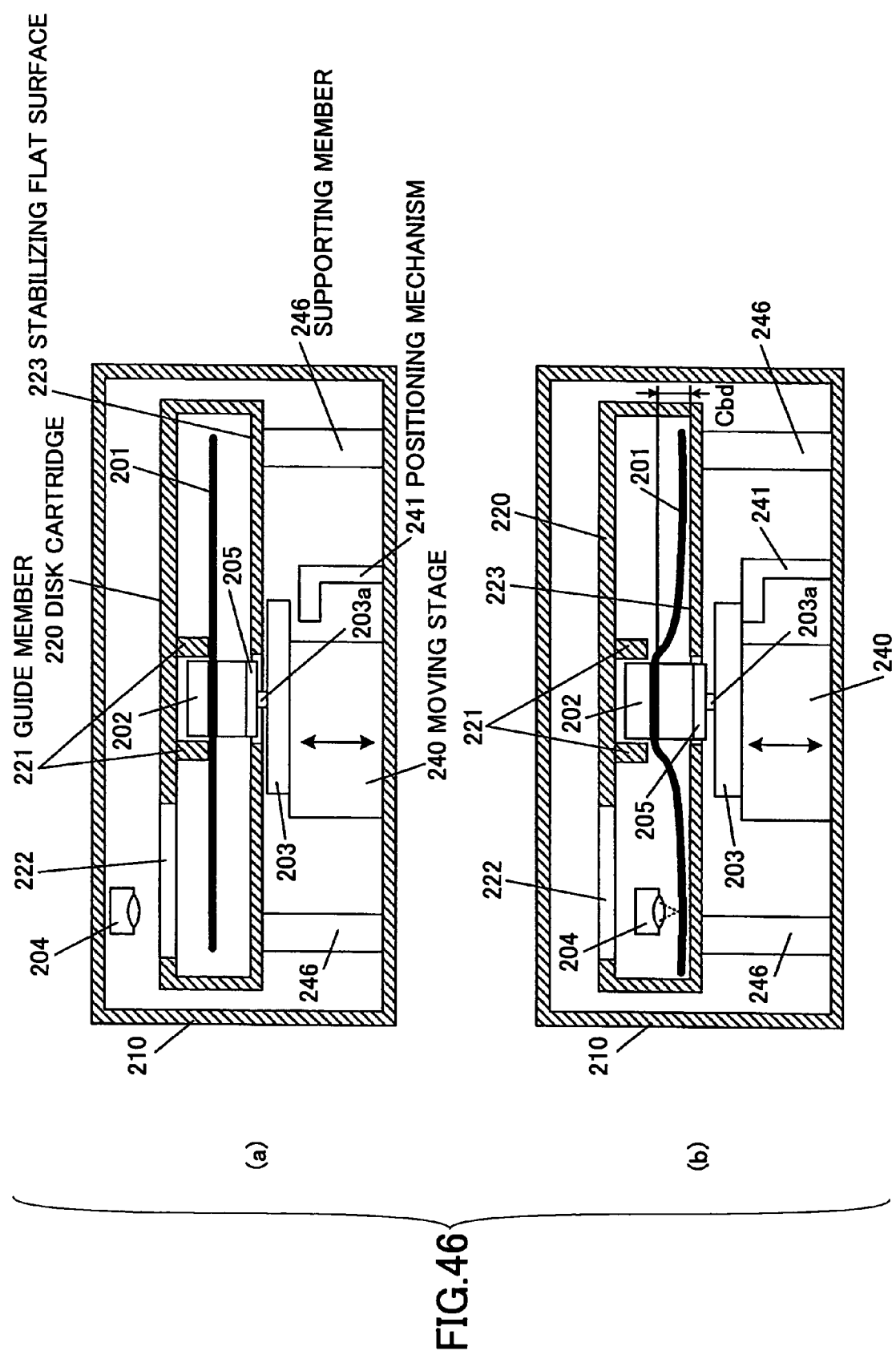
FIG. 46 shows a general configuration of a relevant part of an eleventh carrying-out mode of a recording/reproduction apparatus according to the present invention.

FIG. 46 shows a general view of a relevant part of an eleventh carrying-out mode of a recording/reproduction apparatus according to the present invention, (a) shows a state of not operating and (b) shows a state of operating.

In FIG. 46, '220' denotes a disk cartridge containing the optical disk 201; '221' denotes a guide member guiding a position of the optical disk 101 in the disk cartridge 120 in such a manner that it may be positioned approximately in the center; '222' denotes a slot part enabling the optical pickup 204 to enter/exit the disk cartridge 220; '223' denotes a stabilizing flat surface (inner bottom wall of the disk cartridge in this example) acting as a stabilizing plate for stabilizing axial runout of the optical disk 201; and '246' denotes a supporting member holding and fitting the disk cartridge 220 in the apparatus for adjusting a disk-rotational-axis-direction position of the stabilizing flat surface 223 by setting the disk-rotational-axis-direction position of the disk cartridge 220.

In the eleventh carrying-out mode, the stabilize flat surface 223 is provided in the disk cartridge 220, and also, a position control mechanism 241 for the spindle 203a in a disk rotational axis direction is provided, the moving stage 240 is driven at least upon recording/reproduction, the positioning mechanism 241 is contacted by the spindle motor 203, and thus the disk-rotational-axis-direction position of the spinel motor 203 is controlled. Thereby, distance setting can be accurately carried out in such a manner that a distance Cbd between the optical disk 201 and the stabilizing plate 230 may fall within a predetermined limitation range. Thereby, the stabilizing plate 230 can be properly made to function on the optical disk 201, and thus, disk axial runout can be satisfactorily stabilized, the same as in the ninth or tenth carrying-out mode.

The positioning mechanism 241 is an effective device for accurately setting the above-mentioned distance Cbd in a specific fixed value. However, it may be omitted when another mechanism enabling accurate positional control is provided in the moving stage 240 for example.

Figure 47:
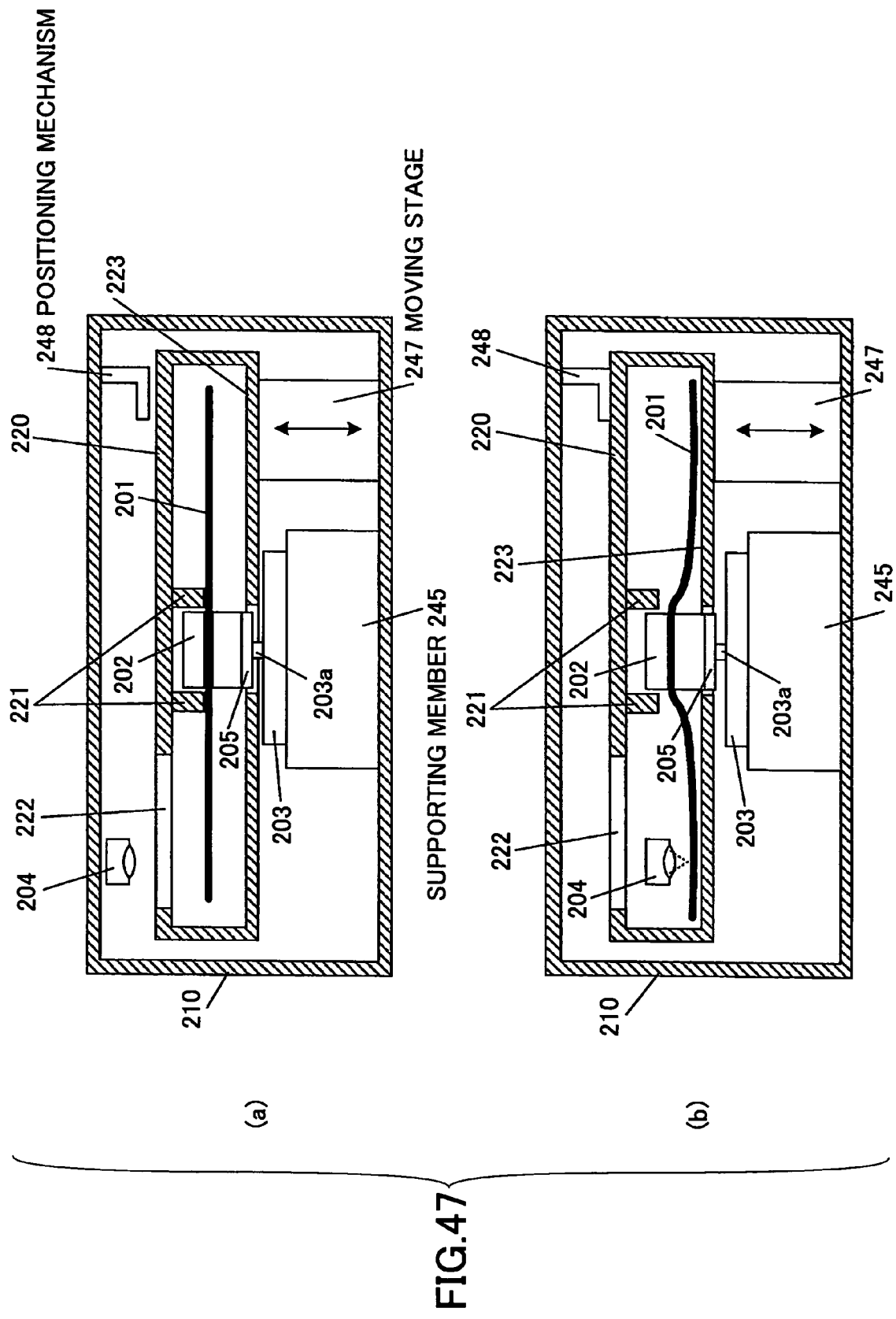
FIG. 47 shows a general configuration of a relevant part of a twelfth carrying-out mode of a recording/reproduction apparatus according to the present invention.

FIG. 47 shows a general view of a relevant part of a twelfth carrying-out mode of a recording/reproduction apparatus according to the present invention, (a) shows a state of not operating and (b) shows a state of operating.

In FIG. 47, '247' denotes a moving stage holding and fitting the disk cartridge 220' for adjusting the disk-rotational-axis-direction position of the disk cartridge 220 so as to adjust the disk-rotational-axis-direction position of the stabilizing flat surface 223, and '248' denotes a positioning mechanism contacting the disk cartridge 220 for setting the disk-rotational-axis-direction position of the disk cartridge 220.

In the twelfth carrying-out mode, the stabilizing flat surface 223 is provided in the disk cartridge 220, and also, a position control mechanism for the disk cartridge 220 in a disk rotational axis direction is provided, the moving stage 247 is driven at least upon recording/reproduction, the positioning mechanism 248 is contacted by the disk cartridge 220, and thus the disk-rotational-axis-direction position of the disk cartridge 220 is controlled. Thereby, distance setting can be accurately carried out in such a manner that a distance Cbd between the optical disk 201 and the stabilizing plate 230 may fall within a predetermined limitation range. Thereby, the stabilizing plate 230 can be properly made to function on the optical disk 201, and thus, disk axial runout can be satisfactorily stabilized, the same as in the ninth through eleventh carrying-out mode.

The positioning mechanism 248 is an effective device for accurately setting the above-mentioned distance Cbd in a specific fixed value. However, it may be omitted when another mechanism enabling accurate positional control is provided in the moving stage 247 for example.

Figure 48:
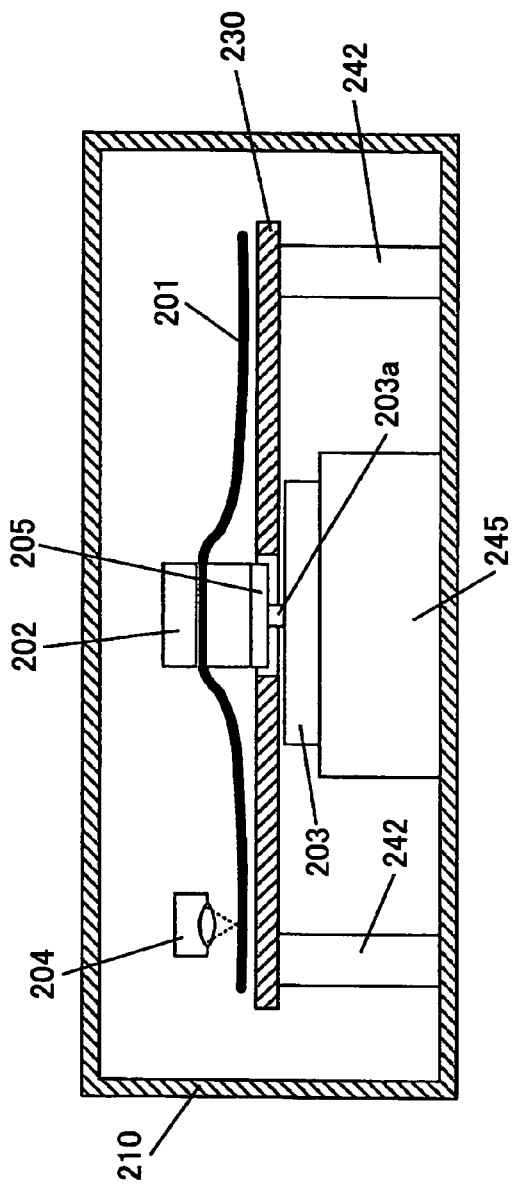
FIG. 48 shows a general configuration of a relevant part of a thirteenth carrying-out mode of a recording/reproduction apparatus according to the present invention.

FIG. 48 shows a general view of a relevant part of a thirteenth carrying-out mode of a recording/reproduction apparatus according to the present invention. The thirteenth carrying-out mode is obtained from removing the moving stage 240 and the position mechanism 241 from the ninth carrying-out mode, or removing the moving stage 243 and the position mechanism 244 from the tenth carrying-out mode. Thus, the dynamic adjustment mechanism for the distance Cbd between the optical disk 201 and the stabilizing plate 230 is omitted. In this carrying-out mode, by accurately positioning the supporting member 222 of the stabilizing plate 230 and the supporting member 245 of the spindle motor 203, the distance Cbd between the optical disk 201 and the stabilizing plate 230 is fixed at a proper value.

Figure 49:
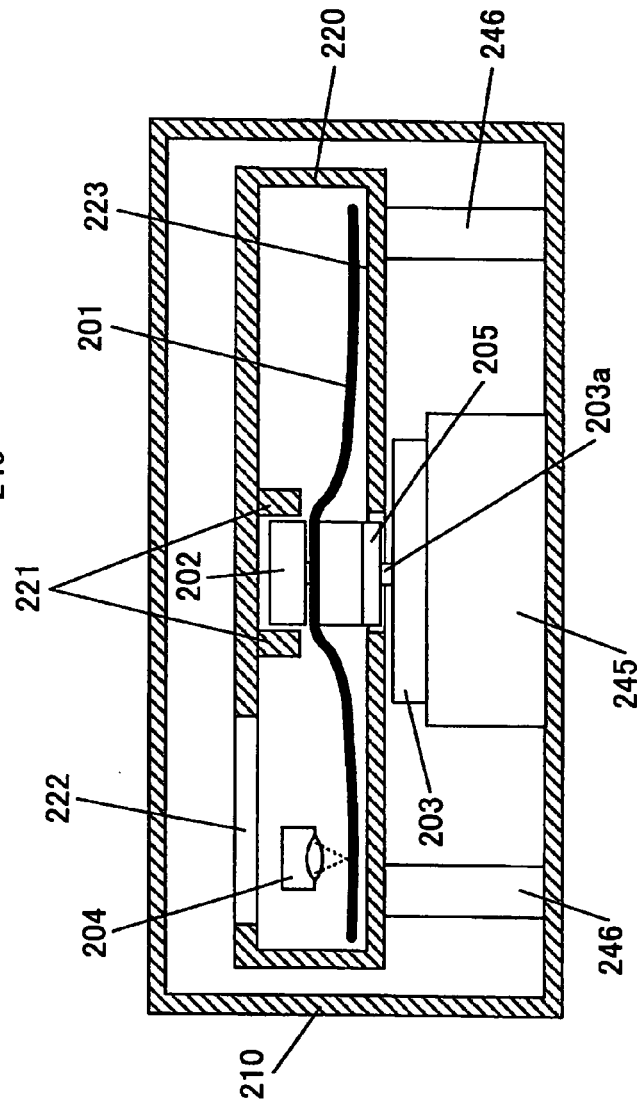
FIG. 49 shows a general configuration of a relevant part of a fourteenth carrying-out mode of a recording/reproduction apparatus according to the present invention.

FIG. 49 shows a general view of a relevant part of a fourteenth carrying-out mode of a recording/reproduction apparatus according to the present invention. The fourteenth carrying-out mode is obtained from removing the moving stage 240 and the position mechanism 241 from the eleventh carrying-out mode, or removing the moving stage 247 and the position mechanism 248 from the twelfth carrying-out mode. Thus, the dynamic adjustment mechanism for the distance Cbd between the optical disk 201 and the stabilizing flat surface 223 is omitted. In this carrying-out mode, by accurately positioning the supporting member 246 of the disk cartridge 220 including the stabilizing flat surface 223 and the supporting member 245 of the spindle motor 203, the distance Cbd between the optical disk 201 and the stabilizing flat surface 223 is fixed at a proper value.

Next, operation of the respective carrying-out modes is described.

As a result of various experiments and consideration therefor being carried out for a phenomenon for a case where aerodynamic force is applied on the rotating optical disk by the flat-plate-shaped stabilizing plate, which is a basic operation of each carrying-out mode, it has been found out that specific relationship exists between a 'distance between the optical disk and the stabilizing plate'/a 'disk rotation speed' and disk surface stability, and that, to properly adjust this relationship is very important point for achieving disk surface stability.

Figure 50:
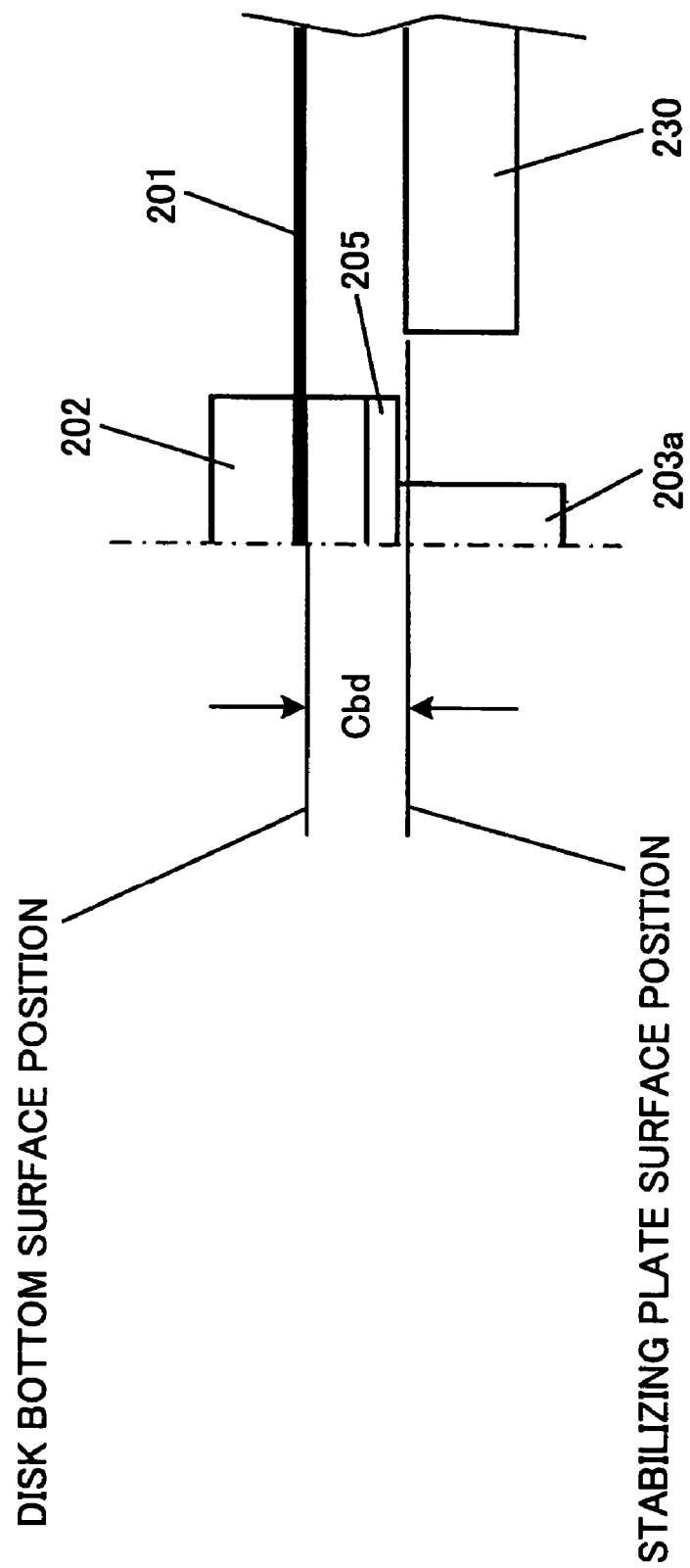
FIG. 50 shows a general configuration around a disk center for illustrating the present carrying-out mode.

The above-mentioned distance between the disk and the stabilizing plate means a gap Cbd, shown in FIG. 50 showing a general view of a disk central portion, between a position of the optical disk 201 surface on the side of the stabilizing plate 230 and a surface position of the stabilizing plate 230. The position of the optical disk 201 surface on the side of the stabilizing plate 230 means a position at which the hub contacts the disk when the hub is applied to sandwich and fix the disk, or a position at which the disk contacts the spindle when the disk is directly fixed to the spindle chuck.

Below, importance of properly adjusting the relationship between the 'distance Cbd between the disk and the stabilizing plate' and the 'disk rotation speed Sr' is described based on experiment data on which study has been made.

Figure 51:
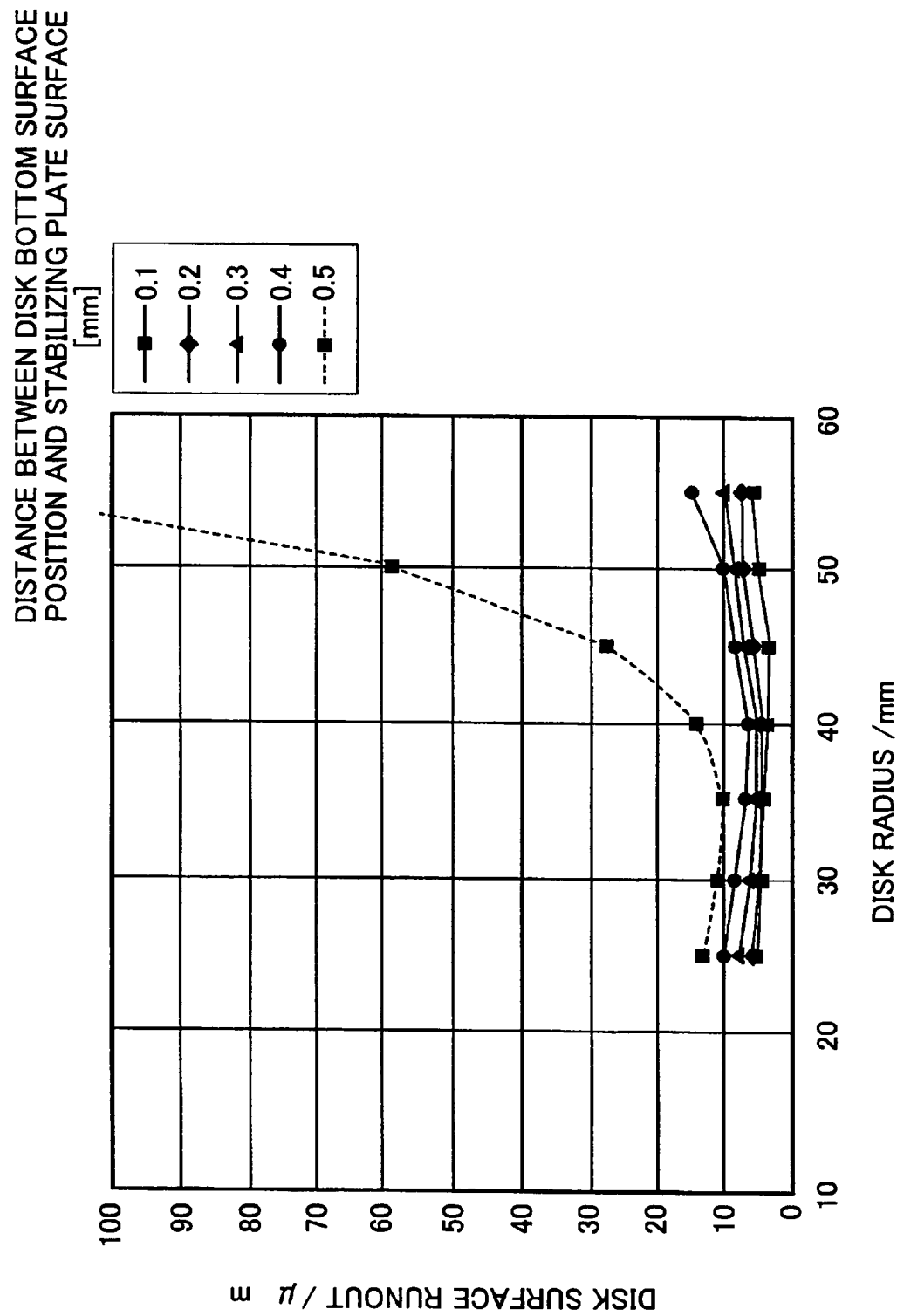
FIG. 51 shows change in axial runout stability along a disk radial direction occurring when a 'distance between a disk and a stabilizing plate' is changed in the present carrying-out mode.

One of important points found out as a result of the inventors and so forth studying the experiment data is that the 'distance Cbd between the disk and the stabilizing plate' is limited within a specific range for achieving disk stabilization. One example of this result is shown in FIG. 51. FIG. 51 shows a change in axial runout stability throughout a disk radial direction for when the distance Cbd between the disk and the stabilizing plate is changed.

As shown, axial runout stability remarkably changed at a value of the 'distance Cbd between the disk and the stabilizing plate' around 0.4 mm as a border, and axial runout exceeded 100 μm at 0.5 mm. This is one example for a specific rotation speed (6000 rpm). However, even when a disk rotation speed was changed, such an inflection point occurred in the 'distance Cbd between the disk and the stabilizing plate' at which axial runout characteristics changed remarkably, approximately commonly.

As can be seen from FIG. 51, degradation in axial runout started from a disk peripheral portion when this inflection point was exceeded. Aerodynamic force applied to the disk by the stabilizing plate being reduced as the disk is away from the stabilizing plate can be easily presumed as a physical phenomenon, and degradation of axial runout occurring when the 'distance Cbd between the disk and the stabilizing plate' increases can be explained from a fact of existence of a limitation in a zone where the stabilizing plate functions effectively. However, a most important point found out as a result of the inventors and so forth studying eagerly is that this phenomenon remarkably changes at a specific 'distance Cbd between the disk and the stabilizing plate' as a border.

A second point found out by the inventors and so forth is described next.

A value of the 'distance Cbd between the disk and the stabilizing plate' at which axial runout characteristics changed remarkably (referred to as Cbdmax, hereinafter) drew a specific curve. Specifically, a phenomenon appeared in which this value increases along with increase in a disk rotation speed in a low rotation speed zone, while the same decreases along with increase in a disk rotation speed in a high rotation speed.

Figure 52:
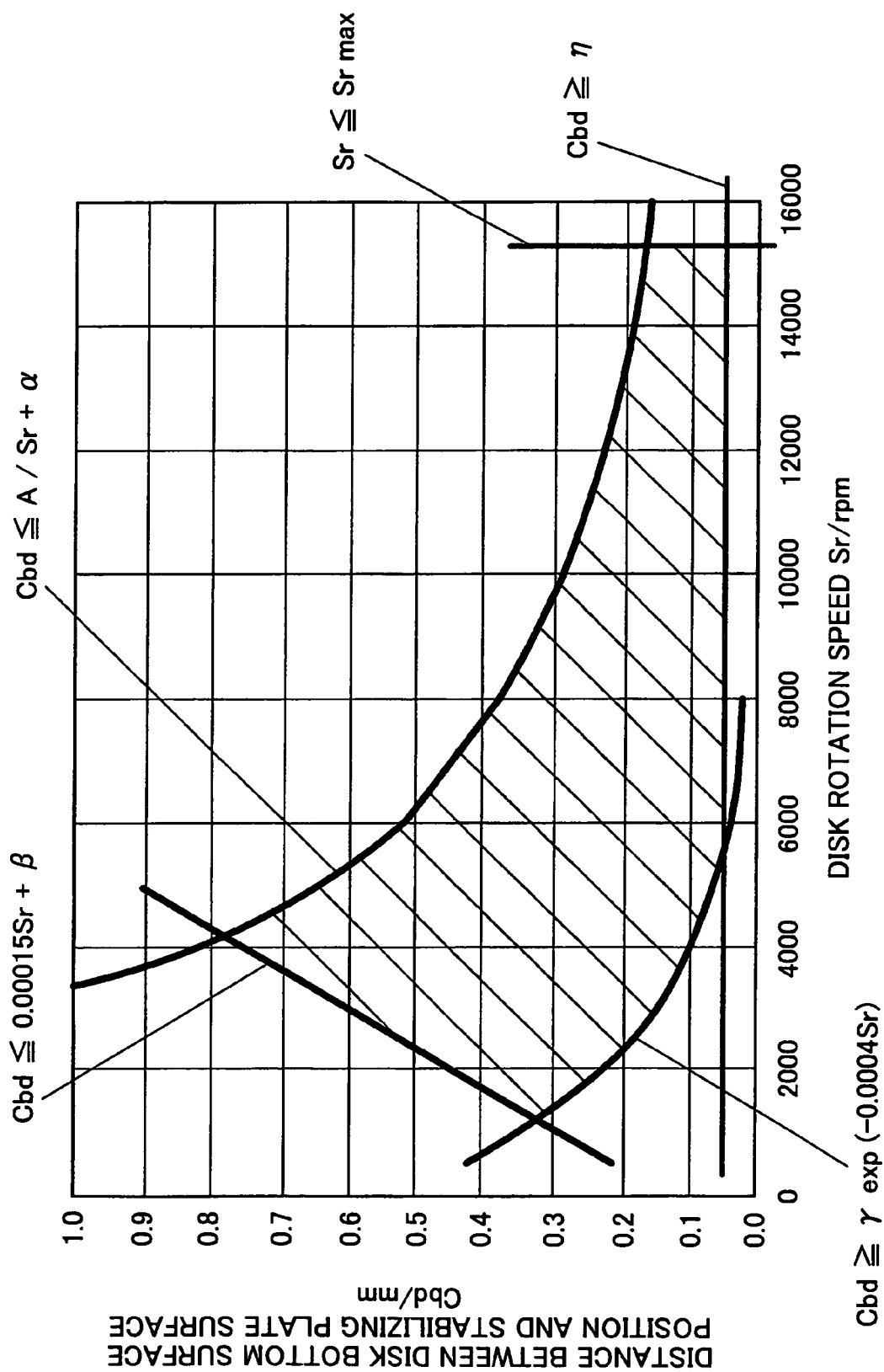
FIG. 52 shows a determination curve of a value Cbdmax of 'a distance Cbd between a disk and a stabilizing plate' of sharp change in axial runout stability in the present carrying-out mode.

FIG. 52 shows a general view of this curve. FIG. 52 shows a range of a 'distance Cbd between the disk and the stabilizing plate' in which a disk can be stabilized by means of the stabilizing plate where the ordinate axis denotes a distance Cbd between a disk and a stabilizing plate' and the abscissa axis denotes a disk rotation speed.

A cause of the phenomenon in which Cbdmax increases in a low rotation speed zone may be that function force of the stabilizing plate increases thanks to increased in a flow rate of air flow generated in the vicinity of the disk surface along with increase in the disk rotation speed. A cause of the phenomenon in which Cbdmax decreases in a high rotation speed zone may be that vibration in the disk rotational axis direction increases along with increase in the disk rotation speed, and larger function force is required for controlling the vibration so that function force of the stabilizing plate should be increased by reducing the 'distance Cbd between the disk and the stabilizing plate' for sufficiently controlling disk axial runout.

The second point found out by the inventors and so forth from eager study is that the above-mentioned 'Cbdmax behaves differently in a low disk rotation speed zone and a high disk rotation speed zone, and has a specific profile with respect to the disk rotation speed'.

The inventors and so forth found out that the above-mentioned Cbdmax can be expressed by $$Cbd\text{max}=0.00015Sr+\beta$$

for a low rotation speed zone, while, by $$Cbd\text{max}=A/Sr+\alpha$$

for a high rotation speed zone.

A phenomenon was complicated for a low rotation speed zone and Cbdmax varied due to influence of slight disk distortion occurring upon disk chucking. The above-mentioned formulas are obtained in consideration of the variation. A disk surface could be properly stabilized as long as Cbdmax expressed by the formula was not exceeded.

A, $\alpha$ and $\beta$ in the above-mentioned formulas are arbitrary constants. A is a constant determined from a disk base material, had a value of approximately the order of (1E3), and tended to have a larger value for a disk base material having a large Young's modulus. For example, a value of A was around 3500 for polycarbonate having Young's modulus of approximately 2.5 GPa, while, a value of A was around 2500 for polyethylene terephthalate having Young's modulus of approximately 5.5 GPa.

$\alpha$ is determined mainly from a film thickness of a disk base material, has a value of approximately the order of (1E-1), and tended to have a larger value as the film thickness increased. For example, $\alpha$ was around −0.1 when polycarbonate was applied as a disk base material, and changed according to a disk film thickness.

$\beta$ is a constant relating to flatness of a recording disk, has a value of approximately the order of (1E-1), and tended to increase as distortion in the disk increases. For example, $\beta$ was around +0.3 when polycarbonate was applied as the disk base material, and decreased as distortion of the disk increased.

On the other hand, as shown in FIG. 52, a lower limit Cbdmin also existed for achieving disk surface stabilization on the side of reducing the 'distance Cbd between the disk and the stabilizing plate'. This lower limit Cbdmin was limited by a phenomenon of contacting/sliding between the disk and the stabilizing plate. It can be easily presumed that, as the 'distance Cbd between the disk and the stabilizing plate' is reduced much, the disk and the stabilizing plate contact or slide on one another, which situation is not suitable for driving of the recording/reproduction apparatus. An important point is that, not only Cbdmax but also Cbdmin changed along with change in a disk rotation speed. Cbdmin decreased along with increase in the disk rotation speed in a low rotation speed zone, and after that, had a fixed value. A fact that 'Cbdmin has a specific profile with respect to a disk rotation speed' is a third point found out from eager study by the inventors and so forth.

Further, the present inventors and so forth found out the Cbdmin can be expressed by:

$$Cbd\text{min}=\gamma\exp(-0.0004Sr)$$

for a low rotation speed zone, and $$Cbd\text{min}=\eta$$

for a high rotation speed zone. $\gamma$ is a constant mainly relating to flatness of a recording disk, as same as $\beta$. $\gamma$ had a value of approximately the order of (1E-1), and tended to increase as distortion of the disk increased. For example, when polycarbonate was applied as a disk base material, $\gamma$ has a valued around +0.25, and increased as distortion of the disk increased.

$\eta$ is also a constant mainly relating to flatness of a recording disk the same as $\beta$ and $\gamma$, and increased as distortion of a disk increased. Actually, $\eta$ has a fixed value in the vicinity of approximately +0.05 unless a recording disk degraded in flatness much and had large distortion. This value was a typical value of $\eta$. A recording disk having large $\eta$, i.e., having a large distortion was not stabilized by a flat-plate-shaped stabilizing plate, and, practically, it was important to apply a disk having well reduced distortion.

From the above-mentioned three points, a specific condition range for stabilizing a disk by means of a flat-plate-shaped stabilizing plate has been determined, and disk stabilization could be achieved by adjustment within this limited range. This range is specified by the following inequalities:

$$Cbd \leq A/Sr+\alpha;$$

$$Cbd \leq 0.00015Sr+\beta;$$

$$Cbd \geq \gamma\exp(-0.0004Sr); \text{ and}$$

$$Cbd \geq \eta$$

As described above, A, $\alpha$, $\beta$, $\gamma$ and $\eta$ are arbitrary constants determined from disk specification such as disk base material, thickness, distortion and so forth.

It is noted that an upper limit of a disk rotation speed is limited by the above-mentioned inequalities basically. However, practically, a limitation range of $$Sr \leq Sr\text{max}$$

determined by a rotation speed limit Srmax of the spindle motor 203 should also be taken into account. Depending on disk specification, this range was a limitation range for stabilization. FIG. 52 shows a case where a disk rotation speed upper limit is limited by the critical rotation speed of the spindle motor 103.

Thus, in order to stabilize a disk by means of a flat-plate-shaped stabilizing plate, a specific condition range shown in FIG. 52 is very important.

The ninth through fourteenth carrying-out modes embody apparatus configurations for carrying out recording/reproduction driving in the above-mentioned specific condition range. Each of all these carrying-out modes is configured such that, mutual position in the disk rotational axis direction between the spindle 203a holding the optical disk 201 and the stabilizing plate 230 (223) is adjusted. That is, thereby adjustment of the 'distance Cbd between the disk and the stabilizing plate' in the above-mentioned stabilization condition range is intended actually.

For example, when an arbitrary Cbd (at least according to a setting requirement upon recording/reproduction with the recording/reproduction head, while, other than the recording/reproduction occasion, this limitation may be lifted) is determined as a specification of the apparatus, the disk rotation speed for positively achieving disk stabilization can be determined from the above-mentioned stabilization condition range. By managing this condition at least upon recording/reproduction with the recording/reproduction head, satisfactory recording/reproduction operation can be carried out on the stabilized disk surface. Also, as long as the above-mentioned stabilization condition range is met, dynamic control of the Cbd according to the disk rotation speed can be carried out.

Figure 53:
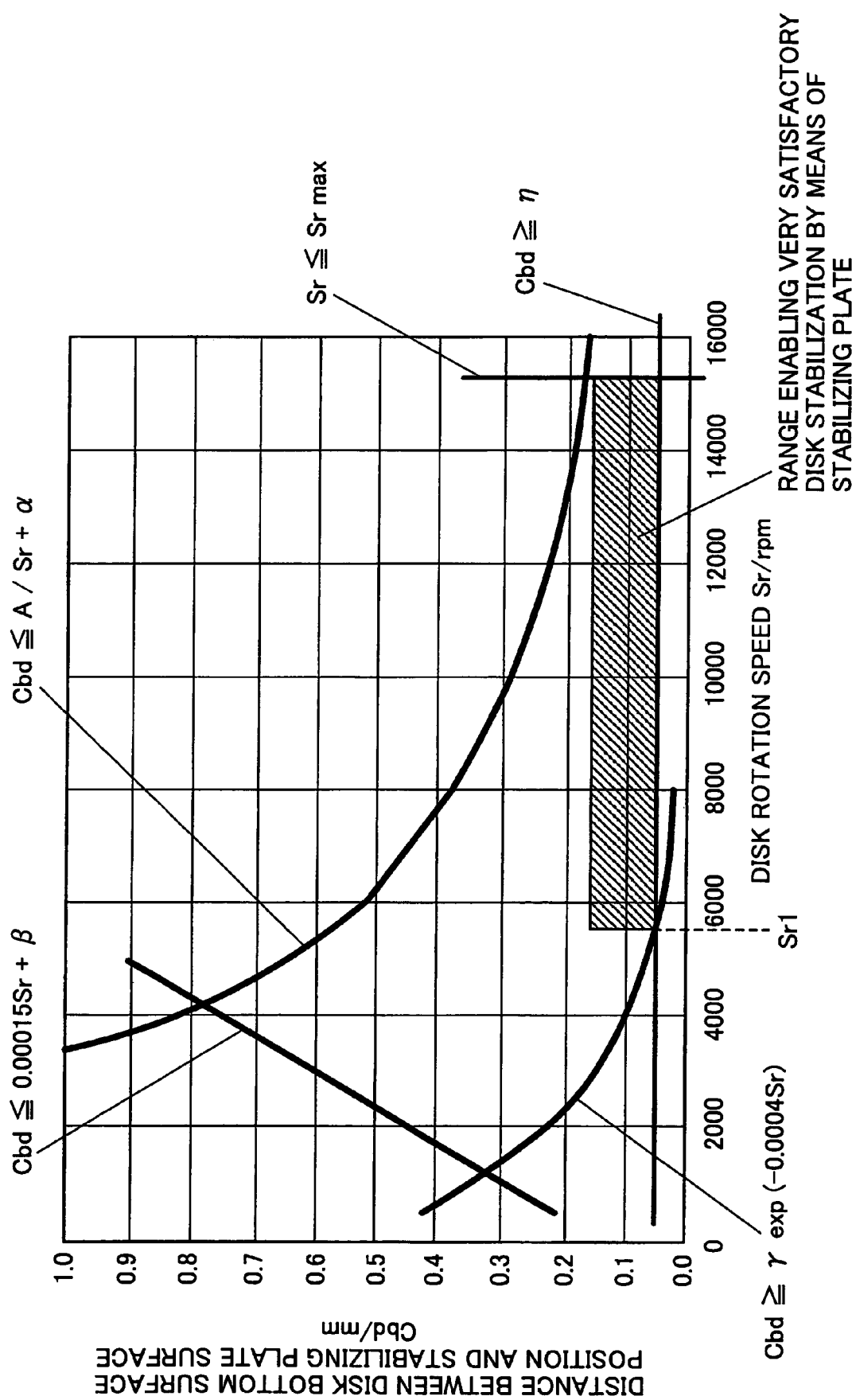
FIG. 53 shows conditions (adjustment patterns) by which, in a specific zone of a stabilization condition range in the present carrying-out mode, very small disk axial runout is obtained throughout the disk entire surface.

From further study, it has been found out that a condition exists in a specific zone in the above-mentioned stabilization condition range in which very small disk axial runout characteristics can be obtained throughout the entire disk surface. This condition range corresponds to a condition zone of a disk rotation speed range from a disk rotation speed Sr1 at which a curve Cbd=γexp(−0.0004Sr) and a straight line Cbd=η intersect, through the above-mentioned Srmax or a 'disk rotation speed at which Cbd=A/Sr+α and Cbd=η intersect', and also, in the vicinity of a boundary zone of the above-mentioned inequality Cbd≧η, as shown in FIG. 53. In this condition zone, very stable disk stability such as disk axial runout of 10 μm could be achieved throughout the entire disk surface.

Figure 54:
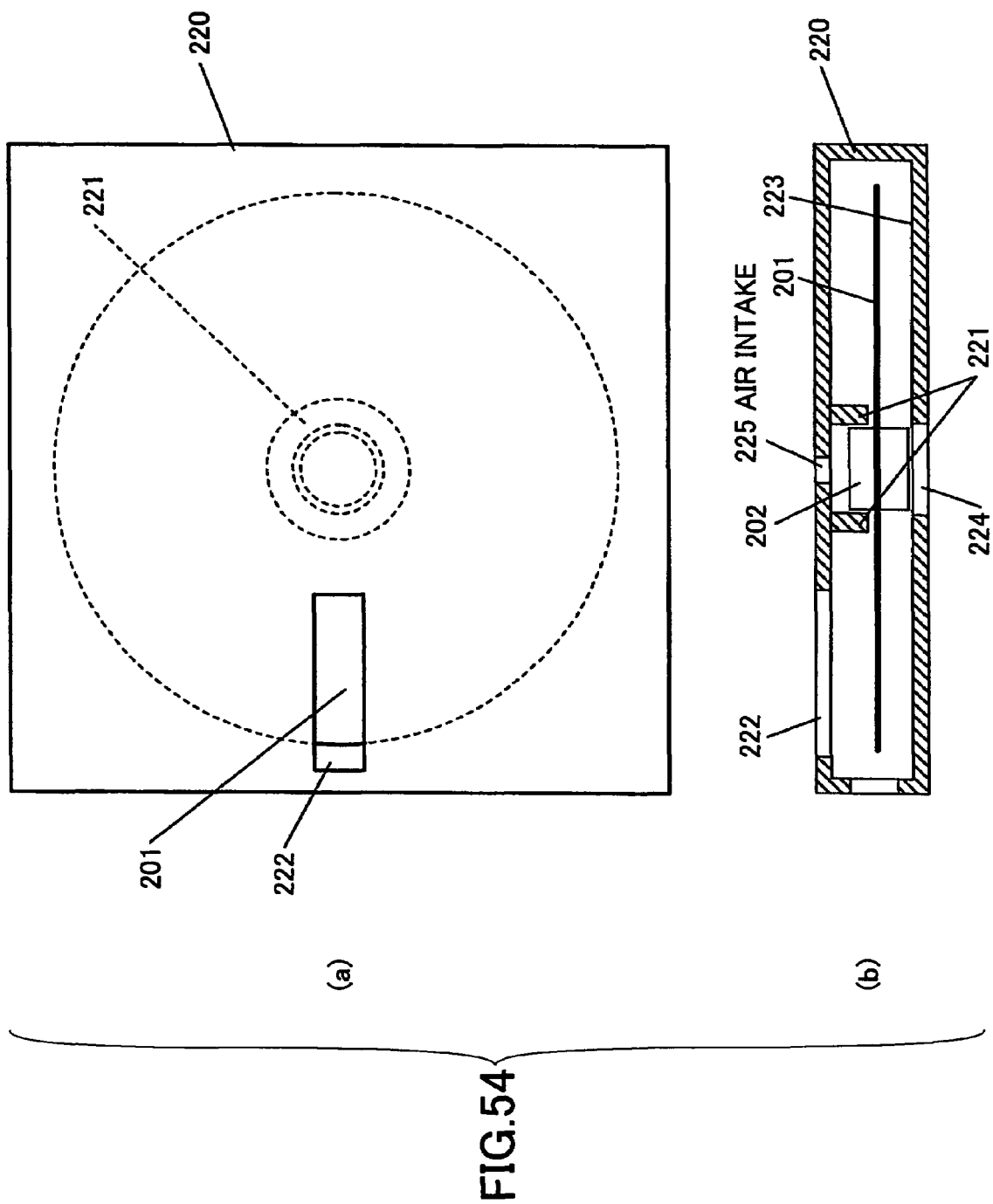
FIG. 54 shows a configuration example of a disk cartridge applied in the carrying-out modes 11, 12 and 13.

FIG. 54 shows a configuration example of a disk cartridge applied in any one of the eleventh, twelfth and fourteenth carrying-out modes, (a) shows a plan view and (b) shows a cross-sectional view.

In FIG. 54, the same reference numerals are given to members already described for FIGS. 46, 47 and 49, and description is omitted. '224' denote an opening part for inserting the spindle 203a for fitting the spindle 203a to the optical disk 101 in the disk cartridge 220.

It is noted that, in operation of the apparatus according to each carrying-out mode, accuracy should be ensured for many parts for accurately setting a 'distance Cbd between a disk and a stabilizing plate' such as flatness accuracy of the stabilizing plate, a mounting accuracy of the stabilizing plate in the apparatus body, a mounting accuracy of the spindle in the housing, a shape accuracy of the disk central hub, and so forth. Depending on a particular portion, it is preferable that the part shape accuracy and assembling accuracy should be managed within a rang of ±0.01 mm.

Actually, the maximum value of inclination between a disk surface on the side of the stabilizing plate in a condition in which a disk is mounted on a spindle and the stabilizing plate surface is preferably within 0.1°, and also, an adjustment error of the mutual position in a disk rotational axis direction is preferably within ±0.02 mm. The disk surface means a surface on which the hub and the disk contact with one another when the disk is fixed being sandwiched by the hub, or a surface on which the disk and the spindle contact with one another when the disk is directly fixed on the spindle chuck without the use of the hub.

Further, in the present carrying-out mode, a measure not to obstruct a behavior of air flowing on the disk surface was needed. Description is made for this point taking an example of the disk cartridge 220 containing the optical disk 201, below.

Figure 55:
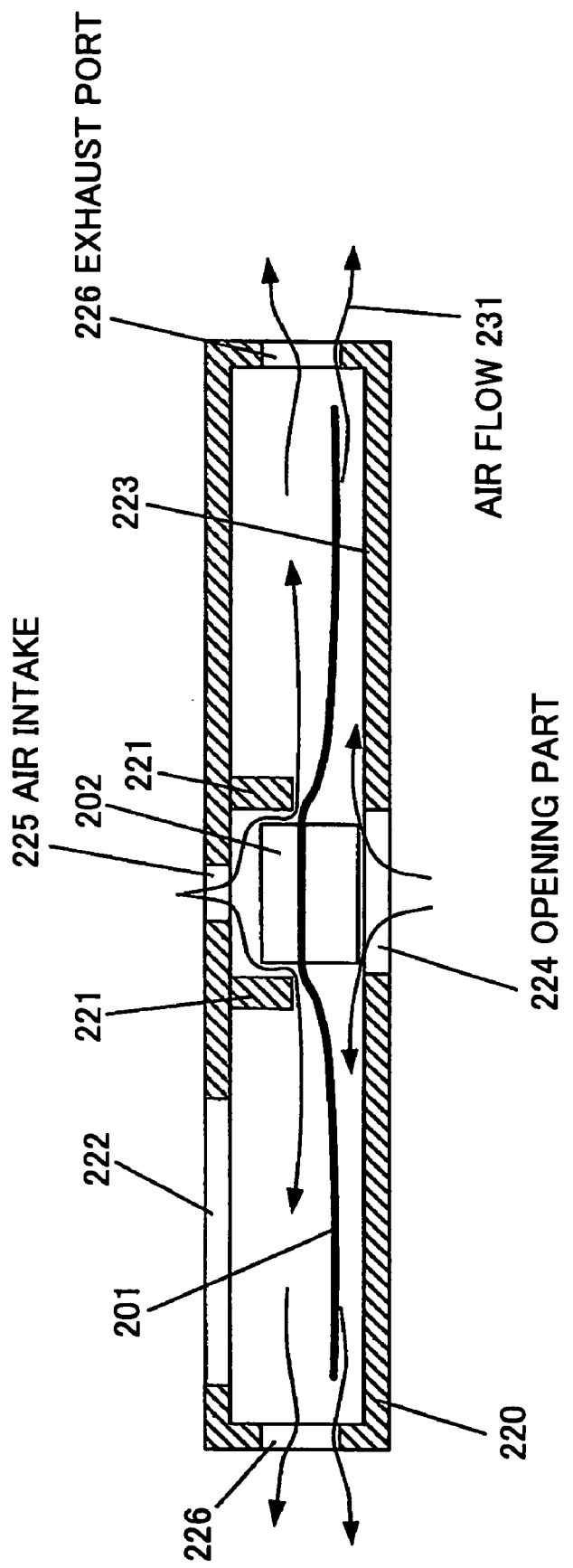
FIG. 55 shows a general sectional view illustrating a state in which the disk is stabilized by means of a stabilizing flat surface in a disk cartridge according to the present carrying-out mode.

FIG. 55 shows a general sectional view illustrating a state in which the disk is stabilized by means of the stabilizing flat surface in the disk cartridge, '225' denotes an intake vent, '226' denotes an exhaust vent, and '231' denotes an air flow.

In FIG. 55, when the optical disk 201 is rotated, air flows 231 are generated basically from an inner end to an outer end on both sides, and, these air flows have an important role even after the stabilizing flat surface 223 stabilized the optical disk 201. In order not to obstruct the air flows 231 from the disk inner end to the disk outer end, air is introduced externally in the disk cartridge 220 via the intake vent 225 produced in a central part in the disk cartridge 220 of FIG. 54, or the exhaust vent is provided for discharging air externally from the disk cartridge 220 smoothly in the disk periphery after the air flows from the disk inner end toward the outer end. Further, the opening part 224 for fixing the optical disk 201 on the spindle 203a also functions as an air introduction mouth on the opposite side of the intake vent 225.

Thus, on both sides of the optical disk 201, the measures were provided for smooth flow of the air flows 231 from the inner end to the outer end. In this disk cartridge 120, 16 exhaust vents 226 were provided at peripheral positions equally dividing the circumference by 16. There, at least for the intake vent 225 and the opening part 224 of the disk cartridge 220, filters should be provided for avoiding entrance of dust/dirt externally in the disk cartridge 220, and also, the same filter may preferably provided for the exhaust vent 226. This thought for the air flows 231 should be applied not only for the disk cartridge 220 but also for a configuration such as that of the ninth, tenth or thirteenth carrying-out mode in the same manner.

Figure 56:
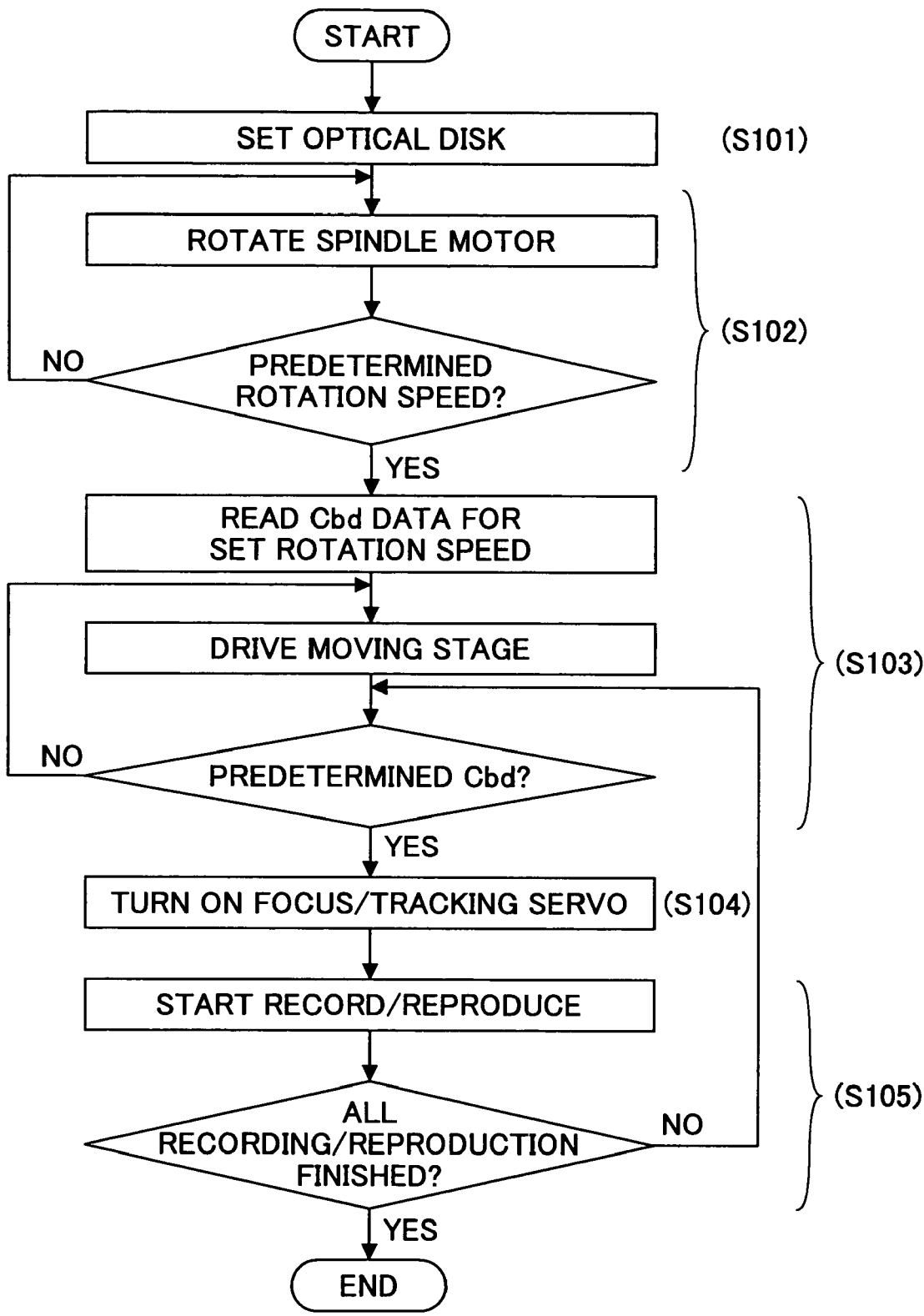
FIG. 56 shows an operation flow chart of disk stabilizing operation through recording/reproduction operation in the present carrying-out mode.

With reference to FIG. 56, a flow chart, a general flow from disk stabilizing operation on the optical disk by means of the stabilizing plate through recording/reproduction operation in the recording/reproduction apparatus according to the ninth through twelfth carrying-out modes is described now.

First, the optical disk 201 is set on the spindle chuck 205 via the hub 202, and is held by the spindle 203a (Step S101); and, the spindle motor 203 is started up, and thus, the optical disk 201 is rotated at a desired rotation speed (Step S102).

After that, in Step S103, a 'distance Cbd between the disk and the stabilizing plate' corresponding to the rotation speed of the spindle motor 203 is set. That is, operation is carried out so that the state of (a) is changed to the state of (b) of FIGS. 44 through 47. Relationship between the rotation speed of the spindle motor 203 and the 'distance Cbd between the disk and the stabilizing plate' is previously set from a testing result or such carried out for each specification/configuration of the optical disk 201 applied, the corresponding relationship data is stored in a memory device in a form of a data table, and the distance Cbd setting control driving is carried out as a result of the data being read out from the memory device.

Specifically, in the ninth and eleventh carrying-out modes, a disk-rotational-axis-direction position of the spindle 203a is controlled by means of the moving stage 240, and a final position thereof is determined by means of the positioning mechanism 241. In the tenth carrying-out mode, a disk-rotational-axis-direction position of the stabilizing plate 230 is controlled by means of the moving stage 243, and a final position thereof is determined by means of the positioning mechanism 244. In the twelfth carrying-out mode, a disk-rotational-axis-direction position of the disk cartridge 220 is controlled by means of the moving stage 247, and a final position thereof is determined by means of the positioning mechanism 248.

After the completion of the setting in Step S103, the optical pickup 204 is moved to a radial position for carrying out recording/reproduction on the optical disk 201, the disk-rotation-axis-direction position of the optical pickup 204 is adjusted so that focus servo operation is carried out, and thus, a focal position is controlled to a layer for carrying out recording/reproduction in the optical disk 201. Further, tracking servo control is carried out on the optical pickup 204, and thus, the optical pickup 204 is made to follow a target groove on the optical disk 201 (Step S104). In this state, predetermined recording/reproduction operation is carried out in Step S105.

In the thirteenth carrying-out mode, the above-mentioned Step S103 is not required. Instead, it is necessary to previously carry out dimension management of the hub 202 and assembling adjustment between the spindle 203a and the stabilizing plate 230, in order that, when the optical disk 201 is set on the spindle chuck 205, the 'distance Cbd between the disk and the stabilizing plate' may be set at a predetermined value.

Also, in the fourteenth carrying-out mode, the above-mentioned Step S103 is not required. Instead, it is necessary to previously carry out dimension management of the hub 202, thickness management of the disk cartridge 220 on the side of the stabilizing flat surface 223 and assembling adjustment of a mutual position between the spindle 203a and the supporting member 246, in order that, when the optical disk 201 is set on the spindle chuck 205, the 'distance Cbd between the disk and the stabilizing plate' may be set at a predetermined value.

The twenty-fourth through twenty-seventh aspects of the present invention are described more specifically based on tenth through sixteenth embodiments (10-16) and fourth through sixth comparison examples (4-6), as follows:

A tenth embodiment is described first.

In the tenth embodiment, the recording/reproduction apparatus according to the ninth carrying-out mode shown in FIG. 44 was applied.

In the tenth embodiment, as a disk substrate, a polycarbonate-made sheet having a diameter of 120 mm and a thickness of 140 μm was applied. In order to prepare the disk, first, on the above-mentioned sheet, a groove of a pitch of a stamper in 0.6 μm and a width in 0.3 μm was transferred in a thermal transfer manner, after that, films were produced in the order of the sheet/Ag reflective layer of 120 nm/$(ZrO_2—Y_2O_3)—SiO_2$ of 7 nm/AgInSbTeGe of 10 nm/$ZnS—SiO_2$ of 25 nm/$Si_3N_4$ of 10 nm by spattering. An information recording area was set from an inner diameter of 50 mm up to an outer diameter of 110 mm (radius between 25 and 55 mm). After that, UV resin was coated by a spin coating manner, and was set by ultraviolet ray radiation, and thus a transparent protective layer of a thickness of 10 μm was produced. On the opposite side, a hard coat of a thickness of 10 μm was provided. A hub 202 with an outer diameter of 30 mm, an inner diameter of 15 mm and a thickness of 0.3 mm was mounted at a disk center.

The above-mentioned optical disk 201 was rotated in a range of disk rotation speed Sr between 500 and 14000 rpm, and was stabilized by the stabilizing plate 230. At this time, the 'distance Cbd between the disk and the stabilizing plate' was changed according to the formula Cbd=3500/Sr+0.02 in a high speed rotation zone, and the formula Cbd=0.00015Sr+0.20 in a low speed rotation zone, and disk stability in an upper limit boundary zone of the specific condition range according to the present carrying-out mode was proved. The above-mentioned upper limit rotation speed 14000 rpm was the highest rotation speed of the spindle motor 203 applied in the experiment, and the lower limit rotation speed 500 rpm was the lowest rotation speed of the spindle motor 203.

The above-mentioned relation formulas are those previously obtained for the optical disk 201 configured as mentioned above. The disk stability was measured with a laser displacement sensor disposed instead of the optical pickup 204, and a maximum disk axial runout in the range of the disk radius between 25 and 55 mm was recorded as a characteristic value.

In an eleventh embodiment, the recording/reproduction apparatus shown in FIG. 46 according to the eleventh carrying-out mode was applied. The positioning mechanism 241 was omitted, and the spindle 203 could be freely adjusted in the disk rotational axis direction. Then, in the eleventh embodiment, as a disk substrate, a polycarbonate sheet of 120 mm in diameter and 50 μm in thickness was applied. Except this, the optical disk 201 the same as that applied in the tenth embodiment was applied.

The above-mentioned optical disk 201 was rotated in a range of disk rotation speed Sr between 500 and 12000 rpm, and was stabilized by the stabilizing flat surface 223. At this time, the 'distance Cbd between the disk and the stabilizing plate' was changed according to the formula Cbd=3500/Sr–0.22 in a high speed rotation zone, and the formula Cbd=0.00015Sr+0.40 in a low speed rotation zone, and disk stability in an upper limit boundary zone of the specific condition range according to the present carrying-out mode was proved. The above-mentioned upper limit rotation speed 12000 rpm was in a range defined by relationship between the formula Cbd>0.05 prescribing the minimum value of the 'distance Cbd between the disk and the stabilizing plate' and the above-mentioned formula. The lower limit rotation speed 500 rpm was the lowest rotation speed of the spindle motor 203.

The above-mentioned relation formulas are those previously obtained for the optical disk 201 configured as mentioned above. The disk stability was measured with a laser displacement sensor disposed instead of the optical pickup 204, and a maximum disk axial runout in the range of the disk radius between 25 and 55 mm was recorded as a characteristic value.

In a twelfth embodiment, the recording/reproduction apparatus shown in FIG. 45 according to the tenth carrying-out mode was applied. The positioning mechanism 244 was omitted, and the stabilizing plate 230 could be freely adjusted in the disk rotational axis direction. Then, in the twelfth embodiment, as a disk substrate, a polyethyleneterephthalate sheet of 120 mm in diameter and 100 μm in thickness was applied. Except this, the optical disk 201 the same as that applied in the tenth embodiment was applied.

The above-mentioned optical disk 201 was rotated in a range of disk rotation speed Sr between 500 and 14000 rpm, and was stabilized by the stabilizing plate 230. At this time, the 'distance Cbd between the disk and the stabilizing plate' was changed according to the formula Cbd=2500/Sr+0.18 in a high speed rotation zone, and the formula Cbd=0.00015Sr+0.20 in a low speed rotation zone, and disk stability in an upper limit boundary zone of the specific condition range according to the present carrying-out mode was proved. The above-mentioned upper limit rotation speed 14000 rpm was the highest rotation speed of the spindle motor 203 applied in the experiment, and the lower limit rotation speed 500 rpm was the lowest rotation speed of the spindle motor 203.

The above-mentioned relation formulas are those previously obtained for the optical disk 201 configured as mentioned above. The disk stability was measured with a laser displacement sensor disposed instead of the optical pickup 204, and a maximum disk axial runout in the range of the disk radius between 25 and 55 mm was recorded as a characteristic value.

In a thirteenth embodiment, the recording/reproduction apparatus and the optical disk 201 the same as those applied in the tenth embodiment was applied.

The above-mentioned optical disk 201 was rotated in a range of disk rotation speed Sr between 500 and 14000 rpm, and was stabilized by the stabilizing plate 230. At this time, the 'distance Cbd between the disk and the stabilizing plate' was changed according to the formula Cbd=0.05 in a high speed rotation zone, and the formula Cbd=0.25exp(−0.0004Sr) in a low speed rotation zone, and disk stability in a lower limit boundary zone of the specific condition range according to the present carrying-out mode was proved.

The above-mentioned relation formulas are those previously obtained for the optical disk 201 configured as mentioned above. The upper and lower limits of the disk rotation speed were according to those in the setting of the tenth embodiment, and also, evaluation of the disk stability was carried out the same as in the tenth embodiment.

In a fourteenth embodiment, the recording/reproduction apparatus and the optical disk 201 the same as those applied in the twelfth embodiment was applied.

The above-mentioned optical disk 201 was rotated in a range of disk rotation speed Sr between 500 and 14000 rpm, and was stabilized by the stabilizing plate 230. At this time, the 'distance Cbd between the disk and the stabilizing plate' was changed according to the formula Cbd=0.05 in a high speed rotation zone, and the formula Cbd=0.25exp(−0.0004Sr) in a low speed rotation zone, and disk stability in a lower limit boundary zone of the specific condition range according to the present carrying-out mode was proved.

The above-mentioned relation formulas are those previously obtained for the optical disk 201 configured as mentioned above. The upper and lower limits of the disk rotation speed were according to those in the setting of the twelfth embodiment, and also, evaluation of the disk stability was carried out the same as in the twelfth embodiment.

In a fifteenth embodiment, the recording/reproduction apparatus shown in FIG. 48 according to the thirteenth carrying-out mode, and the optical disk 201 the same as that applied in the tenth embodiment was applied.

The above-mentioned optical disk 201 was rotated in a predetermined disk rotation speed Sr, and was stabilized by the stabilizing plate 230. At this time, two recording/reproduction apparatuses were prepared in which the 'distance Cbd between the disk and the stabilizing plate' was fixed in 0.3 mm and 0.1 mm, respectively, and disk stability was tested for each of the respective apparatuses. The upper and lower limits of the disk rotation speed were according to those in the setting of the tenth embodiment, and also, evaluation of the disk stability was carried out the same as in the tenth embodiment.

In a sixteenth embodiment, the recording/reproduction apparatus shown in FIG. 49 according to the fourteenth carrying-out mode, and the optical disk 201 the same as that applied in the twelfth embodiment was applied.

The above-mentioned optical disk 201 was rotated in a predetermined disk rotation speed Sr, and was stabilized by the stabilizing flat surface 223. At this time, two recording/reproduction apparatuses were prepared in which the 'distance Cbd between the disk and the stabilizing plate' was fixed in 0.3 mm and 0.1 mm, respectively, and disk stability was tested for each of the respective apparatuses. The upper and lower limits of the disk rotation speed were according to those in the setting of the twelfth embodiment, and also, evaluation of the disk stability was carried out the same as in the twelfth embodiment.

In a fourth comparison example, the recording/reproduction apparatus and the optical disk 201 the same as those in the tenth embodiment were applied.

The above-mentioned optical disk 201 was rotated in a predetermined disk rotation speed Sr, and was stabilized by the stabilizing plate 230. At this time, the 'distance Cbd between the disk and the stabilizing plate' was changed according to the formula Cbd=3500/Sr+0.12 in a high speed rotation zone, and the formula Cbd=0.00015Sr+0.30 in a low speed rotation zone.

The above-mentioned formulas correspond to a condition (in this example, a condition in which Cbd of the tenth embodiment was increased by 0.1 mm) exceeding the Cbd upper limit boundary zone in the above-mentioned carrying-out embodiment. By comparing disk stability for a case according to these formulas and the same for a case according to the condition zone in the formulas in the present carrying-out mode (a result of the tenth embodiment), effect of the present carrying-out mode can be proved. The upper and lower limits of the disk rotation speed were according to those in the setting of the tenth embodiment, and also, evaluation of the disk stability was carried out the same as in the tenth embodiment.

In a fifth comparison example, the recording/reproduction apparatus and the optical disk 201 the same as those in the eleventh embodiment were applied.

The above-mentioned optical disk 201 was rotated in a predetermined disk rotation speed Sr, and was stabilized by the stabilizing plate 230. At this time, the 'distance Cbd between the disk and the stabilizing plate' was changed according to the formula Cbd=3500/Sr−0.12 in a high speed rotation zone, and the formula Cbd=0.00015Sr+0.50 in a low speed rotation zone.

The above-mentioned formulas correspond to a condition (in this example, a condition in which Cbd of the eleventh embodiment was increased by 0.1 mm) exceeding the Cbd upper limit boundary zone in the above-mentioned carrying-out embodiment. By comparing disk stability for a case according to these formulas and the same for a case according to the condition zone in the formulas in the present carrying-out mode (a result of the eleventh embodiment), effect of the present carrying-out mode can be proved. The upper and lower limits of the disk rotation speed were according to those in the setting of the eleventh embodiment, and also, evaluation of the disk stability was carried out the same as in the eleventh embodiment.

In a sixth comparison example, the recording/reproduction apparatus and the optical disk 201 the same as those in the twelfth embodiment were applied.

The above-mentioned optical disk 201 was rotated in a predetermined disk rotation speed Sr, and was stabilized by the stabilizing plate 230. At this time, the 'distance Cbd between the disk and the stabilizing plate' was changed according to the formula Cbd=2000/Sr+0.28 in a high speed rotation zone, and the formula Cbd=0.00015Sr+0.30 in a low speed rotation zone.

The above-mentioned formulas correspond to a condition (in this example, a condition in which Cbd of the twelfth embodiment was increased by 0.1 mm) exceeding the Cbd upper limit boundary zone in the above-mentioned carrying-out embodiment. By comparing disk stability for a case according to these formulas and the same for a case according to the condition zone in the formulas in the present carrying-out mode (a result of the twelfth embodiment), effect of the present carrying-out mode can be proved. The upper and lower limits of the disk rotation speed were according to those in the setting of the twelfth embodiment, and also, evaluation of the disk stability was carried out the same as in the twelfth embodiment.

FIGS. 57, 58 and 59 show disk axial runout characteristics stabilized by the flat-plate-shaped stabilizing plate in the respective tenth through sixteenth embodiments (10-16) and the fourth through sixth comparison examples (4-6).

First, in FIG. 57, disk axial runout characteristics (the tenth through twelfth embodiments (10-12), Cbdmax boundary zone condition) in the upper limit boundary zone of the specific stabilization condition and disk axial runout characteristics (the fourth through sixth comparison examples (4-6), out of the Cbdmax boundary zone condition) exceeding this the upper limit boundary zone are compared. As can be clearly seen from the figure, while satisfactory disk axial runout characteristics not more than 50 μm were obtained from the tenth through twelfth embodiments, disk axial runout remarkably degraded in the fourth through sixth comparison examples.

The results shows in FIG. 58 are evaluation results for disk axial runout in the Cbd lower limit side condition zone specified according to the present carrying-out modes. More satisfactory disk axial runout characteristics than those of the Cbd upper limit side results were obtained there. Further, in this condition, the optical disk 201 was stabilized without being slid on by the stabilizing plate 230.

When Cbd was reduced further than the lower limit described above for the embodiment, the stabilizing plate 230 slid on the optical disk 201, and the disk stopped in the experiment.

From the results, it was proved that the condition range defined by the Cbd upper and lower limits according to the present carrying-out modes is very important for disk stabilization with the use of the flat-plate-shaped stabilizing plate.

In the fifteenth and sixteenth embodiments (15-16), disk stability for a case where the 'distance between the disk and the stabilizing plate' was fixed was proved.

FIG. 59 shows the results thereof. In the fifteenth embodiment (15), satisfactory disk axial runout characteristics were obtained at a disk rotation speed in a range between 1000 and 12000 rpm when Cbd was fixed in 0.3 mm. When Cbd was fixed in 0.1 mm, the stabilizing plate contacted and slid on the optical disk 201 at not more than 1000 rpm, and thus, effective disk rotation speed was limited in not less than 2000 rpm.

In the sixteenth embodiment (16), satisfactory disk axial runout characteristics were obtained at a disk rotation speed in a range between 1000 and 14000 rpm when Cbd was fixed in 0.3 mm. When Cbd was fixed in 0.1 mm, the stabilizing plate contacted and slid on the optical disk 201 at not more than 1000 rpm, and thus, effective disk rotation speed was limited in not less than 2000 rpm.

From these results, cases where satisfactory disk runout characteristics were achieved and also the optical disk and the stabilizing plate did not contact and slide on one another were only those according to the condition zone specified by the present carrying-out modes.

Further, for the fifteenth and sixteenth embodiments (15-16), for the disk rotation speed equal to or more than 2000 rpm, setting was made in Cbd=0.1 mm, and then, satisfactory disk axial runout characteristics not more than 10 μm were achieved.

This corresponds to a result in the specific condition range specified by the present carrying-out modes, i.e., the condition range in the disk rotation speed range from the disk rotation speed Sr1 at the intersection between the curve of $Cbd=\gamma \exp(-0.0004 Sr)$ and the straight line $Cbd=\eta$ through the above-mentioned Srmax or 'the disk rotation speed at the intersection between $Cbd=A/Sr+\alpha$ and $Cbd=\eta$', and also, in the vicinity of the boundary zone of the above-mentioned inequality $Cbd \geqq \eta$, and effectiveness thereof was thus proved.

The present invention can be applied to a recording/reproduction apparatus carrying out information recording/reproduction to/from a flexible recording disk, and a disk cartridge containing the recording disk. Recording disks to which the present invention is directed to include all of those such as a phase change memory, a magneto-optical memory, a hologram memory and so forth, applied in disk-shaped recording disks.

Further, the present invention is not limited to the above-described embodiments, and variations and modifications may be made without departing from the basic concept of the present invention claimed below.

The present application is based on Japanese Priority Applications Nos. 2004-260925, 2004-260935, 2004-260937, 2005-176322, 2005-176327 and 2005-247745, filed on Sep. 8, 2004, Sep. 8, 2004, Sep. 8, 2004, Jun. 16, 2005, Jun. 16, 2005 and Aug. 29, 2005, respectively, the entire contents of which are hereby incorporated herein by reference.

What is claimed is:

1. A recording/reproduction apparatus comprising:
a driving part rotating a flexible recording disk about a rotational axis thereof;
a stabilizing part applying aerodynamic force to the recording disk so as to control disk axial runout of the recording disk and stabilize it; and
a recording/reproduction unit carrying out recording/reproduction of information to/from the recording disk by scanning it, wherein:
said stabilizing part comprises a main stabilizing member for controlling disk axial runout at a recording/reproduction position with the recording/reproduction unit; and an auxiliary stabilizing member for stabilizing the disk surface at positions other than the recording/reproduction position;
said auxiliary stabilizing member is applied for the recording disk in such a manner as to incline the disk surface of the recording disk from a plane perpendicular to the rotational axis of the recording disk, and said main stabilizing member is applied for the recording disk in such a manner that positive or negative pressure is generated in the recording disk rotation direction, so as to cancel the inclination in the recording/reproduction surface of the recording disk.

2. The recording/reproduction apparatus as claimed in claim 1, wherein: the main stabilizing member is caused to generate positive pressure on the recording-disk-rotation-direction upstream side and negative pressure on the recording-disk-rotation-direction downstream side, and the main stabilizing member is applied from a direction such that a direction of the recording-disk-rotational-axis-direction velocity vector component on the surface for which the main stabilizing member is applied may coincide with the direction of said positive pressure generated by the main stabilizing member.

3. The recording/reproduction apparatus as claimed in claim 1, wherein: the main stabilizing member is caused to generate negative pressure on the recording-disk-rotation-direction upstream side and positive pressure on the recording-disk-rotation-direction downstream side, and the main stabilizing member is applied from a direction such that a direction of the recording-disk-rotational-axis-direction velocity vector component on the surface for which the main stabilizing member is applied is opposite to the direction of said positive pressure generated by the main stabilizing member.

4. The recording/reproduction apparatus as claimed in claim 1, wherein: the main stabilizing member is applied in such a manner as to generate positive pressure in the rotation-direction upstream side and negative pressure in the rotation-direction downstream side for a portion which inclines in such a manner that the surface of the recording disk facing the main stabilizing member is lifted for the recording disk rotation direction.

5. The recording/reproduction apparatus as claimed in claim 1, wherein: the main stabilizing member is applied in such a manner as to generate negative pressure in the rotation-direction upstream side and positive pressure in the rotation-direction downstream side for a portion which inclines in such a manner that the surface of the recording disk facing the main stabilizing member is lowered for the recording disk rotation direction.

6. The recording/reproduction apparatus as claimed in claim 1, wherein: said main stabilizing member is extended along a scanning route of a recording/reproduction head by which information is recorded and/or reproduced to/from the recording disk.

7. A recording/reproduction apparatus comprising:
a driving part rotating a flexible recording disk about a rotational axis thereof;
a stabilizing part applying aerodynamic force to the recording disk so as to control disk axial runout of the recording disk and stabilize it; and
a recording/reproduction unit carrying out recording/reproduction of information to/from the recording disk by scanning it, wherein:
said stabilizing part comprises a main stabilizing member for controlling disk axial runout at a recording/reproduction position with the recording/reproduction unit; and an auxiliary stabilizing member for stabilizing the disk surface at positions other than the recording/reproduction position;
said auxiliary stabilizing member is applied for the recording disk in such a manner as to incline the disk surface of the recording disk from a plane perpendicular to the rotational axis of the recording disk, and said main stabilizing member is applied for the recording disk in such a manner that, in the vicinity of a ridgeline part produced on the recording disk due to the inclination of the recording disk surface, positive or negative pressure is generated in the recording disk rotation direction, so as to cancel the inclination in the recording/reproduction surface of the recording disk.

8. The recording/reproduction apparatus as claimed in claim 7, wherein: the main stabilizing member is applied along a radius line on the recording disk shifted from said ridgeline by an arbitrary angle.

9. The recording/reproduction apparatus as claimed in claim 7, wherein: the main stabilizing member is applied along a line on the recording disk parallel to said ridgeline.

10. A recording/reproduction apparatus comprising:
a driving part rotating a flexible recording disk about a rotational axis thereof;
a stabilizing part applying aerodynamic force to the recording disk so as to control disk axial runout of the recording disk and stabilize it; and
a recording/reproduction unit carrying out recording/reproduction of information to/from the recording disk by scanning it, wherein:
said stabilizing part comprises a main stabilizing member for controlling disk axial runout at a recording/reproduction position with the recording/reproduction unit; and an auxiliary stabilizing member for stabilizing the disk surface at positions other than the recording/reproduction position;
said auxiliary stabilizing member is applied for at least one of two areas of the recording disk surface divided by an arbitrary straight line passing through a neighborhood of the recording disk center, and is applied for the recording disk in such a manner as to incline the disk surface of the recording disk from a plane perpendicular to the rotational axis of the recording disk, and said main stabilizing member is applied along a disk radius line shifted by an arbitrary angle from a ridgeline part produced on the recording disk by a function of the auxiliary stabilizing member.

11. The recording/reproduction apparatus as claimed in claim 10, wherein: said main stabilizing member is extended along a scanning route of a recording/reproduction head by which information is recorded and/or reproduced to/from the recording disk.

12. A recording/reproduction apparatus comprising:
a driving part rotating a flexible recording disk about a rotational axis thereof;
a stabilizing part applying aerodynamic force to the recording disk so as to control disk axial runout of the recording disk and stabilize it; and
a recording/reproduction unit carrying out recording/reproduction of information to/from the recording disk by scanning it, wherein:
said stabilizing part comprises a main stabilizing member for controlling disk axial runout at a recording/reproduction position with the recording/reproduction unit; and an auxiliary stabilizing member for stabilizing the disk surface at positions other than the recording/reproduction position;
said auxiliary stabilizing member is applied for at least one of two areas of the recording disk surface divided by an arbitrary straight line passing through a neighborhood of the recording disk center, and is applied for the recording disk in such a manner as to incline the disk surface of the recording disk from a plane perpendicular to the rotational axis of the recording disk, and said main stabilizing member is applied in the vicinity of a line parallel to a ridgeline part produced on the recording disk by a function of the auxiliary stabilizing member.

13. The recording/reproduction apparatus as claimed in claim 12, wherein: said main stabilizing member is extended along a scanning route of a recording/reproduction head by which information is recorded and/or reproduced to/from the recording disk.

14. A disk cartridge containing a flexible recording disk, and configured so that a main stabilizing member controlling an axial runout of the recording disk at least in the vicinity of a recording/reproduction position with the use of aerodynamic force during rotation of the recording disk may function for the recording disk, comprising:
an auxiliary stabilizing member functioning for the recording disk in such a manner as to stabilize the disk surface other than the recording/reproduction position and incline the disk surface of the recording disk from a plane perpendicular to the recording disk rotational axis, and positive or negative pressure is generated in a recording disk rotation direction by means of the main stabilizing member during rotation of the recording disk, and the inclination in the recording disk recording/reproduction surface is cancelled.

15. A disk cartridge containing a flexible recording disk, and configured so that a main stabilizing member controlling an axial runout of the recording disk at least in the vicinity of a recording/reproduction position with the use of aerodynamic force during rotation of the recording disk may function for the recording disk, comprising:

an auxiliary stabilizing member functioning for the recording disk in such a manner as to stabilize the disk surface other than the recording/reproduction position, function for at least one of two areas of the recording disk surface divided by an arbitrary straight line passing through a neighborhood of the recording disk center and incline the disk surface of the recording disk from a plane perpendicular to the recording disk rotational axis, and positive or negative pressure is generated in a recording disk rotation direction by means of the main stabilizing member during rotation of the recording disk, and the inclination in the recording disk recording/reproduction surface is cancelled.

16. The disk cartridge as claimed in claim 14, wherein: said main stabilizing member is extended along a scanning route of a recording/reproduction head by which information is recorded and/or reproduced to/from the recording disk.

17. A recording/reproduction apparatus comprising:

a part fixing a flexible recording disk on a spindle and rotating it;

a stabilizing plate applying aerodynamic force so as to control and stabilize disk axial runout of the flexible recording disk; and a recording/reproduction head scanning so as to record information to and/or reproduce information from the recording disk, wherein:

said stabilizing plate is configured a flat plate covering at least a recording area of the recording disk; and a position adjustment part is provided for adjusting a mutual distance in a disk-rotational-axis direction between the spindle and the stabilizing plate.

18. The recording/reproduction apparatus as claimed in claim 17, wherein: said position adjustment part is provided in said spindle.

19. The recording/reproduction apparatus as claimed in claim 17, wherein: said position adjustment part is provided in the stabilizing plate.

20. The recording/reproduction apparatus as claimed in claim 17, further comprising: a tilt detecting part detecting a tilt angle in a disk radial direction for a peripheral part of the recording disk.

21. A recording/reproduction apparatus driving method for driving the recording/reproduction apparatus claimed in claim 17, comprising the steps of:

a) storing a mutual distance adjustment pattern in a disk rotational axis direction between the spindle and the stabilizing plate with respect to a disk rotation speed; and b) adjusting said mutual distance according to the disk rotation speed during recording and/or reproduction operation.

22. The recording/reproduction apparatus driving method as claimed in claim 21, wherein: a plurality of the adjustment patterns are stored for a case where a configuration of the recording disk is changed, and the adjustment pattern is selected according to the particular configuration of the recording disk applied.

23. The recording/reproduction apparatus driving method as claimed in claim 21, further comprising:

a tilt detecting part detecting a tilt angle in a disk radial direction for a peripheral part of the recording disk; and said mutual distance is adjusted so that the tilt angle detected may be the neighborhood of zero.

24. The recording/reproduction apparatus driving method as claimed in claim 23, wherein: the maximum value of the tilt angle is adjusted in a range between −0.1 and +0.1 degrees.

25. A disk cartridge containing a flexible recording disk and loaded in a recording/reproduction apparatus comprising a part fixing the flexible recording disk on a spindle and rotating it; a stabilizing plate applying aerodynamic force so as to control disk axial runout of the flexible recording disk and stabilize it; a recording/reproduction head scanning so as to record information to and/or reproduce information from the recording disk; and a position adjustment part provided for adjusting a mutual distance in a disk rotational axis direction between the spindle and the stabilizing plate, wherein: said stabilizing plate is configured a flat plate covering at least a recording area of the recording disk, and is provided on an inner wall of the disk cartridge.

26. A recording/reproduction apparatus comprising:

a part fixing a flexible recording disk on a spindle and rotating it;

a stabilizing plate applying aerodynamic force so as to control and stabilize disk axial runout of the flexible recording disk; and a recording/reproduction head scanning so as to record information to and/or reproduce information from the recording disk, wherein:

said stabilizing plate is configured like a flat plate covering at least a recording area of the recording disk; and information recording and/or reproduction by means of said recording/reproduction head is carried out in a specific disk stabilization condition range determined by a rotation speed Sr of the spindle and a distance Cbd between the recording disk and the stabilizing plate.

27. The recording/reproduction apparatus as claimed in claim 26, wherein: said stabilization condition range comprises a range defined by the following inequalities:

$Cbd \leq A/Sr + \alpha,$ $Cbd \leq 0.00015 Sr + \beta,$ $Cbd \geq \gamma \exp(-0.0004 Sr),$ $Cbd \geq \eta,$ and $Sr \leq Srmax,$ where A denotes a constant determined from the disk base material; $\alpha$ denotes a constant determined from a film thickness of the disk base material; $\beta$, $\gamma$ and $\eta$ denote constants concerning flatness of the disk base material; and Srmax denotes the maximum rotation speed of the spindle.

28. The recording/reproduction apparatus as claimed in claim 26, wherein: information recording and/or reproduction by means of said recording/reproduction head is carried out in a disk rotation speed range from a disk rotation speed Sr1 corresponding to an intersection of a curve $Cbd \geq \gamma \exp(-0.0004 Sr)$ and a straight line $Cbd = \eta$ through said Srmax or a disk rotation speed corresponding to an intersection of $Cbd = A/Sr + \alpha$ and $Cbd = \eta$, and also in a condition range in the vicinity of a boundary zone of said inequality $Cbd \geq \eta$.

29. A driving method for driving the recording/reproduction apparatus claimed in claim 26, wherein: at least during information recording and/or reproduction by means of the recording/reproduction head, the distance Cbd between the recording disk and the stabilizing plate is fixed in a fixed value, and information recording and/or reproduction by means of the recording/reproduction head is carried out in a disk rotation speed range satisfying the disk stabilization condition range determined by said fixed value.

* * * * *

UNITED STATES PATENT AND TRADEMARK OFFICE
CERTIFICATE OF CORRECTION

| | |
|---|---|
| PATENT NO. | : 7,367,036 B2 |
| APPLICATION NO. | : 11/219874 |
| DATED | : April 29, 2008 |
| INVENTOR(S) | : Yasutomo Aman et al. |

It is certified that error appears in the above-identified patent and that said Letters Patent is hereby corrected as shown below:

On the Title Page of the patent

Line (73), please replace the Assignee with the following:

Ricoh Company, Ltd., Tokyo (JP) and Chotaro Engineering Co., Saitama (JP)

Signed and Sealed this

Twenty-seventh Day of October, 2009

David J. Kappos
*Director of the United States Patent and Trademark Office*